(12) United States Patent
Medlock et al.

(10) Patent No.: US 9,189,472 B2
(45) Date of Patent: Nov. 17, 2015

(54) SYSTEM AND METHOD FOR INPUTTING TEXT INTO SMALL SCREEN DEVICES

(75) Inventors: Benjamin William Medlock, London (GB); Jonathan Paul Reynolds, London (GB)

(73) Assignee: Touchtype Limited, London (GB)

( * ) Notice: Subject to any disclaimer, the term of this patent is extended or adjusted under 35 U.S.C. 154(b) by 537 days.

(21) Appl. No.: 13/415,574

(22) Filed: Mar. 8, 2012

(65) Prior Publication Data

US 2012/0223889 A1 Sep. 6, 2012

Related U.S. Application Data

(63) Continuation-in-part of application No. 13/262,190, filed as application No. PCT/GB2010/000622 on Mar. 30, 2010.

(30) Foreign Application Priority Data

Mar. 30, 2009 (GB) .................................... 0905457
Sep. 29, 2010 (GB) .................................... 1016385
Sep. 29, 2010 (GB) .................................... 1101419
May 16, 2011 (GB) .................................... 1108200

(51) Int. Cl.
*G06F 17/27* (2006.01)
*G06F 3/023* (2006.01)
*G06F 3/0488* (2013.01)

(52) U.S. Cl.
CPC ............ *G06F 17/276* (2013.01); *G06F 3/0237* (2013.01); *G06F 3/04886* (2013.01)

(58) Field of Classification Search
CPC .. G06F 3/04886; G06F 3/0237; G06F 17/276

USPC .......................................................... 715/773
See application file for complete search history.

(56) References Cited

U.S. PATENT DOCUMENTS

| | | | |
|---|---|---|---|
| 5,467,425 A | 11/1995 | Lau et al. | |
| 5,477,451 A | 12/1995 | Brown et al. | |
| 5,612,690 A | 3/1997 | Levy | |
| 5,671,426 A | 9/1997 | Armstrong, III | |
| 5,680,511 A | 10/1997 | Baker et al. | |
| 5,768,603 A | 6/1998 | Brown et al. | |
| 5,805,832 A | 9/1998 | Brown et al. | |

(Continued)

FOREIGN PATENT DOCUMENTS

| | | |
|---|---|---|
| EP | 1724692 A2 | 11/2006 |
| EP | 2088536 A | 8/2009 |

(Continued)

OTHER PUBLICATIONS

Florian et al.; Dynamic nonlocal language modeling via hierarchical topic-based Adaption; ACL 1999; 9 pages.

(Continued)

*Primary Examiner* — Jialong He
(74) *Attorney, Agent, or Firm* — Baker & Hostetler LLP

(57) ABSTRACT

An embodiment is directed to an interface for a small screen device, such as a watch, that enables a user to enter text on the small screen device by touching in the vicinity of characters, rather than aiming for a particular button or the exact location of a character. Embodiments further enable the design of interfaces without the use of buttons for controlling the entry of text on the small screen device.

34 Claims, 27 Drawing Sheets

(56) References Cited

U.S. PATENT DOCUMENTS

| | | | |
|---|---|---|---|
| 5,805,911 | A | 9/1998 | Miller |
| 5,806,021 | A | 9/1998 | Chen et al. |
| 5,896,321 | A | 4/1999 | Miller et al. |
| 5,952,942 | A | 9/1999 | Balakrishnan et al. |
| 5,963,671 | A * | 10/1999 | Comerford et al. ............ 382/230 |
| 6,009,444 | A | 12/1999 | Chen |
| 6,011,554 | A | 1/2000 | King et al. |
| 6,052,657 | A | 4/2000 | Yamron et al. |
| 6,054,941 | A | 4/2000 | Chen |
| 6,104,989 | A | 8/2000 | Kanevsky et al. |
| 6,125,342 | A | 9/2000 | Selesky |
| 6,182,027 | B1 | 1/2001 | Nasukawa et al. |
| 6,204,848 | B1 | 3/2001 | Nowlan et al. |
| 6,219,632 | B1 | 4/2001 | Schumacher et al. |
| 6,236,958 | B1 | 5/2001 | Lange et al. |
| 6,253,169 | B1 | 6/2001 | Apte et al. |
| 6,275,792 | B1 | 8/2001 | Lewis |
| 6,286,064 | B1 | 9/2001 | King et al. |
| 6,307,548 | B1 | 10/2001 | Flinchem et al. |
| 6,307,549 | B1 | 10/2001 | King et al. |
| 6,321,192 | B1 | 11/2001 | Houchin et al. |
| 6,327,561 | B1 | 12/2001 | Smith et al. |
| 6,362,752 | B1 | 3/2002 | Guo et al. |
| 6,377,965 | B1 | 4/2002 | Hachamovitch et al. |
| 6,393,399 | B1 | 5/2002 | Even |
| 6,405,060 | B1 | 6/2002 | Schroeder et al. |
| 6,460,015 | B1 | 10/2002 | Hetherington et al. |
| 6,484,136 | B1 | 11/2002 | Kanevsky et al. |
| 6,490,549 | B1 | 12/2002 | Ulicny et al. |
| 6,519,557 | B1 | 2/2003 | Emens et al. |
| 6,573,844 | B1 * | 6/2003 | Venolia et al. .................. 341/22 |
| 6,625,600 | B2 | 9/2003 | Lyudovyk et al. |
| 6,671,670 | B2 | 12/2003 | Levin et al. |
| 6,724,936 | B1 | 4/2004 | Riemer |
| 6,813,616 | B2 | 11/2004 | Simpson et al. |
| 6,911,608 | B2 | 6/2005 | Levy |
| 6,925,433 | B2 | 8/2005 | Stensmo |
| 6,963,831 | B1 | 11/2005 | Epstein |
| 6,965,856 | B1 | 11/2005 | Stuermer |
| 6,993,476 | B1 | 1/2006 | Dutta et al. |
| 7,075,520 | B2 | 7/2006 | Williams |
| 7,092,870 | B1 | 8/2006 | Chen et al. |
| 7,098,896 | B2 | 8/2006 | Kushler et al. |
| 7,129,932 | B1 | 10/2006 | Klarlund et al. |
| 7,175,438 | B2 | 2/2007 | Levy |
| 7,187,365 | B2 | 3/2007 | Harman |
| 7,218,249 | B2 | 5/2007 | Chadha |
| 7,222,067 | B2 | 5/2007 | Glushnev et al. |
| 7,251,367 | B2 | 7/2007 | Zhai |
| 7,269,546 | B2 | 9/2007 | Stensmo |
| 7,366,666 | B2 | 4/2008 | Balchandran et al. |
| 7,395,081 | B2 | 7/2008 | Bonnelykke et al. |
| 7,426,505 | B2 | 9/2008 | Simpson et al. |
| 7,453,439 | B1 | 11/2008 | Kushler et al. |
| 7,475,010 | B2 | 1/2009 | Chao |
| 7,487,461 | B2 | 2/2009 | Zhai et al. |
| 7,562,016 | B2 | 7/2009 | Balchandran et al. |
| 7,580,829 | B2 | 8/2009 | James et al. |
| 7,610,189 | B2 | 10/2009 | Mackie |
| 7,610,191 | B2 | 10/2009 | Gao et al. |
| 7,706,616 | B2 | 4/2010 | Kristensson et al. |
| 7,720,682 | B2 * | 5/2010 | Stephanick et al. ........... 704/252 |
| 7,750,891 | B2 | 7/2010 | Stephanick et al. |
| 7,809,575 | B2 | 10/2010 | Ativanichayaphong et al. |
| 7,814,088 | B2 | 10/2010 | Simpson et al. |
| 7,904,298 | B2 | 3/2011 | Rao |
| 7,920,132 | B2 | 4/2011 | Longe et al. |
| 7,953,692 | B2 | 5/2011 | Bower et al. |
| 7,996,211 | B2 | 8/2011 | Gao et al. |
| 8,010,343 | B2 | 8/2011 | Agapi et al. |
| 8,032,358 | B2 | 10/2011 | Helletzgruber et al. |
| 8,036,878 | B2 | 10/2011 | Assadollahi |
| 8,073,698 | B2 | 12/2011 | Ativanichayaphong et al. |
| 8,074,172 | B2 | 12/2011 | Kocienda et al. |
| 8,117,144 | B2 | 2/2012 | Angell et al. |
| 8,136,050 | B2 | 3/2012 | Sacher et al. |
| 8,200,487 | B2 | 6/2012 | Peters et al. |
| 8,225,203 | B2 | 7/2012 | Unruh |
| 8,299,943 | B2 | 10/2012 | Longe |
| 8,605,039 | B2 | 12/2013 | Danielsson et al. |
| 8,756,527 | B2 | 6/2014 | Paasovaara |
| 2002/0045463 | A1 | 4/2002 | Chen et al. |
| 2002/0077808 | A1 | 6/2002 | Liu et al. |
| 2002/0091520 | A1 | 7/2002 | Endo et al. |
| 2002/0126097 | A1 | 9/2002 | Savolainen |
| 2002/0188448 | A1 | 12/2002 | Goodman et al. |
| 2002/0196163 | A1 | 12/2002 | Bradford et al. |
| 2003/0011574 | A1 | 1/2003 | Goodman |
| 2003/0023420 | A1 | 1/2003 | Goodman |
| 2003/0046073 | A1 | 3/2003 | Mori et al. |
| 2003/0073451 | A1 | 4/2003 | Kraft |
| 2003/0093263 | A1 | 5/2003 | Chen et al. |
| 2003/0182279 | A1 | 9/2003 | Willows |
| 2003/0234821 | A1 | 12/2003 | Pugliese |
| 2004/0083198 | A1 | 4/2004 | Bradford et al. |
| 2004/0136564 | A1 | 7/2004 | Roeber et al. |
| 2004/0153975 | A1 | 8/2004 | Williams et al. |
| 2004/0201607 | A1 | 10/2004 | Mulvey et al. |
| 2004/0243393 | A1 | 12/2004 | Wang |
| 2005/0044495 | A1 | 2/2005 | Lee et al. |
| 2005/0060138 | A1 | 3/2005 | Wang et al. |
| 2005/0114770 | A1 | 5/2005 | Sacher et al. |
| 2005/0162395 | A1 | 7/2005 | Unruh |
| 2005/0190970 | A1 * | 9/2005 | Griffin .......................... 382/209 |
| 2005/0283724 | A1 | 12/2005 | Griffin |
| 2006/0036428 | A1 | 2/2006 | Ramsey |
| 2006/0047498 | A1 | 3/2006 | Fux et al. |
| 2006/0142997 | A1 | 6/2006 | Jakobsen et al. |
| 2006/0206313 | A1 | 9/2006 | Xu et al. |
| 2006/0247915 | A1 | 11/2006 | Bradford et al. |
| 2006/0265208 | A1 | 11/2006 | Assadollahi |
| 2006/0265648 | A1 | 11/2006 | Rainisto et al. |
| 2006/0274051 | A1 | 12/2006 | Longe et al. |
| 2006/0290535 | A1 | 12/2006 | Thiesson et al. |
| 2007/0016572 | A1 | 1/2007 | Bates et al. |
| 2007/0033002 | A1 | 2/2007 | Dymetman et al. |
| 2007/0046641 | A1 * | 3/2007 | Lim .............................. 345/173 |
| 2007/0061753 | A1 | 3/2007 | Ng et al. |
| 2007/0074131 | A1 * | 3/2007 | Assadollahi .................. 715/816 |
| 2007/0076862 | A1 | 4/2007 | Chatterjee et al. |
| 2007/0094024 | A1 | 4/2007 | Kristensson et al. |
| 2007/0157122 | A1 | 7/2007 | Williams |
| 2008/0040099 | A1 | 2/2008 | Wu et al. |
| 2008/0076472 | A1 | 3/2008 | Hyatt |
| 2008/0077406 | A1 | 3/2008 | Ganong |
| 2008/0094356 | A1 * | 4/2008 | Ording et al. ................. 345/157 |
| 2008/0126075 | A1 | 5/2008 | Thorn |
| 2008/0162113 | A1 | 7/2008 | Dargan |
| 2008/0189605 | A1 | 8/2008 | Kay et al. |
| 2008/0195374 | A1 | 8/2008 | Holubar et al. |
| 2008/0195388 | A1 * | 8/2008 | Bower et al. .................. 704/243 |
| 2008/0195571 | A1 | 8/2008 | Furuuchi et al. |
| 2008/0281583 | A1 * | 11/2008 | Slothouber et al. ............. 704/10 |
| 2008/0282154 | A1 | 11/2008 | Nurmi |
| 2008/0285857 | A1 | 11/2008 | Sharan et al. |
| 2008/0294982 | A1 | 11/2008 | Leung et al. |
| 2008/0310723 | A1 | 12/2008 | Manu et al. |
| 2008/0312910 | A1 | 12/2008 | Zhang |
| 2009/0006101 | A1 | 1/2009 | Rigazio et al. |
| 2009/0009367 | A1 | 1/2009 | Hirshberg |
| 2009/0019002 | A1 | 1/2009 | Boulis |
| 2009/0058690 | A1 | 3/2009 | Scott |
| 2009/0106695 | A1 | 4/2009 | Perry et al. |
| 2009/0174667 | A1 * | 7/2009 | Kocienda et al. ............. 345/169 |
| 2009/0193334 | A1 * | 7/2009 | Assadollahi .................. 715/261 |
| 2009/0210214 | A1 | 8/2009 | Qian et al. |
| 2009/0225041 | A1 * | 9/2009 | Kida et al. .................... 345/173 |
| 2009/0249198 | A1 | 10/2009 | Davis et al. |
| 2009/0284471 | A1 * | 11/2009 | Longe et al. ................... 345/168 |
| 2010/0017393 | A1 | 1/2010 | Broicher et al. |
| 2010/0106740 | A1 | 4/2010 | Kawauchi |
| 2010/0121870 | A1 | 5/2010 | Unruh et al. |
| 2010/0161318 | A1 | 6/2010 | Lowles et al. |
| 2010/0171700 | A1 | 7/2010 | Sharan et al. |

(56) References Cited

U.S. PATENT DOCUMENTS

| | | |
|---|---|---|
| 2010/0283736 A1 | 11/2010 | Akabane et al. |
| 2011/0029862 A1* | 2/2011 | Scott et al. .................... 715/261 |
| 2011/0047456 A1 | 2/2011 | Sharan et al. |
| 2011/0074685 A1* | 3/2011 | Causey et al. ................. 345/168 |
| 2011/0078563 A1* | 3/2011 | Archer .......................... 715/261 |
| 2011/0078613 A1* | 3/2011 | Bangalore .................... 715/773 |
| 2011/0179032 A1 | 7/2011 | Ceusters et al. |
| 2011/0197128 A1* | 8/2011 | Assadollahi ................. 715/259 |
| 2011/0202836 A1* | 8/2011 | Badger et al. ................ 715/702 |
| 2012/0010875 A1 | 1/2012 | Helletzgruber et al. |
| 2012/0167009 A1 | 6/2012 | Davidson et al. |

FOREIGN PATENT DOCUMENTS

| | | |
|---|---|---|
| GB | 200622248 A | 8/2006 |
| WO | 2008116843 A2 | 10/2008 |
| WO | 2008120033 A1 | 10/2008 |

OTHER PUBLICATIONS

Duda et al.; "Pattern Classification"; $2^{nd}$ edition Chapter 10; 2000; 69 pages.

Li et al.; "Using Uneven Margins SVM and Perception for Information Extraction"; Proceedings of the $9^{th}$ Conference on Computational Natural Language Learning; Jun. 2005; p. 72-79.

* cited by examiner

23 = Typing Pane
24, 26 = Side Pane
25 = Prediction Pane

27 = Typing Pane
29 = Single Pane
38 = Actual Character Entry Button
48 = Most Likely Word Button
58 = Alternative Word Button

SYSTEM AND METHOD FOR INPUTTING TEXT INTO SMALL SCREEN DEVICES

CROSS-REFERENCES TO RELATED APPLICATIONS

The present application is a continuation-in-part of U.S. patent application Ser. No. 13/262,190, filed on Sep. 29, 2011, which is a national stage application of International Application Number PCT/GB2010/000622, filed Mar. 30, 2010, which claims priority to GB Patent Application No. 0905457.8, filed Mar. 30, 2009. The present application is also a continuation-in-part of International Application Number PCT/GB2011/001419, filed Sep. 29, 2011, which claims priority to GB Patent Application No. 1016385.5, filed Sep. 29, 2010. The present application also claims priority to GB Patent Application No. 1108200.5, filed May 16, 2011. Wherein all of the above mentioned references are incorporated herein by reference in their entirety.

BRIEF DESCRIPTION

The present invention relates generally to a system and method for inputting text into small screen devices. In particular the invention relates to a system for generating text predictions for display and user selection and a method for doing so. An embodiment is directed to an interface for a small screen device, such as a watch, that enables a user to enter text on the small screen device by touching in the vicinity of characters, rather than aiming for a particular button or the exact location of a character. Embodiments further enable the design of interfaces without the use of buttons for controlling the entry of text on the small screen device.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND

There currently exists a wide range of text input techniques for use with electronic devices. QWERTY-style keyboards are the de facto standard for text input on desktop and laptop computers. The QWERTY layout was designed for two-handed, multi-digit typing on typewriters in 1878 and has been in wide use ever since. It has proven highly effective given a measure of training and/or experience. Reduced-size QWERTY-style keyboards are also used for text entry on mobile devices, such as PDAs and some mobile phones. These keyboards are generally operated using both thumbs, and their advantage lies in the fact that users are almost always familiar with the QWERTY layout. Devices such as the Blackberry Bold and the Nokia N810 utilize this model.

Text input for mobile phones, however, has focused primarily on methods of entering alphabetic characters using a 9-digit keypad, where each key usually represents either three or four characters. There are various techniques employed to reduce the number of keystrokes required.

Handwriting recognition has been widely used in the PDA market where input is mostly stylus-based. While it has some advantages for users raised on paper-based handwriting, the use of this technology has declined in recent years because it is relatively slow in comparison with most keyboard-based methods. Speech recognition text input systems also exist for both standard and mobile computational devices. These have not been widely adopted due to limitations in accuracy and the adverse effects of noisy environments.

Touch-screen devices offer a highly flexible platform for different styles of text input, and there are many different models currently available. Traditional QWERTY-style 'soft' keyboards are implemented on devices such as the Apple iPhone and many touch-screen PDAs running Windows Mobile. Other devices such as the Blackberry Storm use multi-character soft keyboards with various methods of disambiguation and completion. There are also many third-party systems that offer alternative methods of text entry for touch-screen devices. Examples include ShapeWriter (ShapeWriter Inc.) which is based on recognition of the shapes created by sliding between letters on a QWERTY-style background, and ExIdeas' MessageEase which utilizes an optimized keyboard layout for stylus and finger-based entry.

A somewhat different model of text entry is offered by the University of Cambridge's "Dasher" system, in which text input is driven by natural, continuous pointing gestures rather than keystrokes. It relies heavily on advanced language model-based character prediction, and is aimed primarily at improving accessibility for handicapped users, although it can also be used in mobile and speech recognition-based applications.

Many of the input models discussed above utilize some form of text prediction technology. Known prediction models for enhancing text input have two main functions: (1) disambiguation of multiple-character keystrokes, and (2) offering potential completions for partially-entered sequences. Examples of such technologies include Tegic Communications'"T9", Motorola's "iTap", Nuance's "XT9", Blackberry's "SureType" and Zi Technology's "eZiType" and "eZi-Text". In each case a dictionary of allowable terms is maintained and, given a particular input sequence, the system chooses a legitimate term (or set of terms) from the dictionary and presents it to the user as a potential completion candidate. T9 requires the user to enter a number of characters equal to the length of the target input sequence, and thus only offers function (1) above, whereas the other systems offer both (1) and (2).

In all of these technologies, the basic dictionary can be augmented with new terms entered by the user. This is limited only by the amount of device memory available. T9 uses a static dictionary, meaning that words sharing the same key sequence are always suggested to the user in the same order. In contrast, Motorola's iTap utilizes a dynamic dictionary, meaning that the first word predicted for a given key sequence may not remain the same each time the key sequence is entered. Rather, completions are suggested in order of most recent use. However, this method does not keep track of which completion is the most probable; it merely chooses the one used most recently.

Blackberry's SureType, Nuance's XT9 and Zi Technology's eZiType offer somewhat more sophisticated models, in which candidate completions are ordered on the basis of usage frequency statistics. In addition, Zi Technology's eZi-Text also has the ability to predict multi-word completion candidates given appropriate input, by scanning a user's previous input to identify high frequency phrases.

Previously, work on enhancing user interaction with keyboards of limited size has provided a number of methods based on reduced-size keyboards, which do not cover the full range of characters for a given language. This is the subject of U.S. Pat. No. 6,307,549, which provides a method for disambiguating the output from a reduced keyboard (usually about 3 characters per key). Word-level disambiguation is provided using a selection button which enables a user to cycle through possible matches to the current input. An alternative reduced keyboard layout, based on the common QWERTY layout, is the 'half qwerty' layout provided by U.S. Pat. No. 7,083,342, which also uses extra post-input disambiguation.

Although reduced keyboards have a reduced error rate, they also quantize the input more roughly, meaning that there is less information content in the input the computer receives from a reduced keyboard than a full keyboard.

In theory, with an adequate error-correction system, a full keyboard with error correction should require less disambiguation keystrokes than a reduced keyboard. On a hard keyboard, an input event relates to a user pressing down on a key of the keyboard. For such keyboards, the user can press any location within the boundary of a key; the corresponding input event will be the same for all locations within that boundary. However, with touch-sensitive 'soft keyboards', it is possible to use the almost continuous co-ordinates of touches on the soft keyboard.

Many existing virtual keyboard systems, e.g. United States patent application publication number 2009/0284471 and predecessors, incorporate mechanisms for automatically 'correcting' user input in instances where the system receives a character that is not the one intended by the user. Such systems are based around the idea of associating a pre-specified set of locations, each designated by a set of Cartesian coordinates, with characters available for input by the user. Given a set of coordinates representing an input event, the distances between this event and surrounding pre-specified locations within an 'auto-correcting region' are used to construct a weighted set of characters assigned to that event. The auto-correcting region comprises a plurality of characters of the alphabet. During input, the user is presented with a set of 'objects' that are considered likely intended character sequences. As the user selects his/her intended input sequences, the (potentially weighted) horizontal and vertical offsets between the input event coordinates and the character coordinates are computed, and the relevant moving average used to calibrate input event coordinates to reflect a user's typing style. The moving average may be a running average where the coordinates of each key are set to the average of all previous input events for that key.

The above described existing virtual keyboards model each character as a location specified by a set of coordinates. What is needed is a system and method that models a user's actual input as he or she targets characters on a virtual keyboard.

DETAILED DESCRIPTION

Figure 1:
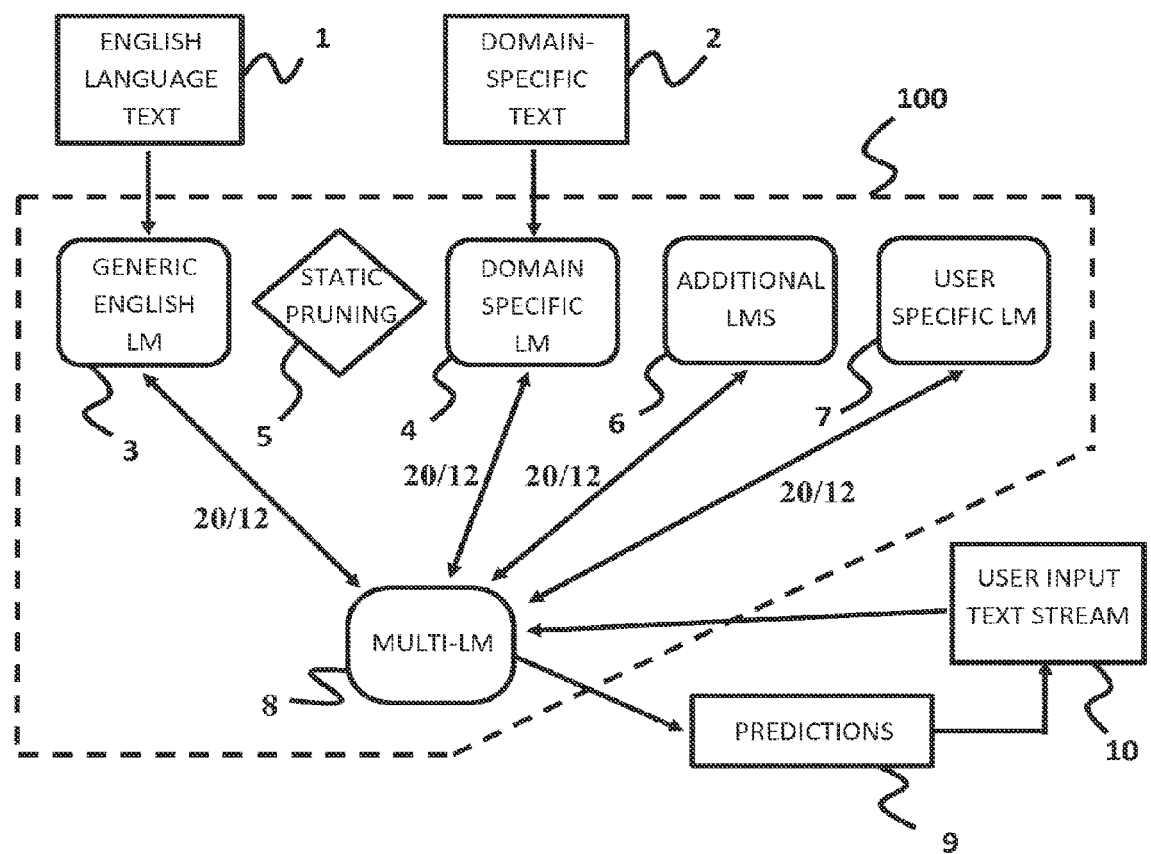
FIG. 1 is a schematic of a high level prediction architecture in accordance with an embodiment.
Figure 2A:
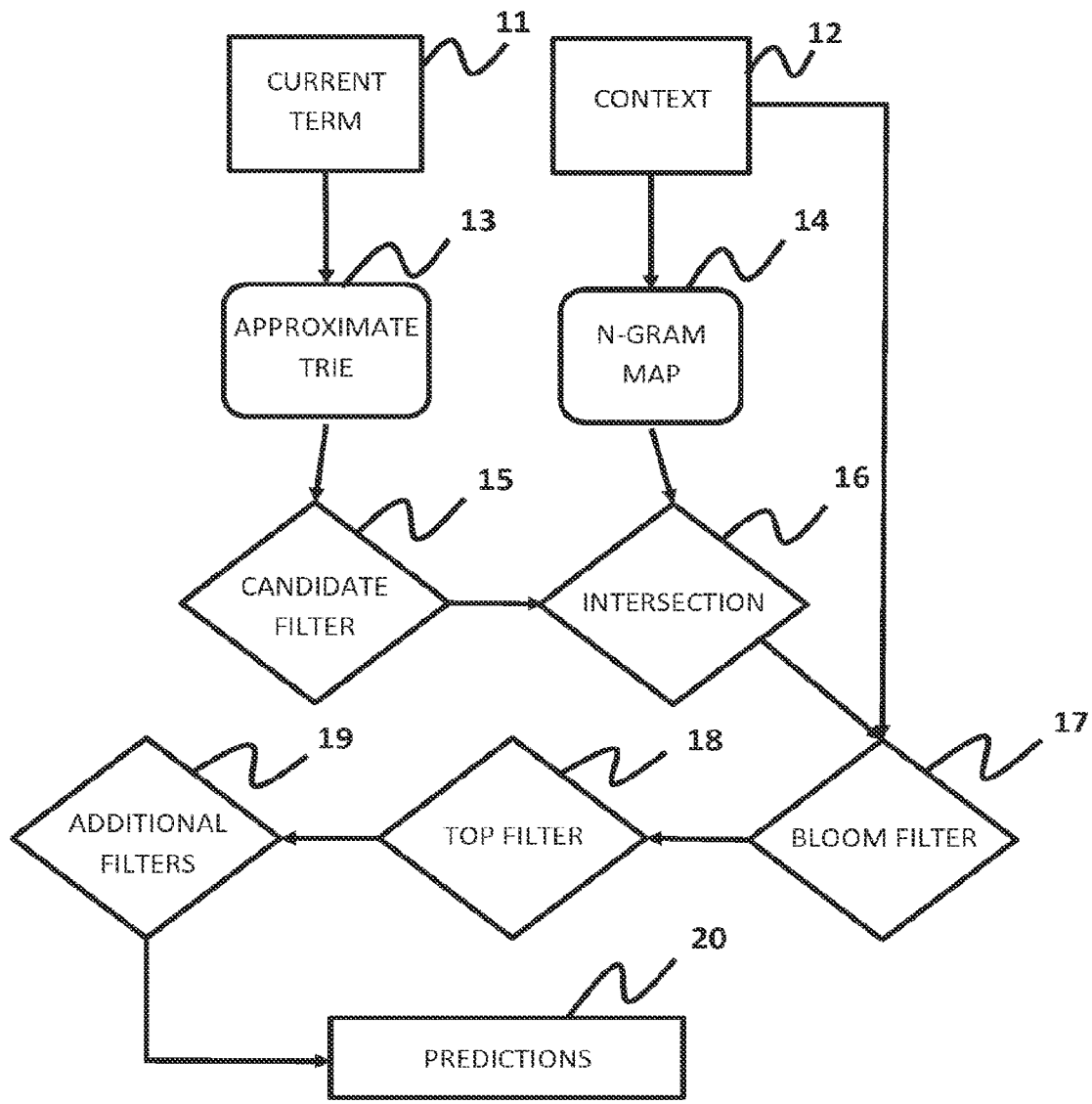
FIG. 2 is a schematic of a language model of the prediction architecture according to an embodiment.
Figure 2B:
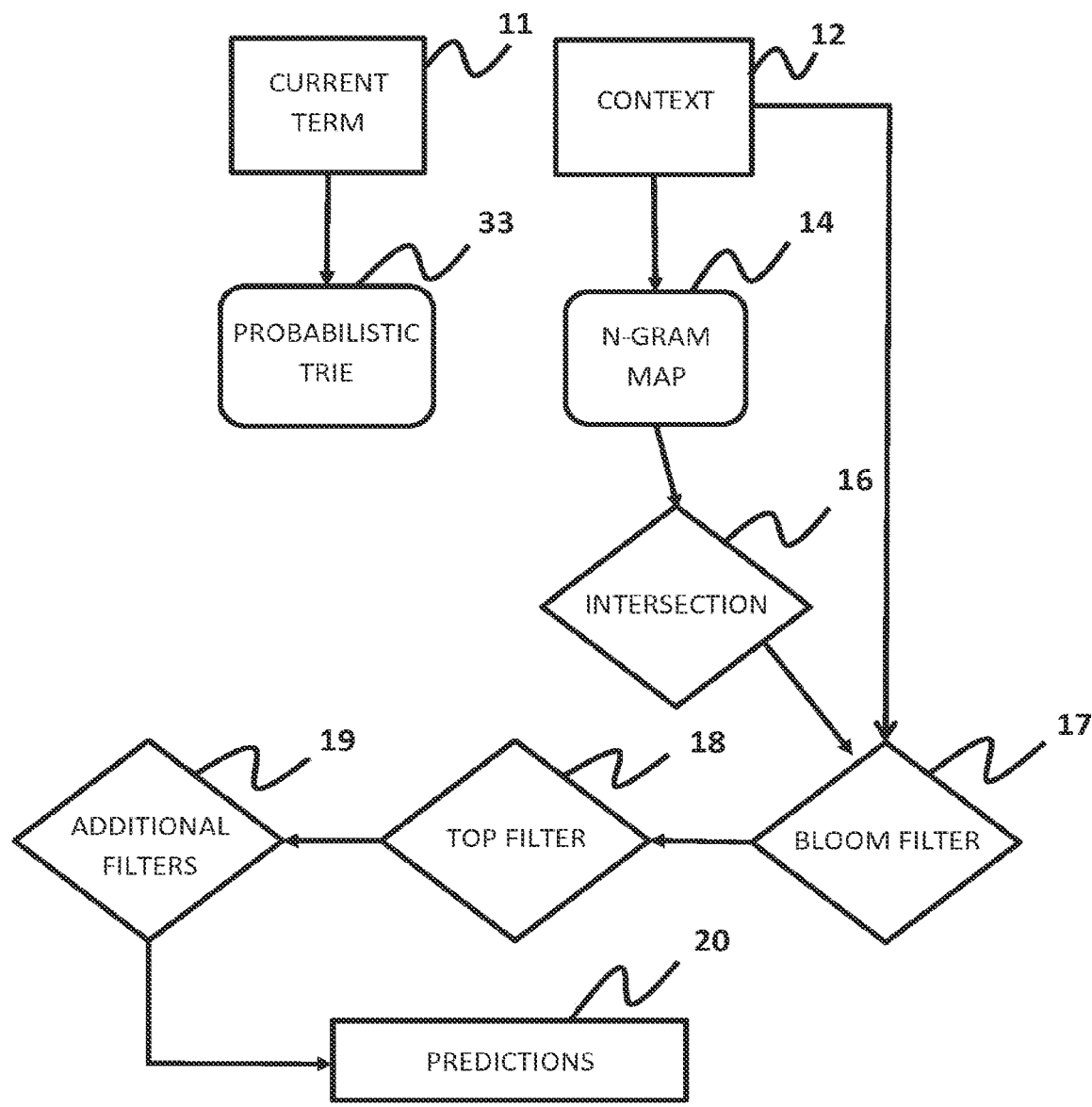
Figure 2C:
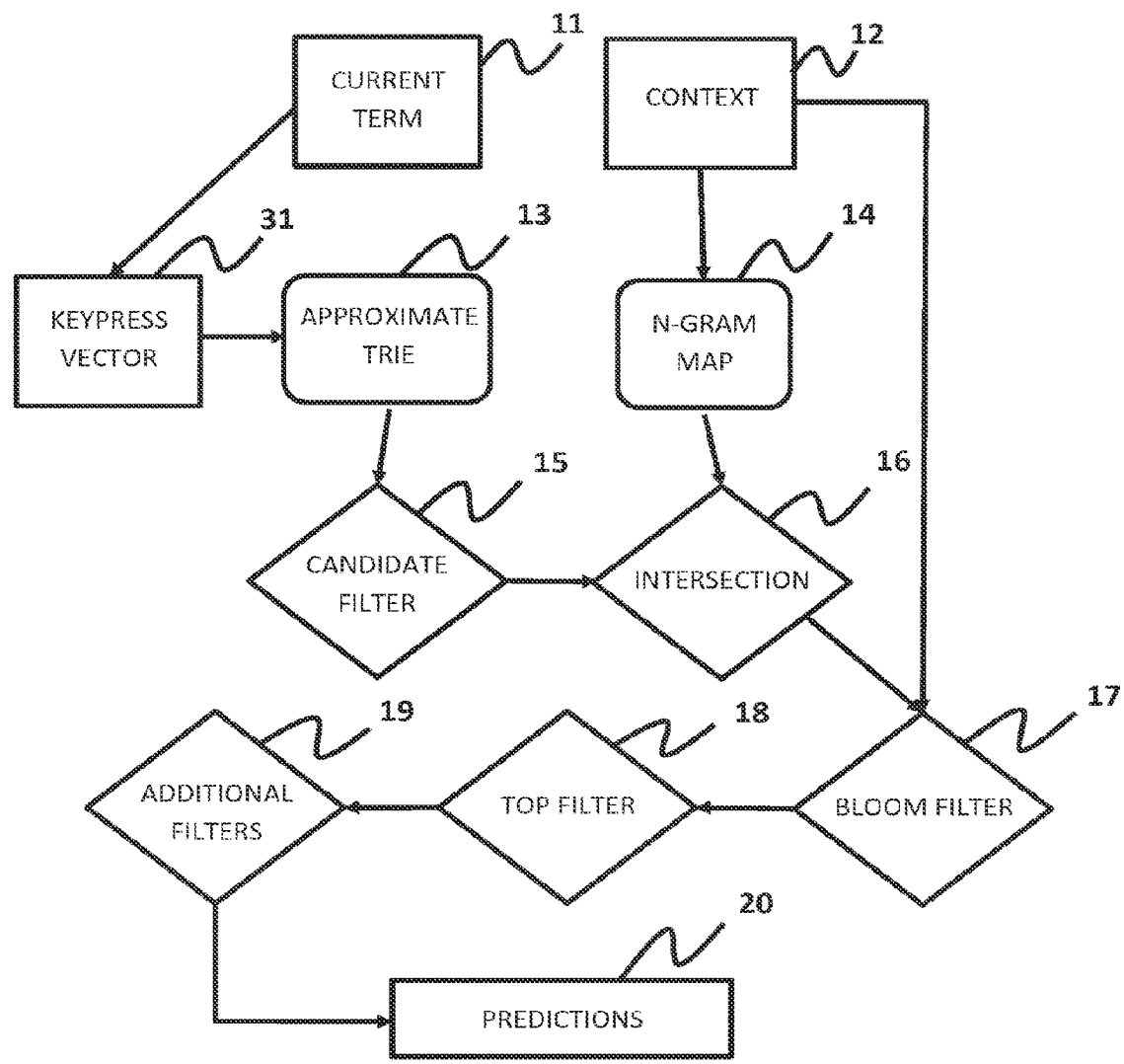
Figure 2D:
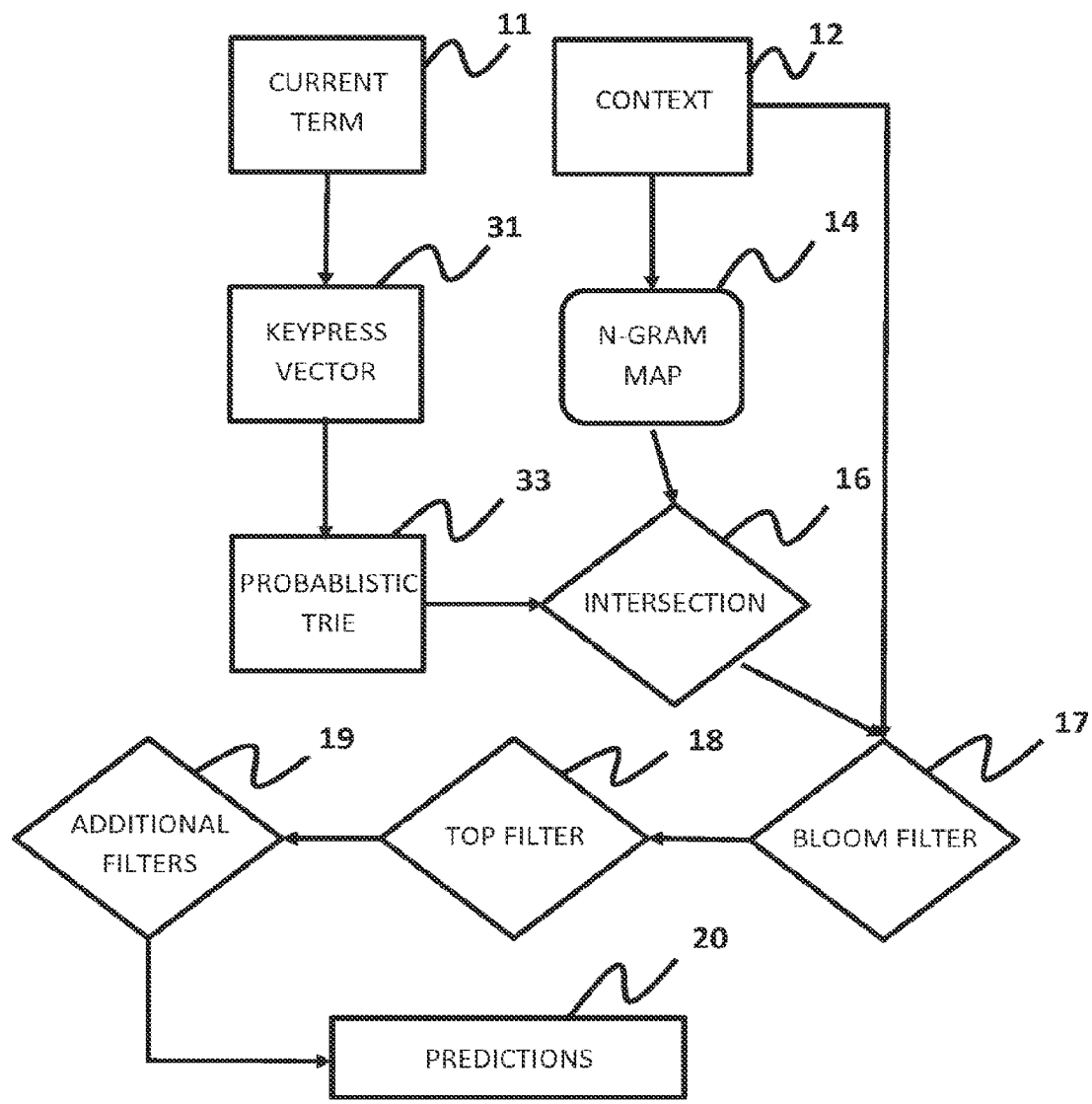

Embodiments described herein represent a fundamental shift away from predominantly character-based text input to a predominately word- or phrase-based text input.

In accordance with an embodiment there is provided a system comprising a user interface configured to receive text input by a user, a text prediction engine comprising a plurality of language models and configured to receive the input text from the user interface and to generate concurrently text predictions using the plurality of language models and wherein the text prediction engine is further configured to provide text predictions to the user interface for display and user selection.

Preferably, the text predictions are generated concurrently from the plurality of language models in real time. Preferably, the plurality of language models comprises a model of human language and at least one language model specific to an application. More preferably, the at least one language model specific to an application comprises one or more of an email, SMS text, newswire, academic, blog, or product review specific language model. Alternatively, the at least one language model specific to an application comprises an email and an SMS text specific language model and the text predictions are generated using one or both of the email and SMS text specific language models. The plurality of language models may also include at least one additional language model, which may be a user community specific language model for example.

In an embodiment of the invention, the system includes a mechanism configured to compare a sequence of terms stored in a language model to a sequence of terms stored in one or more other language models and to remove duplicate or multiple entries by retaining only the most probable of the duplicate or multiple entries.

In another embodiment of the invention, the plurality of language models includes a user specific language model based on an n-gram language model that is updated to record the frequency of occurrence of n-gram paths input by a user in an n-gram map. Preferably, the user specific language model is configured, in response to inputted text which is not represented in the user specific language model, to insert new paths into the n-gram map within the language model.

In one embodiment, the text prediction engine comprises a mechanism to combine the predictions generated by each language model. Preferably, the mechanism is configured to insert the predictions into an STL 'multimap' structure and return the p most probable terms as the predictions for provision to the user interface. While embodiments described herein are described in terms of an STL multimap structure, it is to be understood that a multimap structure refers to a map or associative array in which more than one value may be associated with and returned for a given key.

Preferably, the plurality of language models utilize a beginning-of-sequence marker to determine word or phrase predictions in the absence of any preceding text input and/or after end-of-sentence punctuation and/or after new line entry.

In an embodiment of the system described herein, each of the plurality of language models language using an approximate trie and an n-gram map, wherein the approximate trie is an extension of a standard trie, with a set of values stored at each node for all subsequently allowable character sequences from that node. Preferably, the language model is configured to conduct a search of the n-gram map to determine word or phrase predictions for a next term on the basis of up to n−1 terms of preceding text input. Preferably, the language model is configured to conduct a search of the approximate trie to ascertain word predictions based on at least one inputted character.

Additionally, the language model may include a candidate filter to narrow the predictions determined by the approximate trie, wherein the candidate filter is configured to discard all candidate strings for which the current input is not a substring. The language model may also include a mechanism to compute the intersection of the predictions determined by the approximate trie and optionally the candidate filter, and the n-gram map, by searching for and retaining only identifiers that are present in both prediction sets.

In an embodiment, the language model also includes a Bloom filter, comprising an n+1 gram map, which is configured to search the n+1 gram map to return a new prediction set based on a context of 1) the n−1 terms of preceding text input used to search the n-gram map, 2) the prediction terms in the determined intersection, and 3) an extra term of context, immediately preceding the n−1 terms used to search the n-gram map.

In an embodiment, the language model further includes a topic filter which is configured to predict topic categories represented in a current input text, predict topic categories for the terms in the prediction set and adjust the probability of the predictions in the prediction set based on the category and topic predictions.

Embodiments also provide a touch-screen interface that includes a single or multi-character entry mechanism, a word prediction pane, and a typing pane to display inputted text. Preferably, the interface includes a menu button which toggles the screen between prediction, numbers and punctuation, and further punctuation screens. Preferably, the interface includes a send button to send the inputted text to an email application. Preferably, the user interface is configured for word or phrase input, dependent on which term is chosen for input in a given sequence of words.

In one embodiment, the word prediction pane includes one or more word keys to present predicted words and wherein, in response to a word key press, the user interface is configured to display the word in the typing pane. The interface may further comprise a delete button and/or an undo button, wherein in response to a press of the undo button or a left-to-right gesture on the delete button, the interface is configured to undo the previous word selection, by erasing the word from the typing pane and returning to the previous prediction pane.

In one embodiment, the word prediction pane includes one or more word keys to present predicted words and wherein, in response to a word key press, the user interface is configured to display the word in the typing pane and pass the current input sequence including that word to the text prediction engine as a context input. Preferably, in response to a word key press and hold or left-to-right gesture on the word key, the user interface is configured to display the word in the typing pane, pass the current input sequence excluding that word to the text prediction engine as a context input, and pass the characters of that word to the text prediction engine as a current word input. Preferably, the interface further comprises one or more punctuation keys to present punctuation marks and a return key and wherein, in response to an end-of-sequence punctuation or 'return' key press, the user interface is configured to pass the current sequence to the text prediction engine, wherein the text prediction engine comprises a mechanism configured to tokenize the current sequence and pass the tokenized sequence to the user specific language model, and wherein the user specific language model is configured to assign numerical identifiers to the tokenized sequence and update its n-gram map.

In accordance with an embodiment, there is also provided a method for processing user text input and generating text predictions for user selection. The method includes the steps of receiving text input into a user interface, generating concurrently, using a text prediction engine comprising a plurality of language models, text predictions from the multiple language models, and providing text predictions to the user interface for user selection.

In an embodiment, each of the plurality of language models includes an n-gram map and an approximate trie and the method includes the step of conducting a search of the n-gram map to determine word or phrase predictions for a next term on the basis of up to n−1 terms of preceding text input.

In an embodiment, each of the plurality of language models comprises an n-gram map and an approximate trie and the method includes the step of conducting a search of the approximate trie to ascertain word predictions based on at least one inputted character. Preferably each of the plurality of language models comprises a candidate filter, the method further comprising narrowing the word predictions determined by the approximate trie by discarding all candidate strings for which the current input is not a substring.

Preferably, the language model comprises a mechanism to compute the intersection of the predictions determined by the approximate trie and optionally the candidate filter, and the n-gram map and the method includes the further step of computing the intersection of the predictions. More preferably, the mechanism searches for and retains only identifiers that are present in both prediction sets.

In an embodiment, the language model comprises a Bloom filter which comprises an n+1 gram map and the method includes the additional step of returning a new prediction set based on a context of 1) the n−1 terms of preceding input text used to search the n-gram map, 2) the prediction terms in the determined intersection, and 3) and extra term of context, immediately preceding the n−1 terms used to search the n-gram map.

In an embodiment, the language model further comprises a topic filter and the method includes the further steps of predicting topic categories represented in a current input text, predicting topic categories for the terms in the prediction set and adjusting the probabilities of the predictions in the prediction set based on the topic category predictions.

In a preferred embodiment, the plurality of language models includes a user specific language model based on an n-gram language model and the method includes the further step of updating the frequency of occurrence of n-gram paths, input by a user, in an n-gram map. Preferably, in response to the input of text which is not represented in the language model, the method includes the step of inserting new paths in the n-gram language model.

Preferably, the text prediction engine comprises a mechanism to combine the predictions generated from each language model and the method includes the further step of combining the predictions, which combination preferably includes inserting the predictions into an STL 'multimap' structure, and returning the p most probable terms for provision to the user interface.

There is also provided, in accordance with an embodiment, a computer program product including a computer readable medium having stored thereon computer program means for causing a processor to carry out embodiments of the method described herein.

Embodiments described herein have significant advantages over current technologies. While T9, iTap, SureType etc. are based on term dictionaries, the present system is based on adaptive probabilistic language model technology, which takes into account multiple contextual terms and combines information from multiple language domains in a mathematically well-founded and computationally efficient manner. The present text input system therefore provides a technical improvement that reduces the user labor aspect of text input.

In general, but not exclusive terms, the system of embodiments can be implemented as shown in FIG. 1. FIG. 1 is a block diagram of a high level text prediction architecture according to the invention. The system of the present invention comprises a text prediction engine 100 which generates concurrently text predictions 20 from multiple language models. In one embodiment, the system comprises a model 3 of a human language, in this embodiment the English language, and at least one language model 4 specific to an application, although in other embodiments only one of these need be present. In other embodiments, the human language model is of a language other than English. The language models are generated from language texts. Therefore, the model 3 of the English language is generated from English language text 1. The English language text 1 would usually, but need not, constitute a large corpus of English text, sourced from a wide variety of genres and language demographics. Similarly, an application specific language model 4 is generated from text 2 from that specific application.

By way of example only, if the system is a computer or similar device in which the target application is email, then the application specific language model 4 will be a model generated from email language text 2 comprising a large quantity of email messages from a wide variety of authors. Similarly, in the case of a mobile device, the application specific language model 4 will be generated from mobile SMS text language 2. In some embodiments of the system a plurality of application specific language models 4 are required, for example a mobile device can be used for emailing and SMS text messaging, thus requiring an SMS specific language model and an email specific language model. Another example of a system requiring a plurality of application specific language models 4 is that of a computer which can be used for word processing, emailing and sending SMS messages to mobile devices through the internet, thus requiring three application specific language models 4. Other combinations are, of course, possible, and further examples of application specific language models include language models generated from newswires, blogs, academic papers, word processing and patents.

In some embodiments, the system can further comprise additional language models 6. For instance, it might be efficacious to construct a company-specific language model for use within a particular organization. This may include organization specific language enabling prediction of preferred or standard wording, for example, during text input. However, it will be appreciated that the additional language models 6 can comprise any 'user community' specific language model. For example the 'user community' specific language model could comprise a local dialect or interest grouping specific language model.

The language models discussed so far are static language models. That is, they are generated from a representative body of text and thereafter are not changed. Of course, new language models can be created and used, but the existing ones in the system of the invention remain unchanged until replaced or removed.

The present system utilizes a mechanism 5, static pruning, across all static language models, to reduce the amount of information stored in the system. If duplicate or multiple (in the case of a system comprising three or more language models) entries are detected, the mechanism 5 'prunes' the language models by retaining only the most probable entry. Static pruning is described with reference to a single language model in a later section of the description.

The text prediction engine 100 operates to generate concurrently text predictions 20 from the multiple language models present. It does this by employing a multi-language model 8 (Multi-LM) to combine the predictions 20 sourced from each of the multiple language models to generate final predictions 9 that are provided to a user interface for display and user selection. The final predictions 9 are a set (i.e. a specified number) of the overall most probable predictions. The Multi-LM 8 generates the final predictions 9 by inserting the predictions 20 from each language model into an ordered STL 'multimap' structure.

An STL multimap is an associative key-value pair held in a binary tree structure, in which duplicate keys are allowed. The multimap can be used to store a sequence of elements as an ordered tree of nodes, each storing one element. An element consists of a key, for ordering the sequence, and a mapped value. In the STL multimap of the present system, a prediction is a string value mapped to a probability value, and the map is ordered on the basis of the probabilities, i.e. the probability values are used as keys in the multimap and the strings as values.

By way of example, given the predictions "a"→0.2 and "the"→0.3 from a first language model, and the predictions "an"→0.1 and "these"→0.2 from a second language model, the Multi-LM 8 inserts these predictions into a multimap ((0.1→"an"), (0.2→"a"), (0.2→"these"), (0.3→"the")), which is then read in reverse to obtain a set of final predictions 9.

In one embodiment, the system further comprises a user specific language model 7, which comprises a dynamic language model trained progressively on user input. The user input text stream 10 refers to the evolving text data generated by the user which is then fed back into the dynamic user specific language model as progressive training data. In response to the input of end-of-sentence punctuation or a 'return' character, the user inputted text sequence is passed to the Multi-LM 8 which splits the text sequence into 'tokens' as described later. The tokenized sequence data 12 is then passed to the user specific language model 7. The updating of a dynamic language model is described in a later section of the description, with reference to the structure of a single language model.

By updating the user specific language model 7, the language model evolves with user input 10, thereby providing a feedback loop in which predictions generated by the user specific language model 7 depend on the selection by the user of previous predictions 9 generated by the text prediction engine or the addition of words initially absent from the system (which are input by character entry).

Thus the present system utilizes two types of language models, static and dynamic. The user specific language model 7 is an example of a dynamic language model.

The system of the present invention is built around the principle of predictive language model inference, in which the probability of a particular term is estimated given a particular context, P(term|context), for all terms in the language. The probabilities are estimated from data observed in training and through dynamic usage of the system. Here, "context" denotes both the terms that have occurred previously in the sequence, as well as any knowledge the system has about the current term (e.g. it starts with a specific character or characters, or it is indicative of a certain topic). Given a particular context, the system predicts the words that are most likely to follow by using estimates of probabilities, P(term|context).

The text prediction engine has the capability of performing phrase-level prediction. For instance, if it is to predict the next two terms, it requires an estimate for P(term1, term2|context) which can be rearranged as P(term1|term2, context)*P(term2|context). P(term1|term2, context) is just P(term1|context2), which is a probability in the format P(term|context), for which it has estimates. P(term2|context) is also in the format P(term|context), for which it has estimates. Therefore, the text prediction engine has the necessary information to perform phrase-level prediction.

Phrase-level prediction significantly increases the upper-bound computational cost, as the predictive text engine must now search in the space of combinations of terms ($O(n^m)$ where m is the length of the phrase), but the present system utilizes effective methods of rendering the computational cost manageable.

The system limits the space of combinations of terms (i.e. the space of potential phrase predictions) to a tiny fraction of the full $n^m$, thus reducing the computational costs. To do this, given a predicted term $t_i$, the ith term in a predicted phrase, a following term $t_{i+1}$ is only predicted if the joint probability $P(t_0, t_1 \ldots, t_i)$ exceeds the value of the lowest probability in the current prediction set. The joint probability estimate is obtained by multiplying together each of the individual component probabilities, thereby requiring that a high degree of certainty be attained before a phrase prediction is made. Further phrase-level predictions will not be made if the joint probability falls below a threshold value.

The generation of predictions from an individual language model is now described with reference to FIG. 2, which is a block diagram of a language model of the prediction architecture according to an embodiment.

There are two inputs into a given language model, a current term input 11 and a context input 12. The current term input 11 comprises information the system has about the term the system is trying to predict, i.e. the term the user is attempting to enter. This could be a sequence of multi-character keystrokes, individual character keystrokes or a mixture of both. For example, if the user was attempting to enter the term "overt", and had input two keystrokes on a multi-character keyboard, the current term input 11 might be the set {o/p, v/x/z}, indicating that the 2-character-key o/p and the 3-character-key v/x/z had been used.

Figure 3:
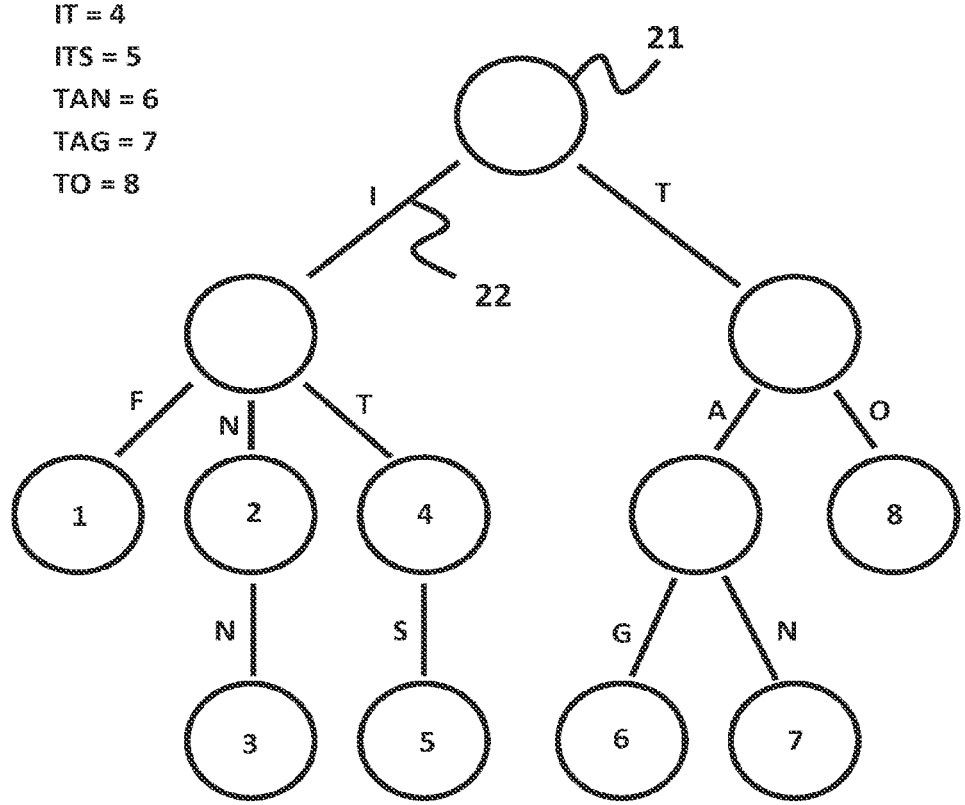
FIG. 3 is a schematic of a standard trie.

Each language model utilizes an approximate trie 13 to generate word predictions based on the current term input 11. An approximate trie 13 is an extended version of a standard trie. A standard trie, or prefix tree, as is known in the art, is an ordered tree-like data structure used to store an associative array of character sequences. An example of a standard trie, used to store a small set of text strings, is illustrated in FIG. 3. Each node 21 contains a pointer 22 to subsequent nodes. Terminal nodes (i.e. nodes which end a word) also contain a value associated with the current path. In a trie, as depicted, characters associated with a given node are ordered alphabetically and the nodes are assigned values according to the alphabetical ordering of the paths. The number of paths from each node is upper bounded by the number of characters in the alphabet. Standard tries facilitate rapid retrieval with efficient storage overheads.

Figure 4A:
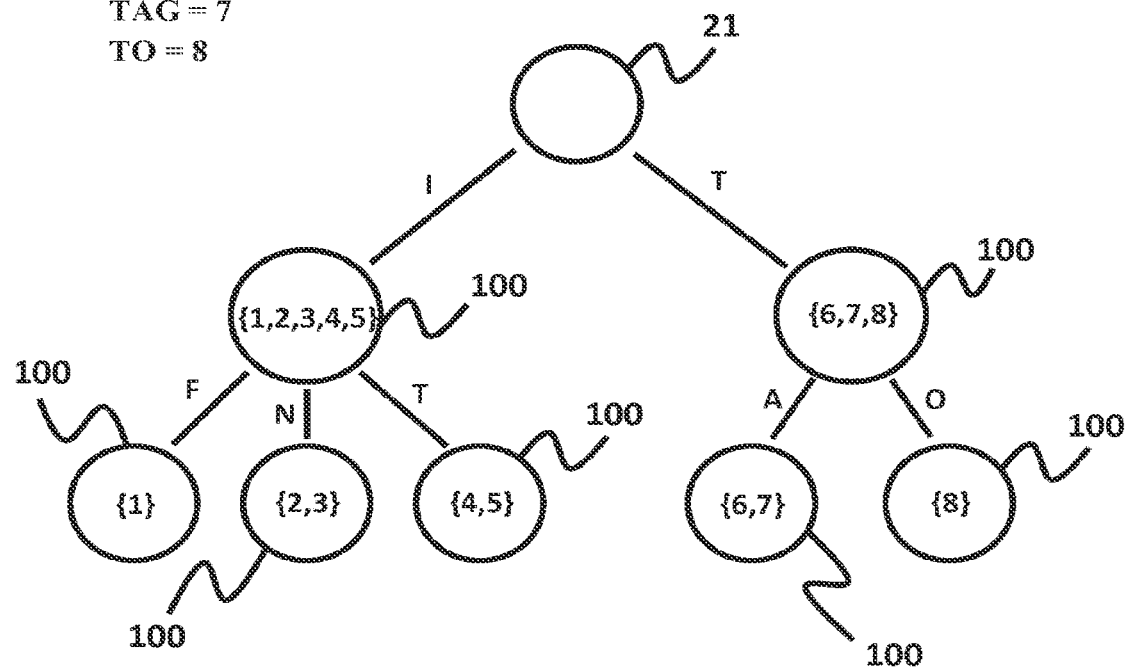
FIG. 4 is a schematic of an approximate trie.
Figure 4B:
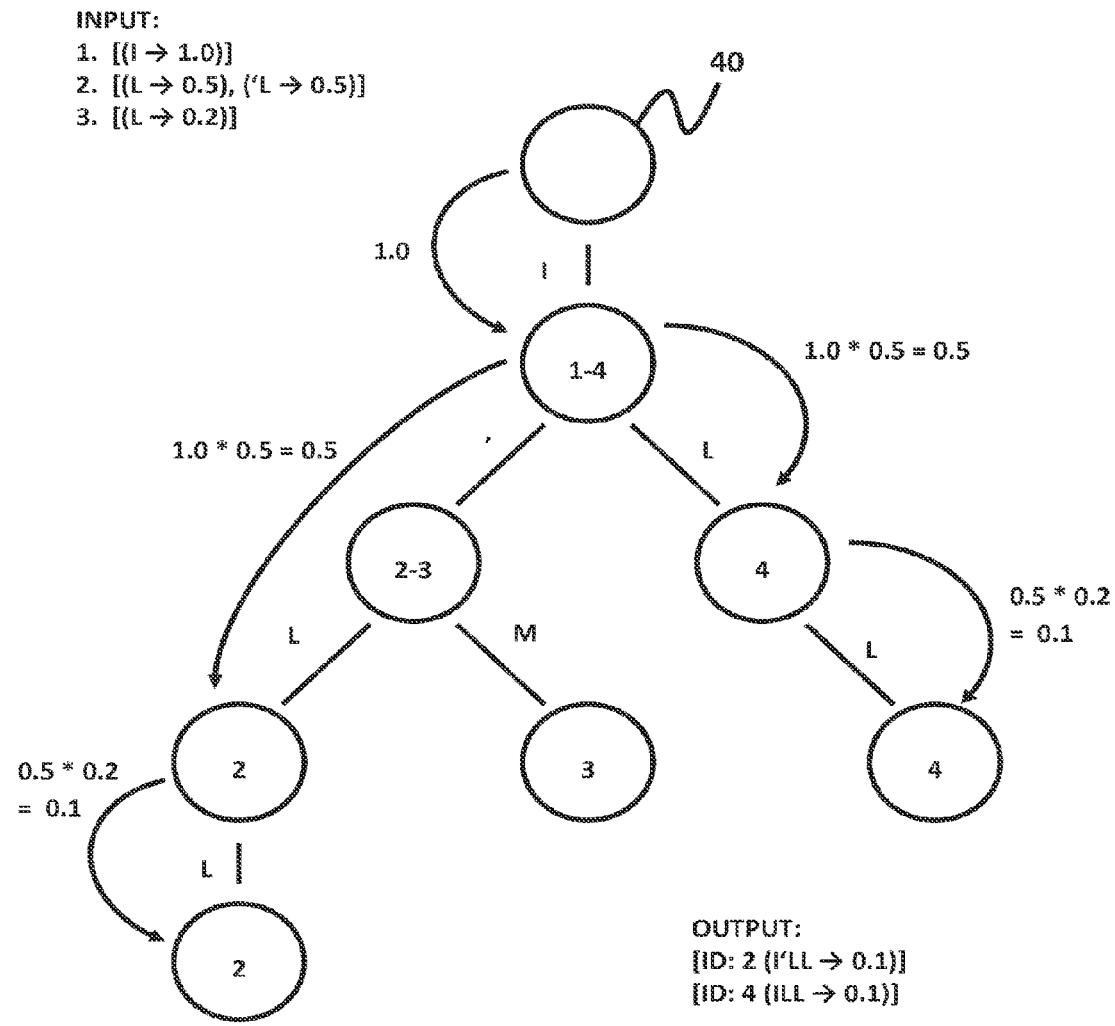
Figure 4C:
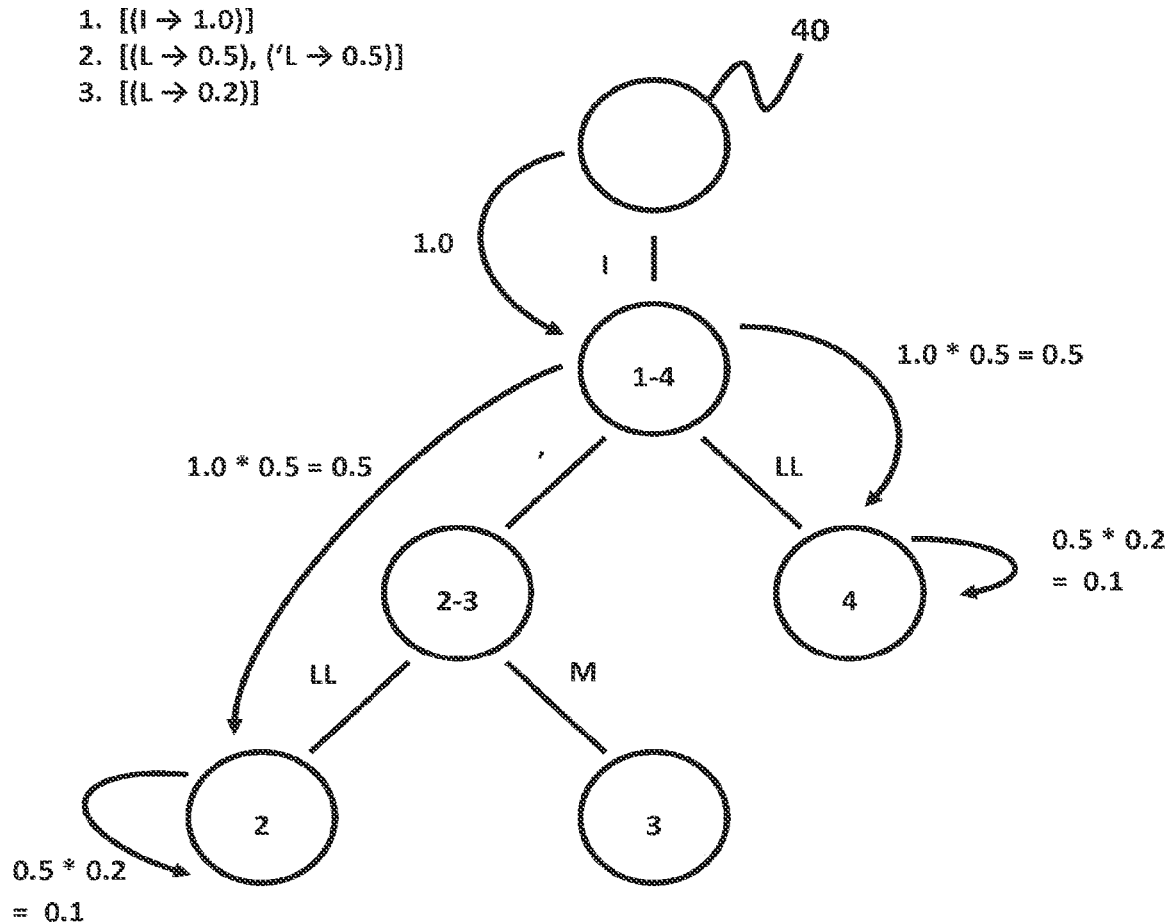

FIG. 4 illustrates an approximate trie 13 according to the invention and used to store the same set of text strings as the standard trie of FIG. 3. Instead of storing a single value at each node 21 associated with a path, an approximate trie 13 stores a set of values for all subsequently-allowable sequences. This extension from a standard trie optimizes computational efficiency and memory overheads. It enables the text prediction engine to rapidly identify all sequences that could follow from a given prefix. It also allows the text prediction engine to specify a maximum depth for the internal tree and still guarantee that for any given sequence, if a specified character sequence and associated value was added to the trie then the set of returned values when searching for the given sequence will necessarily contain the respective value.

By way of example, the term "investigate", mapped to numerical identifier '9', can be added to an approximate trie of depth 4 in a language model. The language model will initially follow, in the approximate trie, the path to the node represented by the character 'i' and add the identifier '9' to the set of values at that node (because each node stores a set of values for all subsequently-allowable sequences). It will then follow the path to the node represented by 'n' and add '9' to its values, and the same for 'v', and 'e', at which point the maximum depth has been attained and so the procedure terminates. Subsequently, if "investigate" is being searched for by a language model, the language model will conduct a binary search of the approximate trie to follow the path 'i'→'n'→'v'→'e' and then return the set of values at the node representing 'e', which will necessarily contain the value '9'. However, the set of values at the node representing 'e' will also contain values for any other strings that have also been inserted and begin with "inve".

Hence, the language model cannot guarantee that additional sequence values that are not compatible with a specified search sequence will not be returned, when the current term input exceeds the maximum depth of the approximate trie. Hence, the extension from a standard trie is named as an 'approximate trie', because interrogation returns an approximation to the true set of associated values.

Reverting to FIG. 2, a candidate filter 15 can be applied by the language model to narrow the set of predictions returned from the approximate trie 13 so that it contains only identifiers for candidates that are truly allowed by the current word input. Candidate filtering is only necessary when the length of the current input exceeds the maximum depth of the approximate trie, which, to be of any use, must be at least 1, and values of around 3-5 are usually appropriate. Even then, however, it need not be used. The depth of the approximate trie is specified a-priori for each language model. The candidate filter looks up the actual candidate term string values represented by the numerical identifiers in the set of numerical identifiers returned by the approximate trie and processes them one-by-one, comparing each with the current input. For a given candidate string s, if the current input is not a substring of s then it is discarded as not a true candidate.

The context input 12 comprises the sequence entered so far by the user, directly preceding the current word. This sequence is split into 'tokens' by the Multi-LM 8, where a token is an individual term, punctuation entity, number etc. The Multi-LM 8 feeds the tokenized sequence data 12 into each language model as a context input. If the system is generating a prediction for the nth term, the context input 12 will contain the preceding n−1 terms that have been selected and input into the system by the user.

Figure 5:
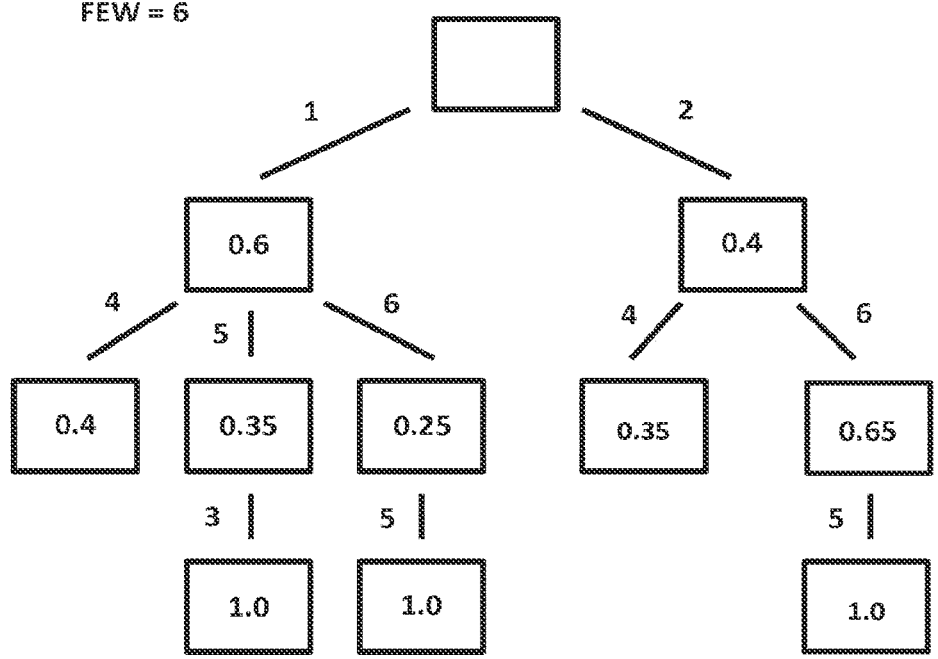
FIG. 5 is a schematic of an n-gram map.

The language model utilizes an n-gram map 14 to generate word and/or phrase predictions based on the context input 12. An n-gram map is an associative map structure, as schematically shown in FIG. 5. In the n-gram map 14, terms in the vocabulary are associated with numerical identifiers (short integers) which are stored in the map and associated with probability values. The combined probabilities of child nodes for a single parent always sum to 1. Identifiers are assigned to terms such that the resulting ordering is from most-to-least frequent, as estimated from the training data used to train each language model. Therefore, the identifiers define an ordering by P(term), which is the unigram probability of terms in the language. This is important because it optimizes the efficiency at which the text prediction engine can conduct n-gram retrieval, by making the approximation P(term|context)~P(term). This approximation is made by ordering the terms at a given n-gram map level by P(term) rather than their true probabilistic ordering which would be P(term|context).

In the present system, n-gram probabilities are stored in a highly compressed and computationally-efficient manner to facilitate wide coverage and rapid access on memory-limited devices. The probability values are compressed, preferably, according to the (lossy) discretization procedure, in which the values are discretized and spread over the range of values available in a single byte of memory. Given a true probability value p, the following formula is used to map it into a single byte of memory: $b=int(abs(log(p))*10)$, where $int(x)$ yields the rounded integer part of real-valued x, and $abs(x)$ yields the absolute value of x.

The n-gram maps can be further compressed by representing string values as short-integer-valued numerical identifiers and by storing higher-order entries "on top of" lower-order entries. So, for example the trigram "in the morning" is stored in the same location as the bigram "in the", but with a link to the additional n-gram head term "morning", i.e. by storing a set of numerical values (identifiers) for all subsequently-allowable sequences at each node in the n-gram map.

To generate predictions from an n-gram map 14, at each map node 21 the language model conducts a binary search to locate specified subsequent child nodes. For example, if the context comprises term1 and term2, the language model will first locate the node for term1. Term2 is then the specified child node that will be searched for. To facilitate this search, child nodes are ordered numerically by their identifiers at each parent node. The node that is being searched for may contain a large number of children, but it is only the high probability candidates that are of interest. Because the nodes are automatically ordered by P(term), the language model can be configured to return only the first k children, where k is a preset value. This method assumes that the highest probability candidates under P(term|context) will reside in the set of the k highest probability candidates under P(term), as long as k is large enough. It is not feasible to order child nodes by P(term|context) as this would require a different map ordering for every node and vastly increase memory overheads.

The generation of predictions from an n-gram map 14 is described further in the following illustrative example. If the language model is searching for the highest probability term candidates, given the two context terms "in" and "the", the language model will search for the terms t that maximize the trigram (3-gram) probability P(t|in the). The language model first looks up the identifier for "in" and then conducts a binary search in the first level of the map to locate the identifier (if it exists). Following from the "in" node, the language model looks up the identifier for "the" and conducts a search to locate it in the next map level. It is likely that this node has many children because "in the" is a common prefix, so the language model is configured to return the identifiers for the first k children (inversely ordered by P(term)), which might correspond to terms such as "morning", "first", "future", "next", "same" etc.

The n-gram map structure described thus far is used in static language models. Static language models are immutable once they have been constructed and directly store compressed n-gram probabilities; they are generated from pre-existing data and are then compiled into binary format files which can be read at run-time.

Conversely, dynamic language models, such as the user specific language model 7, can be updated at any point, and predictions from this type of model are constantly changing as new data is processed.

A dynamic language model is updated in one of two ways: to include a term which is not previously present in a dynamic language model vocabulary; and to update the frequency of an existing term in a particular n-gram context. The dynamic n-gram map stores the frequency at which n-gram paths are input by a user, wherein an 'n-gram path' refers to a particular term and up to n−1 terms of preceding context.

For a current term t, current context c, and dynamic language model D, if t does not exist in the vocabulary of D, then the dynamic language model D maps the term t to a new identifier and inserts it into the approximate trie. To enter a term which does not exist in the vocabulary of the language model D, a user can insert the term by inputting it character-by-character into the user interface of the system. The dynamic language model D then follows the path represented by term t and its context c in the n-gram map and new nodes are created if they do not already exist, thereby creating new n-gram paths in the language model dependent on the preceding context c of the current term t. Paths are added to the dynamic n-gram map for varying context lengths, from no context to n−1 terms of context, where n is the maximum n-gram order for the language model. When a user enters the term t at a later time, the language model D increments a count value stored at the node, of the n-gram map, representing the term t by one, and increments the total value of its parent node by one also. In this way, the frequency of input of the n-gram paths comprising a term t and its varying context, from no context to n−1 terms of context, are updated in the n-gram map.

Figure 6:
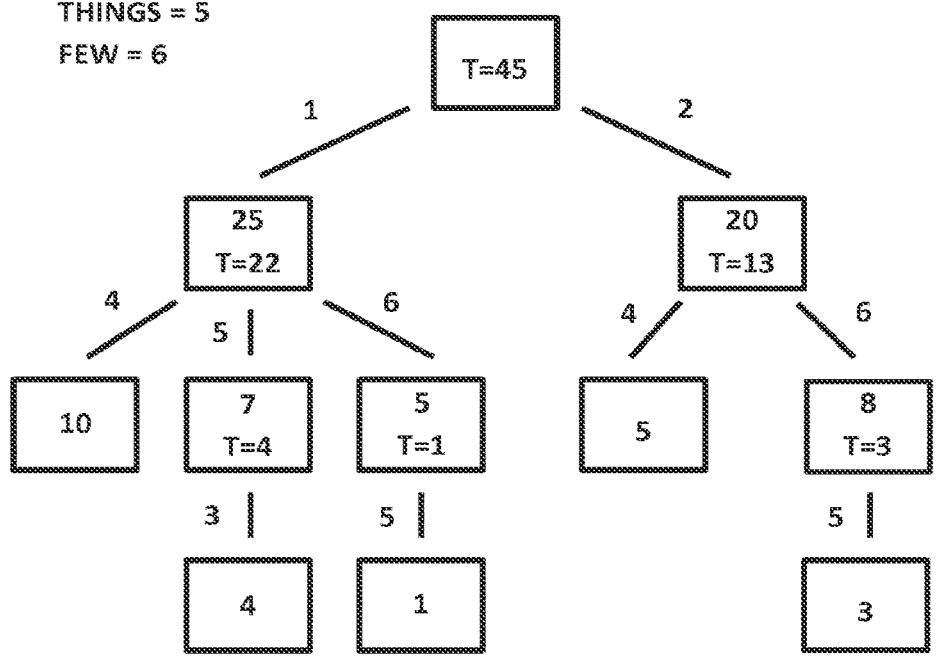
FIG. 6 is a schematic of a dynamic n-gram map.

The n-gram probabilities of a dynamic language model are not stored directly, rather frequency statistics are stored. An example of a dynamic n-gram map is shown in FIG. 6. Each node stores a frequency value, rather than a probability, along with a combined frequency for its children (denoted by "T="). Probabilities are computed on-the-fly from these frequency values by dividing the count for a particular term by the total value at its parent node. Preferably, a smoothing constant is added to each parent total to avoid unreasonably high estimates for sparse events. The higher the value chosen for the constant, the more slowly the probabilities from the user specific language model will increase (because the probability for a particular term is determined by dividing its count by the value of its parent node). In a preferred embodiment, a smoothing constant of 500 is chosen. However, it will be appreciated that the value of the smoothing constant is a matter of choice.

The advantage of the dynamic language model structure is that it allows rapid updating. However, the disadvantage of this type of language model is that its memory and computational requirements are significantly higher than in its static counterpart.

As stated previously, each language model has two input feeds, the current word input 11 and the context input 12. In order to generate a single set of predictions 20 for a given language model, the language model must compute the intersection of the set of candidates returned by the approximate trie 13 and optional candidate filter 15, and that returned by the n-gram map 14. A set of candidates is represented by a set of numerical identifiers. To compute the intersection of the set of candidates returned by the approximate trie and the n-gram map, an intersection mechanism 16 first determines which of the two sets is smaller. The smaller set of identifiers is used as a base set. The mechanism 16 iterates through the base set of identifiers and looks up each identifier in the base set in the other set. If a match is found for the identifier in question, the intersection mechanism 16 places the identifier in a new set which represents the intersection between the two sets.

The language model can be configured to apply one or more filters to the predictions generated by the intersection mechanism 16. In one embodiment, the first filter that is applied is a bloom filter 17, which is followed by a topic filter 18 and optionally additional filters 19 to generate the output predictions 20 for a given language model. However, in other embodiments the ordering of the applied filters or the types of applied filter can be changed.

A Bloom filter 17 is a randomized data structure used to store sets of objects in a highly efficient manner using bit-arrays and combinations of hash functions. The present system uses an implementation of a multi-bit-array Bloom filter 17 to reorder prediction candidates, generated at the intersection 16, on the basis of higher-order n-gram statistics which for memory reasons cannot be stored in the n-gram map 14. The present system utilizes a technique for associating n-grams 14 with probability values in the Bloom filter 17. A technique to associate Bloom filter entries with probability values is disclosed in Talbot and Osborne, 2007, Proceedings of the 2007 Joint Conference on Empirical Methods in Natural Language Processing and Computational Natural Language Learning, pp. 468-479.

For a given set of prediction candidates and a certain number of context terms, the Bloom filter 17 reorders the predictions to reflect new probabilities. The present system utilizes a log-frequency Bloom filter (Talbot and Osborne) which maps a set of n-gram entries to respective probability estimates. In the present system, the language model generates a set of predictions P based on a set of up to n−1 context terms C. A log-frequency Bloom filter F, which associates n+1-gram term sequences with probability estimates, can be used to generate a new prediction set in which the previous predictions are reordered. For each term prediction t in P, the language model is configured to search F based on a context of c+C+t to yield a new probability value v, wherein C comprises the n−1 terms of preceding text input used to search the n-gram map; t comprises the term predictions in P (those in the determined intersection); and c comprises an extra term of context, immediately preceding the n−1 terms used to search the n-gram map. Therefore, the n+1-gram map of the Bloom filter is searched for each n+1 term sequence, c+C+t, to determine whether that n+1-gram path exists and, if so, the probability associated with that path. A new prediction set is then constructed using the new probabilities. In general, if p is the final number of predictions requested, then the filtering process will operate on a number greater than p (specified a-priori) so that the reordering process may result in a different set of predictions returned to the user.

In some embodiments, the language model can be further configured to apply a topic filter 18. N-gram statistics yield estimates of prediction candidate probabilities based on local context, but global context also affects candidate probabilities. The present system utilizes a topic filter 18 that actively identifies the most likely topic for a given piece of writing and reorders the candidate predictions accordingly.

The topic filter 18 takes into account the fact that topical context affects term usage. For instance, given the sequence "was awarded a", the likelihood of the following term being either "penalty" or "grant" is highly dependent on whether the topic of discussion is 'football' or 'finance'. Local n-gram context often cannot shed light on this, whilst a topic filter that takes the whole of a segment of text into account might be able to.

The function of the topic filter is to accept a set of predictions and yield a variant of this set in which the probability values associated with the predicted terms may be altered, which may consequentially alter the ordering of predictions in the set. Given an input prediction set P and current input text T, the topic filter carries out the following operations: predict a weighted set of categories representing the most probable topics represented in T; predict a weighted set of topic categories for the terms/phrases in P; and modify P such that the probabilities of predictions with similar topic categories to T are inflated relative to those with dissimilar topic categories.

The prediction of topic categories for an arbitrary segment of text is accomplished through the machine learning paradigm of classification, which consists of a framework within which a mechanical 'learner' induces a functional mapping between elements drawn from a particular sample space and a set of designated target classes (see B. Medlock, "Investigating Classification for Natural Language Processing Tasks", for a more detailed introduction to classification concepts and methods).

A classifier is employed in the topic filter 18 based on the principle of supervised learning in which a quantity of training data must first be collected and assigned labels representing topic categories. From this data, the classifier learns to infer likely topic category labels for new data. In the present case, an individual data sample is a segment of text. For instance, when building a classifier to label data in the news domain, a collection of news stories is required where each is pre-assigned topic category labels representing its dominant topic(s), e.g. 'sport', 'finance', 'entertainment' etc. The set of topic categories is pre-defined, and may be hierarchical, e.g. 'football' might be a subcategory of 'sport'.

Once the classifier has been trained on pre-existing data, it is able to predict the most likely topic categories for a new segment of text, along with a numerical value for each prediction representing the degree of confidence with which the prediction has been made. For example, given the following text segment, "David Beckham will stay at AC Milan until the end of the season after a 'timeshare' deal was finally agreed with Los Angeles Galaxy", a trained classifier might yield the following category predictions 'sport'→0.8; 'finance'→0.3, wherein the numerical values represent the confidence that the classifier has in that particular prediction. The numerical values can be interpreted as an estimate of the level of representation of that particular topic in the given text segment.

The prediction of topic categories for individual terms/phrases from the prediction set P can be carried out in the same manner as for input text segments, using the classifier. This yields a set of weighted topic category predictions for each term/phrase prediction in P.

The modification of prediction probabilities in P requires the definition of a 'similarity metric' between topic category prediction sets. This takes the functional form: sim(S, S')=v, where S and S' are topic category prediction sets and v is the real-valued output from the function sim, representing the degree of similarity between S and S'. There are many different methods of implementing sim and any one is appropriate. For instance, the topic category prediction sets can be interpreted as vectors in an m-dimensional space where m is the number of topic categories. Under this interpretation, the weight assigned by the classifier to a particular category c is the extension of the vector in the c-dimension. Well-established techniques can be used for estimating vector similarity, e.g. by applying magnitude normalization and taking the inner (dot) product.

Once the similarity metric has been defined, the final stage within the topic filter 18 is to use the similarity values to modify the probabilities in P. A number of techniques can be chosen for accomplishing this, but one possibility is to inflate the probabilities in P by a small value in inverse proportion to their rank when ordered by topic similarity with T, for instance in accordance with the formula, $p_{final}=p_{initial}+k/r$, where p is the prediction probability drawn from P; r is the rank of the term associated with p, when ordered by $sim(S_p, S_T)$ (rank 1=highest similarity); and k is a pre-defined constant.

The language model architecture of the present system is configured such that any number of additional filters 19 can used to reorder candidate probabilities. At each stage, the language model will already possess a candidate prediction set, and if a threshold on computation time is exceeded, the candidate set can be returned and additional filters 19 can be easily bypassed.

The language model returns its predictions 20 as a set of terms/phrases mapped to probability values. As explained in the discussion of FIG. 1, the output predictions 20 from each language model are aggregated by the multi-LM 8 to generate the final set of predictions 10 that are provided to a user interface for display and user selection.

From FIG. 2, it can be seen that in the absence of a current word input 11, the predictions are based on a context input only 12.

In some embodiments, the system can use beginning of sequence markers to generate a list of word or phrase predictions 9 in the absence of any preceding user input, enabling a user to select a word or phrase to commence the input of a sentence. The system can also use "beginning-of-sequence" (BOS) markers to determine word or phrase predictions after end-of-sentence punctuation and/or after new line entry.

The language models use BOS markers which are used as context 12 in the absence of any preceding user input. In the absence of preceding user input, the language models will generate certain terms such as "Hi", "Dear", "How", "I" etc. because they are more likely than high probability unigram terms such as "of", "to", "a" etc. The predictions from each language model 20 are based on BOS markers. One of the entries in the first level of the n-gram map will be the BOS marker, and this will be used as context in exactly the same way as standard input terms, e.g. if the BOS marker is TA' then the n-gram map might contain (amongst others) the following paths: "^ Dear"→0.2; "^ Hi"→0.25; "^ How"→0.1; and "^ I"→0.15. Preferably, BOS markers are automatically inserted into the context when a user enters end-of-sentence punctuation (period, exclamation mark, question mark) or enters the 'return' character.

As the user specific language model 7 is a dynamic language model, over time it will learn a user's language style, thereby generating predictions that are more likely to reflect a particular user's language style. However, if the text prediction engine generates a list of word or phrase predictions 9 which fails to include the word desired by the user, the user can tailor the list of words or phrases generated by the text prediction engine by inputting a character 11 through the user interface. The language model then utilizes an approximate trie 13, along with an n-gram map, to generate a list of word predictions based on the current word input 11.

As stated previously, with reference to FIG. 1, the present system utilizes a mechanism 5, static pruning, across all static language models, to reduce the amount of information stored in the system. In the following section static pruning is described in relation to the pruning of a single language model.

Given two language models L1 and L2, the pruning of L1 is achieved by comparison to a reference language model, L2. Each language model comprises an n-gram map, in which terms in the vocabulary are associated with numerical identifiers which are stored in the map and associated with probability values. Because identifiers are assigned to terms such that the resulting ordering is from most-to-least frequent, the identifier that is assigned to a given term in one language model does not necessarily match the identifier assigned to the same term in a different language model. Therefore, to achieve static pruning, the static pruning mechanism 5 generates a conversion table between the vocabulary identifiers in L1 and the vocabulary identifiers in L2. The conversion table maps the identifier for a given term t in L1, to the identifier for the term t in L2. For example, if the term "the" is identified by the numerical identifier 1 in L1 and the identifier 2 in L2, then given the identifier 1 for L1, the conversion table will yield the identifier 2 for L2.

The static pruning mechanism 5 traverses the n-gram map of L1 such that each node is visited exactly once. For each path followed in L1, the corresponding path is attempted in L2 by using the conversion table to convert the path identifiers in L1 to those of L2. The static pruning mechanism 5 conducts a binary search to locate specified subsequent child nodes. For example, if the context comprises term' and term2, the static pruning mechanism 5 will first locate the node for term'. Term2 is then the specified child node that will be searched for. By conducting such a search in L2, identical paths can be identified. If no identical path exists in L2, the static pruning mechanism 5 moves on to search in L2 for the next path of L1. If an identical path exists in L2, then the static pruning mechanism 5 makes a comparison of the probabilities at each node. If the L1 probability is smaller than the L2 probability, and the node is terminal, then the static pruning mechanism 5 removes this node from L1.

Figure 7:
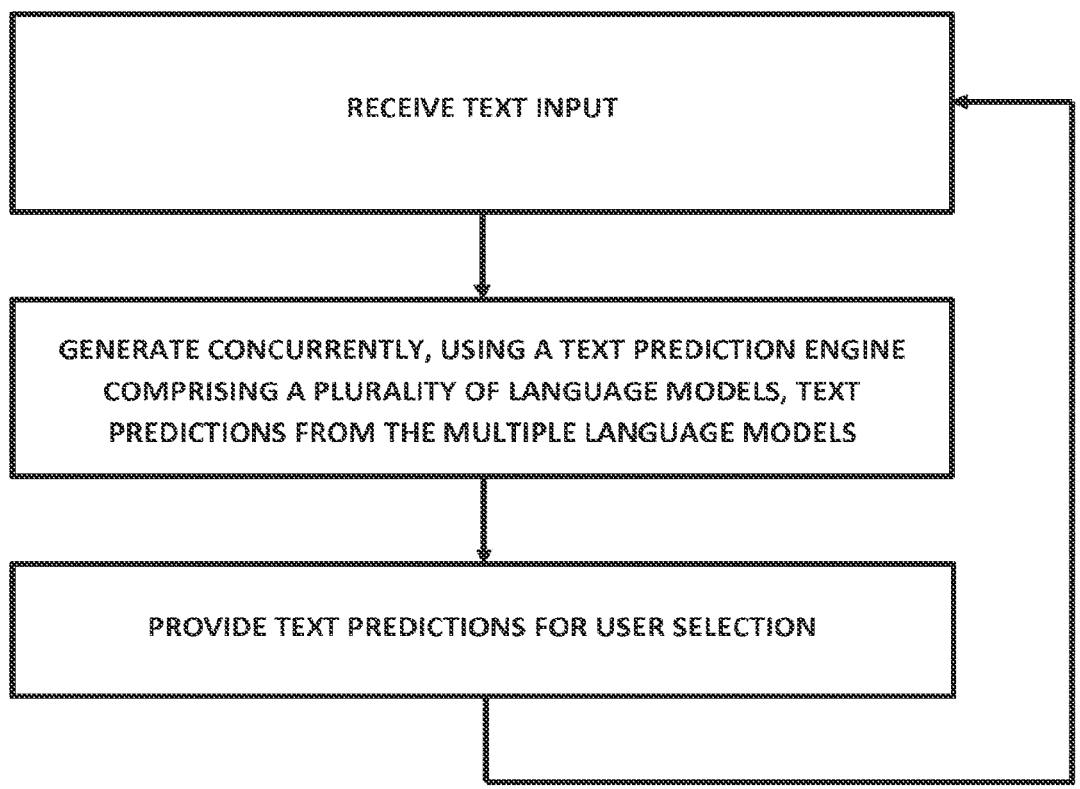
FIG. 7 is a flow chart of a method for processing user text input and generating text predictions for user selection according to an embodiment.

A method according to the present invention is now described with reference to FIG. 7 which is a flow chart of a method for processing user text input and generating text predictions. In the particular method described, the first step comprises receipt of text input. Analogous to the foregoing discussion of the system according to the present invention, the text input can comprise current word input 11 and/or context input 12. Therefore, the input stream can comprise character, word and/or phrase inputs and/or punctuation inputs. In embodiments where the predictive text engine also predicts punctuation, the punctuation items are stored in the n-gram maps with the text terms. Single punctuation items ('!', '?') and blocks of punctuation ('!!!!!!!', ' . . . ') are handled as single prediction units.

The method further comprises the steps of generating concurrently, using a text prediction engine comprising a plurality of language models, text predictions from the multiple language models; and providing text predictions for user selection. As shown in the flow chart of FIG. 7, a loop is formed when a user inputs a sequence because this sequence, which may include terms selected from previous prediction sets, is used to update the dynamic language model which contributes to the next set of predictions 9. The loop is formed by the insertion of an end-of-sequence punctuation mark, or a 'return' keypress for example. Hence, predictions are constantly updated based upon previous sequence inputs.

By way of an example, say a user has already entered the sequence "Hope to see you" and is intending to enter the terms "very" and "soon" in that order. The final prediction set 9 that is provided by the text prediction engine 100 to a user interface for display and user selection, may comprise 'all', 'soon', 'there', 'at', 'on', 'in'.

The intended next term "very" is not in the currently-predicted list of terms. The user can enter multi-character 'v/x/z' input to prompt the predictive text engine 100 to provide more relevant predictions. The information about the current context "Hope to see you" and the currently-entered multi-character 'v/x/z' is passed to the text prediction engine 100 where the Multi-LM 8 tokenizes the context and adds the beginning-of-sequence marker '^': "Hope to see you"→"^" "Hope" "to" "see" "you".

The Multi-LM 8 then passes the tokenized sequence data 12 and the multi-character current input 11 to each of the language models. Each language model receives a copy of the current input 11 and the tokenized context 12.

Within each language model, the current input is fed into the approximate trie 13, which in this case returns the set of identifiers for all vocabulary terms that begin with either 'v' or 'x' or 'z'. It accomplishes this by following the initial paths to the nodes corresponding to the characters 'v', 'x' and 'z', concatenating the identifier value sets found at each node and returning the combined set. This set of identifiers can then be narrowed using a candidate filter 15. However, in the present example, no filtering is required because the length of the current input will be less than the maximum depth of the approximate trie. Candidate filtering is only necessary when the length of the current input exceeds the maximum depth of the approximate trie, which as noted previously, to be of any use, must be at least 1, and usually around 3-5. The depth of the approximate trie is specified a-priori for each language model.

Using the tokenized context 12, the n-gram map 14 is queried by the language model for a given n-gram order, i.e. a number of context terms. Each language model contains n-grams up to a maximum value of n. For example, a particular language model may contain 1, 2 and 3-grams, in which the maximum n-gram order would be 3. The system begins by taking the largest possible amount of context and querying the n-gram map to see if there is an entry for the path representing that context. So, for example, if a given language model has a maximum n-gram order of 3, in the present example, the system would begin by searching for the path corresponding to the context phrase "see you". The system then extracts the first k children of the node corresponding to this path, where k is an a-priori parameter of the system. In static language models, each child node contains a term identifier and a compressed probability value that can be extracted directly for use in prediction ordering. In dynamic language models, the node contains a frequency value which must be normalized by its parent 'total' value to yield a probability.

Given a set of identifiers from the approximate trie 13 and the n-gram map 14, the intersection is computed by an intersection mechanism 16. If the number of predictions in the resulting set is less than p, or some multiple of p (where p is the required number of predictions), the system continues to look for further predictions by returning to the n-gram map 14 and considering smaller contexts. In this example, if the context "see you" did not yield enough predictions, the system would consider the context "you" (second level in the n-gram map), and if that still did not yield the required number, the system would revert to an empty context (first level in the n-gram map).

In the present example, the system has previously searched for the path corresponding to the context phrase "see you". At this stage, the language model has obtained a set of predicted terms which are compatible with the context and the current input, ordered by their respective probability values, as extracted from the n-gram map. For example, the prediction set may comprise the identifiers corresponding to the terms "very", "visit" and "x". A new prediction set is generated, with the previous predictions re-ordered, by using the Bloom filter component 17. In this case, the Bloom filter might contain 4-gram sequences associated with probability estimates. The language model would query the Bloom filter using a new context comprising the previous context used to search the n-gram map ("see you"), the set of current predictions ("very", "visit" and "x"), and optionally, an extra context term (in this case "to"). Hence, in this example, the Bloom filter would be queried using the following sequences: "to see you very"; "to see you visit"; and "to see you x".

The probabilities mapped to the terms "very", "visit" and "x" in the current prediction set would then be replaced by the values returned from the Bloom filter and consequentially reordered. Additional filters would operate in a similar manner. In general, if p is the final number of predictions requested, then the filtering process would operate on a number greater than p (specified a-priori), such that the reordering process may result in a different set of predictions returned to the user.

Once all filters have been applied, a set of predictions (terms+probability values) 20 is returned by each individual language model to the Multi-LM 8, which then aggregates them by inserting all predictions into an STL multimap and choosing the p most probable and returning them as the final prediction set 9. In our example, the prediction set 9 presented to the user might be 'very', 'via', 'visit', 'view', 'x'.

The intended term "very" now appears on the prediction list and can be selected. Once selected, the context, now including the term "very", becomes "Hope to see you very" and the current input is empty. The preceding method steps are iterated in the same manner, except that this time the approximate trie is bypassed (because there has been no character entry, i.e. no current word input), and the prediction candidate set is drawn solely from the n-gram map. This might yield the following prediction set 'much', 'soon', 'good', 'many', 'well'.

The term "soon" occurs in the prediction set, so the user can select it, and once again the context is updated, this time to include the new term, "Hope to see you very soon", and the current input is set to empty. This process continues to iterate as input progresses.

When the user ends a sequence by pressing 'return' or an end-of-sequence punctuation term, the user interface is configured to pass the current sequence to the text prediction engine 100, wherein the Multi-LM 8 is configured to 'tokenize' the current sequence which it then passes to the user specific language model 7. The dynamic language model 7 assigns numerical identifiers to the tokenized input 12 and updates the n-gram map 14. Using the same example, consider that the user subsequently adds an exclamation mark at the end of the sequence to yield: "Hope to see you very soon!". The following stages would occur: The Multi-LM 8 tokenizes the sequence and inserts the BOS marker, "Hope to see you very soon!" becomes, for example, "A" "Hope" "to" "see" "you" "very" "soon" "!"; and for each term in the sequence (and its respective context), the dynamic language model adds n-gram paths to the dynamic n-gram map constituting varying context lengths, from no context to n−1 terms of context, where n is the maximum n-gram order for the language model. For instance in the case of the above example, assuming n=4, the following paths would be added:

"^"
"Hope"
"A" "Hope"
"to"
"Hope" "to"
"A" "Hope" "to"
"see"
"to" "see"
"Hope" "to" "see"
"A" "Hope" "to" "see"
"you"
"see" "you"
"to" "see" "you"
"Hope" "to" "see" "you"
"A" "Hope" "to" "see" "you"
"very"
"you" "very"
"see" "you" "very"
"to" "see" "you" "very"
"soon"
"very" "soon"
"you" "very" "soon"
"see" "you" "very" "soon"
"!"
"soon" "!"
"very" "soon" "!"
"you" "very" "soon" "!"

For each n-gram path, the dynamic language model 7 increments the frequency value of the corresponding node by one, and also increments the total value for the parent by one. If a given term does not exist in the dynamic language model vocabulary, it is added by the language model, and assigned a new identifier.

Figure 8:
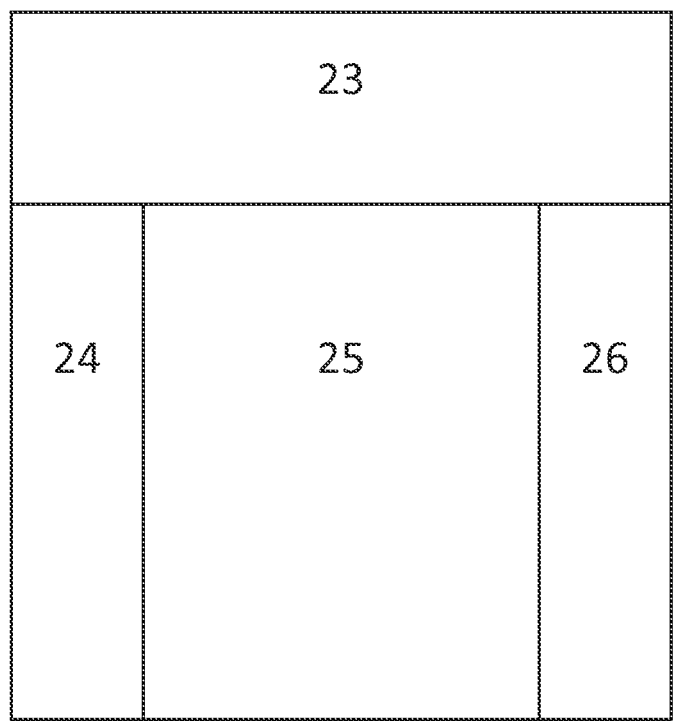
FIG. 8 is a schematic of the user interface according to an embodiment.
Figure 8A:
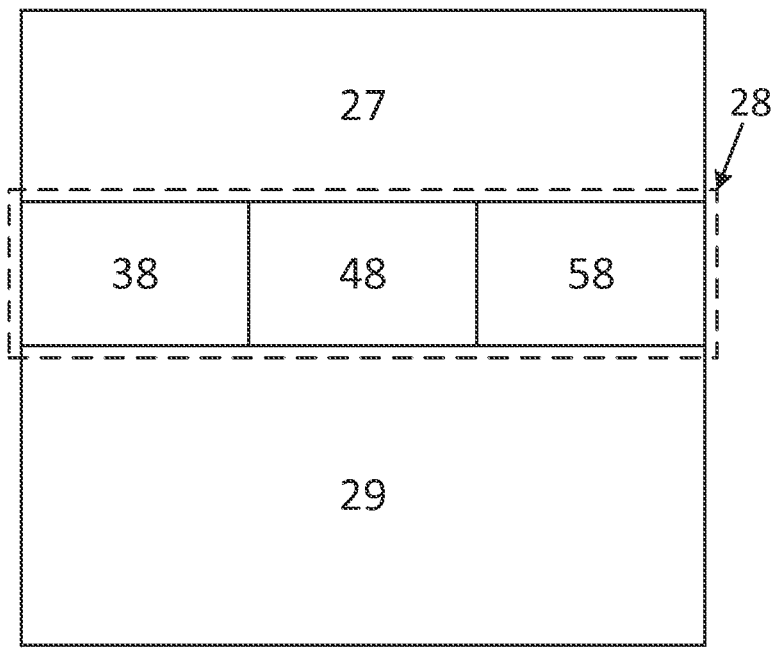
FIG. 8a is a schematic of an alternative user interface according to the invention.

Embodiments also relate to a user interface. In particular it relates to a touch-screen interface, through which the system of the present invention can be operated. FIG. 8 provides a schematic representation of a generic user interface according to the preferred embodiment. FIG. 8a provides a schematic of an alternative generic user interface. As shown in FIG. 8, the basic user interface comprises a typing pane 23, a text prediction pane 25 which may be located centrally for example and two identical panes, which may be located to the sides, for single/multi character, punctuation or symbol entry 24, 26. In the alternative embodiment, as shown in FIG. 8a, the basic user interface comprises a typing pane 27, a prediction pane 28 and a single pane for single/multi character, punctuation or symbol entry 29. The prediction pane 28 preferably comprises an actual character entry button 38, a most likely word button 48 and an alternative word button 58.

In the embodiment according to FIG. 8, the prediction pane 25 comprises a set of buttons, each button displaying a word from a set of words or phrases that has been predicted by a text prediction engine. The typing pane 23 comprises a pane in which user inputted text is displayed. The side panes 24, 26 can comprise a set of buttons corresponding to character, punctuation or numeral keys. In the case of the default screen, the side panes 24, 26 comprise character buttons. However, in other configurations panes 24, 25, 26 are all used for character, punctuation and numeral buttons, and the screens are toggled so that a user can move between prediction, numeral and punctuation screens.

The difference between the two user interface embodiments is in the prediction pane 25, 28. In the alternative embodiment, the prediction pane 28 comprises an actual character entry button 38 which enables a user to input the sequence of characters they have typed into the system (rather than entering a word that has been predicted by a text prediction engine of the system). This enables the user to input words which are not recognised by the system and which would not therefore be predicted by the system. The prediction pane 28 also comprises a most likely word button 48 which displays the word with the greatest probability associated with it from a set of words or phrases predicted by a text prediction engine. The prediction pane 28 also comprises an alternative word button 58 which displays a word other than the word with the highest probability (i.e. the word with the second highest probability). Pressing either of the buttons 48 and 58 will cause the associated word to be entered.

In both embodiments of the user interface, the typing pane 23 displays the text entered by a user. A user is able to scroll up or down previously typed text which is displayed in the typing pane, enabling the user to view and edit the text. The typing pane can also comprise a cursor which can be moved to facilitate the editing of the entered text.

The interface is arranged such that when a word button from the prediction pane 25, 28 is pressed, that word is selected and appears in the typing pane 23, 27. The updated input sequence comprising the selected word and its preceding context is passed to the text prediction engine for new prediction generation. Preferably, in the embodiment of FIG. 8a, the user enters the most likely word by pressing the most likely word button 48 or by entering a space.

In the embodiment of FIG. 8, when a word button is held (for a specified amount of time) or in response to a left-to-right gesture, the current input sequence, excluding the term in question, is passed to the text prediction engine, and the word is displayed in the 'typing pane'. The word is not completed (i.e. a space is not automatically entered after the word), but the letters are used as input for further prediction. For example, if the word 'not' is held, then the text prediction engine generates a list of word predictions 9 including for example 'note', 'nothing', etc., which is provided to the user interface for display and selection in the prediction pane 25. If the language model predicts punctuation, the punctuation terms appear in the same location as the predicted words or phrases, at the bottom of the prediction pane 25, thereby providing the user with consistency. In the alternative user interface of FIG. 8a, the current input sequence is displayed in the typing pane 27 in real time. The actual character entry button 38 also displays the current input sequence, and this is shown alongside the current most likely word button 48 and the alternative word prediction 58. If the user wishes to select the input sequence they have entered, rather than a predicted term, the user presses the actual character entry button 38 to enter this inputted sequence as a finished word.

The user interface can be configured for multiple word (phrase) input. An example of two-term phrase input is discussed in relation to a predicted phrase of "and the". In the central prediction pane, a button containing the word "and" will be displayed next to, and to the left of, a button containing the word "the". If the user selects the term "the", the sequence "and the" is entered. However, if the user selects "and", only "and" is entered. The same principle can be applied to arbitrary length phrase prediction. The same principle can be applied to the user interface of FIG. 8a, where the most likely word button 48 can be configured to display a phrase input. For example, the most likely word button 48 can be divided into two or more buttons if the most likely prediction is a two or more term phrase, and the alternative word button 58 can show the next most likely phrase prediction.

Character buttons can be displayed in the two side panes 24, 26 or a single main pane 29. The character buttons can have dual or tri character behavior. This means that either two or three characters are submitted concurrently to the predictor (e.g. if an 'A|B' button is pressed then 'A' and 'B' are submitted). In an embodiment this is the default behavior on the default screen. The dual character buttons are designed with multi-region behavior. For instance, pressing the left side of the 'A|B' key will input 'A', the middle region will give both 'A' and 'B', the right side will input 'B' (this combines the benefit of larger, more accessible multi-character buttons, whilst at the same time allowing experienced users the benefit of higher prediction accuracy resulting from single character input). In an embodiment this is optional behavior on the default screen. Multitap is used when it is necessary to type characters unambiguously (e.g. for entry of a new word that is not in the language model vocabulary). In an embodiment to enter characters unambiguously, a user presses a toggle button to go to a numbers/punctuation screen where all buttons are multitap.

For numbers or punctuation, all buttons are multitap. For example, with tricharacter buttons, the user can press once to enter the first term (of the three term button), press twice to enter the second term, or press three times for the third term to be entered.

The interface can also comprise one or all of the following additional features: a menu button which toggles the screen between prediction, numbers and punctuation, and further punctuation screens; a return button to start a new line of text; a space button to enter a space when pressed or repeatedly enter a space when held; a delete button to delete individual characters when singularly pressed or repeatedly delete characters or words when held; a capitalization button which toggles between Abc (where only the first letter is capitalized), ABC (all letters capital) and abc (all letters lower case); a send button to send the inputted text as an email (this is specific to an email focused application).

Furthermore, the interface can optionally include an 'undo' button or it can be configured to be responsive to an 'undo' gesture, which is a gesture on a delete button (e.g. movement from left to right). In response to this gesture, or button press, the interface undoes the previous term selection, placing the user back at the position prior to term selection.

For example, if a user has entered 'us' by character input, they will be presented with a selection of word predictions based on this input. In an example where they accidentally select the word "usually" rather than the intended word "useful", the undo gesture allows a user to undo the word selection and return to the original predictions based on 'us', thereby enabling them to select 'useful'. This saves the user from repeatedly pressing the delete button to remove the characters accidentally entered by the incorrect word selection.

The current system includes automatic capitalization at the beginning of sentences. However, toggling the ABC, Abc and abc options means that the language model will only predict words of the correct form, i.e. if the capitalization toggle key is set to Abc, the prediction engine will search for terms that follow this capitalization scheme, e.g. 'Jon' Ben' 'Cambridge' etc.

Yet another embodiment is directed to a system and method providing a user interface comprising a plurality of targets and being configured to receive user input. In the example provided in FIG. 9, the user interface comprises a virtual keyboard 901, e.g. a keyboard on a softscreen. The system is configured to interpret the user input as either an input event 910 or a selection event 920. An input event 910 is an event in which a user selects (e.g. by 'touch' or 'click') a location in 2D space on the virtual keyboard, this event being detected by the virtual keyboard 901 and represented as Cartesian coordinates. A selection event 920 is the selection by a user of a prediction 918 from a set of predictions displayed to the user. The virtual keyboard 901 may have input event regions and selection event regions to distinguish between an input event 910 and a selection event 920. However, there are other ways to interpret the user input as selection or input events, e.g. a selection event 920 may correspond to a different gesture on the keyboard (such as a swipe across the screen) to an input event 910 (which could correspond to, for example, a touch of the screen).

An input event 910 is not limited to being represented by Cartesian coordinates, but can also be represented by other variables such as time since the last key press, key press pressure, gesture information (the path traced by a touch on a softscreen keyboard), accelerometer readings etc.

For a soft keyboard, a selection event 920 relates to a user selecting the intended prediction by touching/clicking an area on the keyboard which displays that prediction, thus entering the prediction into the system. A selection event 920 may also relate to the automatic selection by the system of the most probable prediction when the user 'hits' space' to complete a word. There are other mechanisms for user selection of a prediction, for example a gesture on a soft keyboard such as a swipe-right across the screen can be a mechanism for inserting the most probable prediction. The selected prediction 920 corresponds to the character sequence a user intended to enter through the input events 910. Thus, by entering a selection event 920, the input events 910 entered by a user can be matched to their intended targets, as will be explained in more detail below.

The only requirement for the virtual keyboard 901 is that there are distinct 'target points' for the user, which correspond to intended input. The target points could be, but are not limited to, character keys (i.e. a grid of virtual or physical keys, as in normal qwerty keyboards); an arrangement of letter glyphs, e.g. as a grid with no visible key boundaries; or a linear letter line, A-Z. Thus, each target of the virtual keyboard 901 can represent single or multiple characters, or any other item of information for user selection. For the following examples, the focus is on text entry into a system. However, the system and method is not limited to the entry of text and is applicable to the entry of non-text data, where quanta of data are represented by target points on a user interface.

To generate predictions for presentation to a user, the system comprises a plurality of models 906 which model the user's previous input events for each of the plurality of targets; an input probability generator 902 which queries the plurality of models 906 with a given input event 910 and generates one or more likely targets and their probabilities; and a predictor 904 which generates text predictions 918 from the likely targets and their probabilities. In a preferred example, the system further comprises a word fragment map 903 which maps the likely targets to word fragments which are used by the predictor 904 to generate text predictions.

The input probability generator 902 receives an input event 910 and generates or updates a Target Sequence Intention Structure 912. The Target Sequence Intention Structure 912 contains one or more targets and for each target the probability that the user had intended to select that target through the input event 910. The Target Sequence Intention Structure 912 contains a correspondence between the input event 910 and the targets corresponding to that input event 910, for example by tagging the targets with the input event 910. The Target Sequence Intention Structure 912 can contain all of the targets of the system or it can contain only the targets which have an associated probability higher than a certain threshold probability value. The threshold value is a system parameter, that can be set empirically to a pre-defined level (e.g. $10^{-4}$). Alternatively, the threshold level might be determined by experiments with the user. As discussed in more detail below, to generate a probability of observing an input event 910 for a target, the input probability generator 902 queries a model set 906 with an input event 910, and evaluates for each target a probability value, which can be represented as a per-event probability vector. To reduce the computation, small values can be filtered out of the per-event probability vector. These per-event probability vectors are concatenated to form the Target Sequence Intention Structure 914, which forms the input to the next stage: target mapping 903.

The model set 906 comprises a plurality of trained models representing the plurality of targets (which may be characters) of the system. A target is modeled as a distribution which models the user's actual input if he was 'targeting' that target. The distribution that is being modeled is p(x|c), where x is an input event position vector, and c is a label identifying a single target (a target identifies a set of possible intended characters).

In a preferred embodiment, this distribution is modeled as a multivariate Gaussian, p(x|c, M)=G(x; $\mu_c$, $\Sigma_c$), where M is the assumed model (encompassing all assumptions and parameters), and G(x; $\mu$, $\Sigma$) is shorthand for the Gaussian probability density function, mean $\mu$, covariance $\Sigma$, evaluated at x. The model parameters are $\mu_c$, and $\Sigma_c$ for each target c. The model parameters are learnt using maximum a-posteriori (MAP) estimation based on historical interaction with the keyboard. However, other learning mechanisms can be used, some of which are discussed later.

Rather than using a 2D Gaussian, the user's input can be modeled by independently distributing the x and y co-ordinates of the user's input events with a Laplace distribution. Alternatively, the user input can be modeled with a Gamma distribution. Laplace and Gamma distributions may be more appropriate than a Gaussian distribution because the distributions are more heavy-tailed, with the probability density decaying more slowly than that of a Gaussian as the input event (e.g. touch location) moves away from a target. Such heavy-tailed distributions may reflect the user's actual writing style more accurately, thus providing, potentially, better error correction performance. Other suitable modeling techniques can also be applied.

In order to obtain the MAP estimate for $\mu_c$, $\Sigma_c$, a prior distribution of those parameters must be specified. Where the targets relate to keys on a virtual keyboard, the priors (mean and covariance) can be set empirically based on a keyboard layout, a convenient choice for which is the normal inverse Wishart distribution, NIWD, as this is the conjugate prior of a Gaussian with unknown mean and covariance. Other prior distributions can be used, some of which are discussed later. The definition of conjugate priors states that if the prior is conjugate to the likelihood, the posterior is the same form of distribution as the prior (potentially with different parameters). The parameters of the conjugate distribution (both prior & posterior) are then termed hyperparameters (as they parameterize the distribution of the model's actual parameters), and MAP learning can be made into a relatively simple hyperparameter recalculation.

Thus, in an embodiment, learning simply entails recalculating the four NIWD parameters, an algorithm that is easily made incremental. The prior is therefore:

$$p(\mu_c, \Sigma_c | M) = NIWD(\mu_c, \Sigma_c; \alpha_c^{prior}, \beta_c^{prior}, \hat{\mu}_c^{prior}, \hat{\Sigma}_c^{prior}),$$

and the posterior is:

$$p(\mu_c, \Sigma_c | \{x_i\}_{i=1 \ldots n}, M) = NIWD(\mu_c, \Sigma_c; \alpha_c^{(t)}, \beta_c^{(t)}, \hat{\mu}_c^{(t)}, \hat{\Sigma}_c^{(t)}),$$

where $\alpha_c$ and $\beta_c$ are degrees-of-freedom hyperparameters for the mean and covariance respectively (a large degrees-of-freedom value means that the prior is strong, and learning is slow), and $\hat{\mu}_c$, $\hat{\Sigma}_c$ are the modal values of the mean and covariance respectively. $\alpha_c^{(t)}$ is the posterior value of the hyperparameter $\alpha_c$, after t observations, $\{x_i\}_{i=1 \ldots t}$, therefore $\alpha_c^{(0)} \equiv \alpha_c^{prior}$.

Working through the known hyperparameter update relations for the NIWD distribution, the general update rules for this parameterization are:

$$\alpha_c^{(t+n)} = \alpha_c^{(t)} + n,$$

$$\beta_c^{(t+n)} = \beta_c^{(t)} + n,$$

$$\hat{\mu}_c^{(t+n)} = \frac{n\bar{x} + \alpha_c^{(t)} \hat{\mu}_c^{(t)}}{n + \alpha_c^{(t)}},$$

$$\hat{\Sigma}_c^{(t+n)} = \frac{n(X + \bar{X}) + \beta_c^{(t)} \hat{\Sigma}_c^{(t)}}{n + \beta_c^{(t)}},$$

where, $$X = \sum_{i=1}^{n} (x_i - \hat{\mu}_c^{(t)})(x_i - \hat{\mu}_c^{(t)})^T,$$

$$\bar{X} = \frac{\alpha_c^{(t)}}{\alpha_c^{(t)} + n} (\bar{x} - \hat{\mu}_c^{(t)})(\bar{x} - \hat{\mu}_c^{(t)})^T,$$

where there are n observations, $\{x_i\}_{i=1 \ldots n}$, with mean $\bar{x}$. When applied to the prior, using all observations, this provides a batch-learning algorithm. An incremental learning algorithm can be formed by setting n=1, and reapplying the update formula to the posterior, i.e. $\alpha_c^{(t+1)} = \alpha_c^{(t)} + 1$.

As the mode of the NIWD is $(\hat{\mu}, \hat{\Sigma})$, the MAP estimate of the parameters after t observations is simply: $\mu_c = \hat{\mu}_c$, $\Sigma_c = \hat{\Sigma}_c^{(t)}$.

The NIWD is convenient because it is conjugate of the multivariate Gaussian, which gives simple and incremental learning rules. As an alternative, it is possible to use a uniform (uninformative) prior. A prior can be specified where the position and covariance are independent, e.g. the prior for position could be a Gaussian or uniform, and that for covariance could be the 'matrix normal distribution'.

The present example uses batch-mode and incremental learning algorithms, which compute the posterior in a single update from the prior, and by adding one observation at a time respectively. One of these learning algorithms runs when the user 'selects' a prediction by matching the locations of input events to the locations of characters which make up the selected prediction.

If a Laplace/Gamma distribution is chosen instead of a Gaussian distribution, the same process is followed as for the Gaussian: a prior is chosen (for example the conjugate prior) and learning rules are derived for the MAP learning goal.

As an alternative to MAP, Maximum Likelihood (ML) estimation is another choice for a learning mechanism, where the prior does not come into it, and the parameters are chosen such that the likelihood of observing the training data under the model is maximized. A further possibility would be to use a true Bayesian estimator (neither the ML nor MAP approaches are truly Bayesian because they both make point estimates), in which an integral is computed over all possible values of the posterior and the mean or median used for inference decisions. Disadvantageously these estimates are relatively costly to compute, and therefore currently less attractive for constrained resource environments. Examples of Bayesian estimators are Variational Bayes and Gibbs sampling.

The above described learning algorithm is a learning algorithm that accounts for each datapoint equally, whether recent or old, with a prior which is (intentionally) overwhelmed once a certain number of datapoints have been observed. In order to add a basic form of recency into the model, and some outlier tolerance by continually reinforcing the prior, two alterations can be made:

The first is simply to limit the degrees-of-freedom parameters $\alpha_c$, $\beta_c$, which has the effect of 'forgetting' old observations, and limiting how 'rigid' the model becomes (a 'rigid' model has such a high degrees-of-freedom value that new datapoints have very little effect). The limit is applied by not updating them if they would exceed the limit (an action which should not compromise the action of the other hyperparameter updates).

The second is to feed the other prior hyperparameters, $\hat{\mu}_c^{prior}$ and $\hat{\Sigma}_c^{prior}$, back into the update equations, such that they continue to have an effect even after many datapoints have been observed. This can be done relatively simply as the update equations are simply weighted averages of a few quantities, so it is reasonable to 'add in' some quantity of the prior, as follows:

$$\alpha_c^{(t+n)} = \min(\alpha_c^{(t)} + n, \alpha_{cmax}),$$

$$\beta_c^{(t+n)} = \min(\beta_c^{(t)} + n, \beta_{cmax}),$$

$$\hat{\mu}_c^{(t+n)} = \frac{n[(1-\delta)\bar{x} + \delta\hat{\mu}_c^{prior}] + \alpha_c^{(t)}\hat{\mu}_c^{(t)}}{n + \alpha_c^{(t)}},$$

$$\hat{\Sigma}_c^{(t+n)} = \frac{n[(1-\varepsilon)(x+\bar{x}) + \varepsilon\hat{\Sigma}_c^{prior}] + \beta_c^{(t)}\hat{\Sigma}_c^{(t)}}{n + \beta_c^{(t)}},$$

The additional parameters $\alpha_{cmax}$, $\beta_{cmax}$, $\delta$ and $\in$ may be set empirically, as required. They control the 'asymptotic strength' of the prior, and the rate at which past observations are forgotten.

A single virtual keyboard 901 may need to maintain multiple separate target model sets 6, for example if a single system may be used by different users, or if the form factor of the virtual keyboard is variable. In some cases (e.g. a form factor change), the system may have sufficient information to explicitly choose a different input model, but in the case of multiple users, the appropriate model choice may not be obvious. In this situation, an element of model selection can assist.

A robust way to perform model selection is to evaluate the data likelihood over a number of samples. This can be achieved as follows, where data likelihood is expressed as:

$$\log L(\{x_i\}_{i=1\ldots n}|M) = \Sigma_{i=1}^n \log p(x_i|M),$$

where L(D|M) is the likelihood of observing the data D under the model M. This can be written as, $$\log L(\{x_i\}_{i=1\ldots n}|M) = \Sigma_{i=1}^n \log \Sigma_j p(x_i, c_j|M),$$

$$\log L(\{x_i\}_{i=1\ldots n}|M) = \text{const} + \Sigma_{i=1}^n \log \Sigma_j p(x_i, c_j|M),$$

where the prior over targets, p(c|M), may be extracted into a constant if we assume it is uniform.

This log-likelihood statistic can be computed by querying multiple models at the Input probability generator stage at once, summing the output over all targets, and selecting the model for which the calculated log-likelihood of some 'seed input' is highest.

The model presented up to this point has incorporated the assumption that each key-press in a sequence is independent of all others, an assumption that is clearly inaccurate (the distribution of input for a certain key is probably quite strongly dependent on the last character entered). A first-order Markov assumption might be more appropriate: that the current character input is conditionally independent of all previous characters, given just the last character entered. The probability of an entire input sequence would then be:

$$p(\{x_i\}_{i=1\ldots t}|\{c_i\}_{i=1\ldots t},M) = p(x_1|c_1,M) \Pi_{i=2}^n p(x_i|c_i, x_{i-1}, M),$$

where all terms are as previously described above. A critical modeling decision is then to assume a form for the conditional probability of a touch location, $p(x_i|c_i, x_{i-1}, M)$.

One choice of distribution would first classify the previous touch location, x, with a separate Gaussian for each target and class of previous input location. Another possible choice would be to use the distance travelled, $d = \|x_i - x_{i-1}\|$, to control the variance of the per-target input distribution. The form of this distribution should be chosen to model typical data collected from virtual keyboard users.

A model set 906 can be i) queried by the input probability generator 902 to return the current MAP estimate of the model parameters; and ii) trained by an input model updater 905 in order to update the models in response to a selection event.

Model parameters may be stored on a per-key basis, or (in the case of covariance), shared among multiple keys. In the example described, each key/target has a position and covariance value. The alternative is to provide each key with a location, but force keys to share a covariance—when any of the keys are trained, the same covariance is trained. The exact representation of the parameters is flexible; it may be, for example, more convenient to store the precision matrix rather than the covariance, as this does not require a matrix inversion during probability generation, but does require an inversion in the less frequent case of model training.

Thus, given an input event 910, the input probability generator 902 generates a probability p(x|c,M), for each target c, that the user had intended to select that target by the input event 910. To generate the probability value for a given target, the input probability generator 902 queries the model for that target to return the current MAP estimate of the model parameters, $\mu_c, \Sigma_c$. The input probability generator 902 then uses the model parameters to calculate the value of the Gaussian probability density function, $G(x; \mu, \Sigma)$, evaluated at the input location x. The calculated probability value can be represented as a per-event probability vector, which can be concatenated to form part of the Target Sequence Intention Structure 914.

In a preferred embodiment, the system further comprises a target mapping stage 903. The target mapping stage 903 comprises a word fragment map which provides a mapping from target inputs to word fragments (usually one or two characters) that can be used to build predictions. This mapping is applied independently to each element in the Target Sequence Intention Structure 912 in order to convert it into an Input Sequence Intention Structure 916. The word fragment map maintains a mapping from a target (a location on a keyboard, an abstraction of a key) to one or more word fragments (portions of a word that the user wants to enter). In the simplest case, each target refers to a single word fragment (e.g. when typing English on a full qwerty keyboard). Where there are alternative characters associated with each key (e.g. French accented characters or where each key represents multiple characters), those characters may be added as additional word fragments. The probabilities corresponding to each target may additionally be discounted by some factor for each alternative word fragment. The sets of possible word fragments and probabilities for each event in the sequence are then assembled into an Input Sequence Intention Structure 916.

The target mapping stage 903 also maps the word fragments of a selected prediction 920 back to their corresponding target events. In a preferred embodiment, each of the word fragments is tagged with the target from which it came to allow the pairing by a predictor 904 of a target to its touch location when a selection event has occurred. This can be achieved by tagging each word fragment with its corresponding target and input event. Thus, to un-map is a trivial pairing of touch-locations and targets. However, instead of tagging the word fragments, the system can use other mechanisms to map the word fragments of a selected prediction 920 back to their corresponding target events. For example, in an alternative embodiment, the target mapping stage 903 comprises a reverse mapping of the word fragments of a selected prediction back to their corresponding targets. To achieve the reverse mapping the selected prediction 920 and the corresponding string of input events are passed to a splitting mechanism. The splitting mechanism may split the prediction 920 into word fragments by evaluating the combination of word fragments with the highest probability for that selected prediction 920. The word fragments are then reverse mapped at the target mapping stage 903 to their targets and paired with the string of input events. In the simplest implementation of such a mechanism, the word fragments comprise single characters and the splitting mechanism splits the prediction into single characters to be mapped back to the targets. In this situation, the splitting may be carried out by the predictor 904.

To generate text (or similar) predictions 918, the system comprises a predictor 904. A predictor 904 is a device which, given some input, which in this case comprises an Input Sequence Intention Structure 916 containing a sequence of sets of 'word fragments' and probabilities, generates a set of predictions 918. Each prediction 918 consists of a text string, i.e. a term or phrase (denoted by s_i), and a probability value, denoted by p_i. The set of predictions is therefore of the form {(s_1, p_1), (s_2, p_2) . . . (s_n, p_n)}, where there are n predictions in a set.

As one skilled in the art will understand, any type of predictor 904 and any number of predictors 904 can be used to generate text predictions in a text prediction system. Preferably, the predictor 904 generates text predictions 918 based on the context of the user inputted text, i.e. the predictor 904 generates text predictions 918 for the nth term, based on up to n−1 terms of context. Here, "context" denotes both the terms that have occurred previously in the sequence, as well as any knowledge the system has about the current term (e.g. the likely word fragments contributing to the term). Given a particular context, the system predicts the words that are most likely to follow by using estimates of probabilities. The predictions 918 can be generated by a multi-language model as well as a single language model predictor.

A thorough description of the use of a predictor (single and multi-language model) to generate text predictions was described above in reference to FIGS. 1-8 and is presented in international patent application publication number WO2010/112841, "System and method for inputting text into electronic devices", which is incorporated herein by reference in its entirety. Furthermore, a thorough description of the use of an adaptive predictor (single and multi-language model) to generate category-weighted text predictions is presented in international patent application number PCT/GB2010/001898, "System and method for inputting text into electronic devices", which is incorporated herein by reference in its entirety.

The predictor 904 of the system receives as its input an Input Sequence Intention Structure 916 containing a sequence of sets of 'word fragments' and probabilities, and generates a set of predictions 918 which are displayed to the user. The predictor 904 may be configured to return matches for which the Input Sequence Intention Structure 916 completes an entire word or return likely words of which the Input Sequence Intention Structure 916 is a prefix, e.g. in the case where the Input Sequence Intention Structure comprises the word fragments t and o and the word may be predicted as 'to' (completing the word) or 'together' (the word fragments are a prefix for the word). The Input Sequence Intention Structure 916 need only be used as a guide; it may, for example, add additional characters as if the user has missed some or ignore characters as if the user has entered extra characters. A single path through the Input Sequence Intention Structure 916 must be identified by each prediction 918, so that an association can be made between input events and targets. Each target has already been mapped by the word fragment map at the target mapping stage 903 to one or more word fragments, depending on language, which are unique. Furthermore, in the preferred embodiment, the Input Sequence Intention Structure 916 stores the tagging of the word fragments to their targets and input events. Thus, the selection of a prediction provides a correspondence between input events 910 and targets, because the predictor 904 tracks the targets used to compose the prediction, via the tagging of the word fragments with their corresponding targets. In an embodiment in which the unmapping comprises a reverse mapping, a splitting mechanism splits the selected prediction 920 into a combination of word fragments and the word fragment map is used to provide a reverse mapping of the word fragments to their corresponding targets. Each target is then paired with its respective input event 910.

The system also comprises an input model updater 905. The input model updater 905 receives input event to target correspondences 914 in response to a selection event 920. The selection event 920 identifies the targets which the user had intended to input and thus allows the predictor 904 to match the targets to the input events 910. The input model updater 905 updates the appropriate models, preferably (for memory usage and efficiency) using the incremental variant of the learning algorithm. The input model updater 905 applies the incremental learning update rules to the plurality of models in response to each selection event 920 on the virtual keyboard 901. The input is a set of input locations paired with targets $\{(x_i, c_i)\}_{i=1 \ldots k}$, each of which can be used as a single training point, $x_i$, for a single target, $c_i$. The prior hyperparameters and learning parameters are all set to fixed values—these set the initial target positions and expected accuracy, as well as controlling the speed at which learning takes place. Each model can be considered in isolation. By doing so, the training data is required to be labeled, i.e. input events require association with target labels. The labeling is not provided in the data, which is a stream of input events 910 and targets, so must be inferred from selection events 920. As described previously, one way of associating input events 910 with targets is to tag the word fragments with their targets and input events 910 in the Input Sequence Intention Structure 916. Once a prediction is selected, the word fragments making up the prediction are known. Thus, the targets tagged to the word fragments can be paired to the input events, providing labeled training data. Alternatively, the targets of a selected prediction can be determined by reverse mapping word fragments to their targets at the target mapping stage 903. The targets so determined can then be paired to the input events 910.

Thus, the present embodiment provides a system which models user input events for a plurality of targets and updates those models with user input, to provide a system which is able to more accurately predict which character the user intends to input given an input event and thus provide more accurate text predictions.

The use of the present embodiment will now be described by way of a non-limiting example. A user interacts with a continuous coordinate system of a virtual keyboard 901 by entering input, for example by touching a location on a touch-sensitive keyboard 901. The user touches a location on the keyboard 901 with the intent of entering a target displayed on the keyboard 901. The keyboard 901 builds up a stream of input events 910 (which in the present example are Cartesian coordinates representing the locations of the touches on the keyboard) which is passed to an input probability generator 902.

The input probability generator 902 generates or updates a Target Sequence Intention Structure 912. In the instance where the targets of the keyboard represent characters, the Target Sequence Intention Structure 912 contains one or more characters corresponding to the most likely characters the user had intended to input when the touched the screen. Associated with each of the characters is a probability that the user had intended to enter that character when he touched the screen at the location and a tag to the input event 910. To generate the Target Sequence Intention Structure 912 the input probability generator 902 calculates the probability that the user had intended to enter each of the one or more characters by querying the associated model for each character with the input event 910. As discussed above, each model models the user's historical interaction with the keyboard for that character, i.e. it models the user's previous input events for that character. The input probability generator 902 then, preferably, retains the characters with an associated probability above a threshold probability value, where the threshold value is set empirically to a pre-defined level (e.g. $10^{-4}$) or is determined by experiments with the user.

The Target Sequence Intention Structure 912 is passed to a word fragment map which maps each character of the Target Sequence Intention Structure 912 to one or more word fragments with associated probabilities, thus generating an Input Sequence Intention Structure 916. Each character of the one or more characters is independently mapped to one or more word fragments, where the word fragments are tagged with the characters from which they came. The probabilities associated with the word fragments need not be the same as the probability associated with the character. For example, when mapping, the probability associated with a character may be multiplied by an additional factor dependent on the word fragment. The word fragment map may be a fixed map stored in a memory of the system. The map varies with the language used, e.g. the punctuation will differ with the chosen language and accented characters, umlauts etc. may feature in the word fragments dependent on the chosen language of the system.

Preferably, the word fragment map comprises targets mapped to word fragments, where the word fragments are tagged with the targets from which they came.

The Input Sequence Intention Structure 916 contains the word fragments, preferably tagged to the characters and input events from which they came, and probabilities corresponding to a sequence of input events 910. From the Input Sequence Intention Structure 916, the predictor 904 generates a number of predictions 918 by identifying a single path through the Input Sequence Intention Structure 916 for each prediction 918, i.e. by passing through the word fragments and generating a prediction sequence comprising a single word fragment for each of the input events 910. By identifying a single path through the Input Sequence Intention Structure 916, an association 914 can be made between input events 910 and targets. The predictor considers a number of the most probable paths through the Input Sequence Intention Structure 916, optionally also considering all words for which that path is a prefix. This is then fed into an n-gram language model to give an ordering of prediction candidates. An implementation of this process is described above.

The virtual keyboard 901 may be configured to display the predictions generated by the predictor. The selection 920 of the correct prediction can be achieved by either user selection of a given prediction displayed to the user or auto-accepting by the system of the most probable prediction. The predictor 904 is configured to track via the Input Sequence Intention Structure 916 which word fragments are used to compose a prediction, so that, upon user selection 920, the input events 910 are matched 914 to their targets. If the Input Sequence Intention Structure 916 comprises the word fragments tagged with their targets, the predictor 904 is configured to track the target tags, such that matching input events 910 to their targets comprises pairing the input events 910 to their targets. Alternatively, the word fragments are first matched to their corresponding targets by reverse mapping at the target mapping stage 903, before these targets are paired with the input events 910. The input events 910 paired with their targets are forwarded to the input model updater 905, which updates the relevant models of the set of models 906.

An example is now discussed, to illustrate the functioning of the system. In the example, a user is trying to enter the word "it's" on a virtual keyboard 901 (qwerty layout).

The user touches the screen very near to the first character 'i'. The virtual keyboard 901 generates an input event 910 (e.g. Cartesian coordinates) representing that location, and sends it to the input probability generator 902.

The input probability generator 902 evaluates all of the target models 906, computing how likely they are to correspond to this input event. The input probability generator filters out low-probability targets by retaining only those with a probability above a predetermined threshold (which is set empirically or through experiment with the user). In the present example, the resulting Target Sequence Intention Structure 912 is [(@I, 1.0), (@O, 0.2), (@U, 0.2), (@K, 0.15), (@J, 0.1)], where @I is the target corresponding to the character 'i'.

The target mapping stage 903 transforms each target into a number of alternative word fragments, e.g. @I→i, ï, 'i. The target mapping stage 903 maps targets to word-fragments and tags each word fragment with the target from which it came. The resulting Input Sequence Intention Structure 916 is: [(i, 1.0; @I), (ï, 1.0; @I), ('i, 1.0; @I), (o, 0.2; @O), ('o, 0.2; @O), (ö, 0.2; @O), (ó, 0.2; @O), . . . ]

The predictor 904 then uses this, and any available word context, to generate predictions 918 to be fed back to the user. The predictor 904 might, for example, predict: ["I", "I'm", "in"].

The user then makes a second touch event, quite far from the second character 't', actually closer to 'r'. The virtual keyboard 901 sends both touch events 910 ('i' & 't') to the input probability generator 902.

The input probability generator 902 now generates a sequence of probability vectors: {[(@I, 1.0), (@O, 0.2), . . . ], [(@R, 0.8), (@T, 0.6), (@E, 0.1), . . . ] }

The target mapping stage 903 is applied to each event in the sequence independently, with the word fragments tagged to their targets: {[(i, 1.0; @I), ('i, 1.0; @I), . . . ], [(r, 0.8; @R), ('r, 0.8; @R), (t, 0.6; @T), . . . ]}

The predictor 904 makes predictions 918: ["it", "it's", "or"] which are displayed to the user. The predictions may be displayed by the virtual keyboard. The user selects the prediction "it's". The virtual keyboard 901 creates a selection event 920 and the predictor matches the two touch events 910 to the targets of the prediction 918. The un-mapping stage is a trivial pairing of touch-locations and targets, because the system keeps track of the list of targets and input events that make up each prediction via the tagging of the word fragments with their targets and input events.

The predictor 904 pairs the locations at which the user touched the screen to their targets (touch-1→@I), (touch-2→@T). The input model updater 905 then updates the model for @I, which will likely be tightened (as the first touch event was very accurate), and the model for @T, which will likely be loosened (as the second touch event was not as accurate).

The above example relates to a target representing a single character. However, a target may represent multiple characters. If a target represents multiple characters e.g. A/B/C, the model for that target models the user input events corresponding to the target A/B/C. Where the selected prediction 918 comprises A, B or C, the target A/B/C is mapped back to the input event.

By modeling a user's historical interaction with a virtual keyboard, the present method is able to accurately predict the characters which the user had intended to enter when touching the screen.

Yet another embodiment is directed to a text prediction engine comprising: at least one model configured to generate from an evidence source a first set of sequences with associated probability estimates; a probability generator configured to receive the set of first sequences with associated probability estimates and to generate a set of sequence predictions with associated probability values, wherein the probability values are approximately normalised over all possible sequence predictions generated by the probability generator given all of the possible sequences received by the probability generator.

Figure 10:
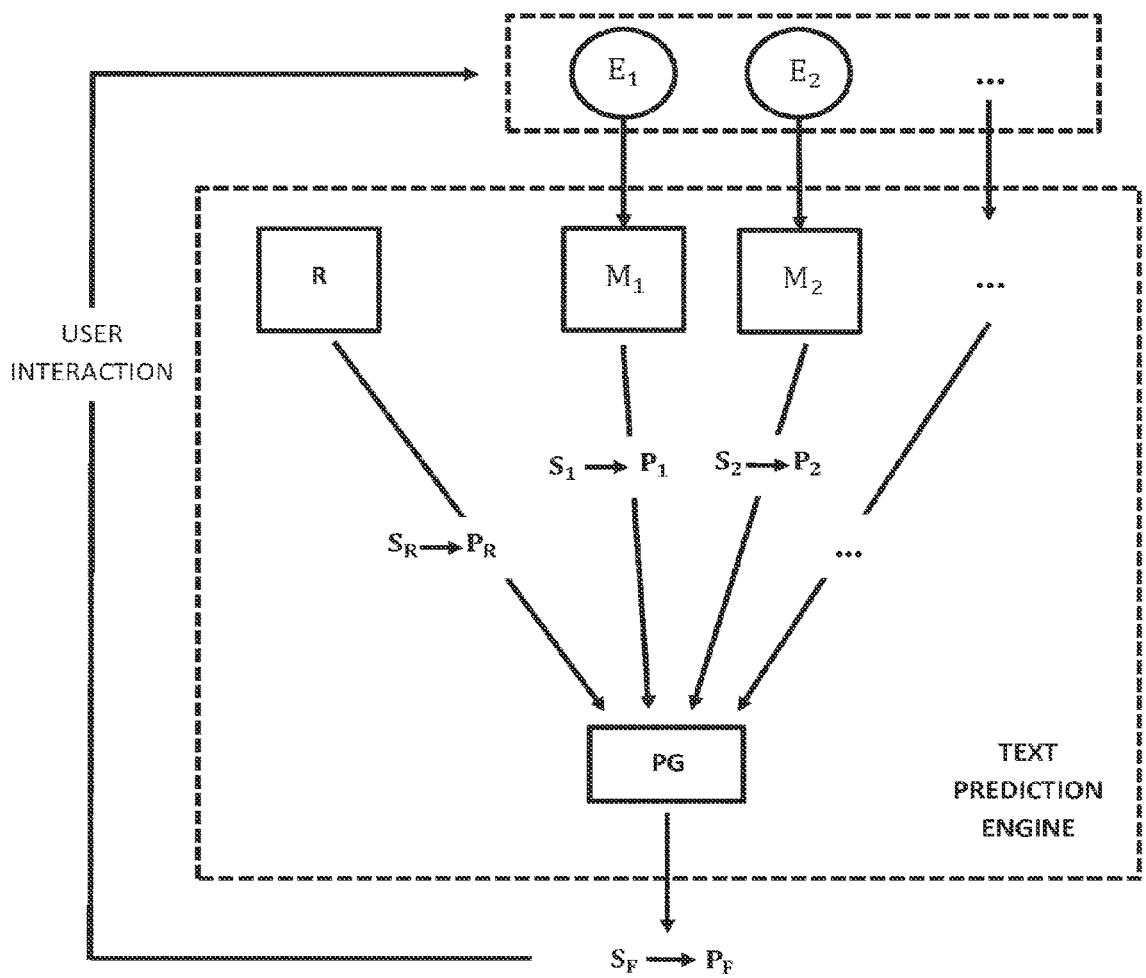
FIG. 10 is a block diagram of a text prediction architecture comprising a plurality of trained models used to make probabilistic inferences from a plurality of evidence sources, and a probability generator.

Yet In general, but not exclusive terms, the present embodiment can be implemented as shown in FIG. 10. FIG. 10 is a block diagram of one high level text prediction architecture according to the invention. The system comprises a text prediction engine which generates a set of most likely sequence predictions $S_F$ intended to be entered by the user. Each sequence prediction has a probability value associated with it.

As can be seen from FIG. 10, the text prediction engine preferably comprises a plurality of trained models $M_1$, $M_2$, $M_3$ etc. that will be used to make probabilistic inferences from a plurality of evidence sources $e_1$, $e_2$, $e_3$, etc.; and a probability generator (PG). However, in other embodiments, there may be a single trained model and single evidence source.

There are arbitrarily many potential sources of evidence $e_1$, $e_2$, etc. Some examples of which include: the sequence the user has already entered; the term/phrase the user is currently entering; stored, historical sequences entered by the user; the user's native language; the specific style of language being entered; the application in which the current sequence is being entered; in a messaging environment, the intended message recipient; the time/date; and the location of the device hosting the system.

The aim of the system of the present embodiment is to rank sequences in a given subset of a language by the likelihood that the user intended/intends to enter that sequence. In probabilistic terms, this equates to a ranking over sequences in a set S governed by the following:

$$P(s \in S | e, M) \qquad (1)$$

where e is the observed evidence, and M is the set of trained models that will be used to make probabilistic inferences. In other words, the system will estimate the conditional probability, over the set of all sequences from which predictions can be drawn, of the sequence given the evidence e. The target sequence is denoted by s.

In order to simplify the process of combining predictions from different data sources, in a preferred embodiment, the target sequence, s, is defined as a prediction which comes from a specific data source.

Each model in M is trained on a particular data source. Thus, a particular data source is represented by a model in M, and the set S in expression (1) ranges over all distinct terms (or sequences) generated by the models in M. A model is queried to provide a predicted term. This term is associated with the model from which it was drawn, and is therefore different from a lexically identical term drawn from a different model, due to its association with the model from which it was drawn. This association can be implicit in the data. However, the term could be tagged with an identifier associated with the model from which it has been drawn.

In this preferred process of combining predictions, two otherwise identical predictions that come from different data sources are considered different. To combine sequences from different models to get a list of predictions, the sequences are simply ranked with duplicate predictions removed. In the preferred implementation, the most probable estimate is retained for a given lexical term/sequence and any (less probable) lexical duplicates are discarded.

By way of a non-limiting example, if M comprises two context language models, French ($LM_{French}$) and English ($LM_{English}$), the term "pain" will probably occur in both, and will appear twice in S, once linked with the French model and once with the English model. This will result in two separate estimates for the term "pain" given a particular set of evidence (where the evidence in this case is the context which precedes the predicted term "pain").

These estimates refer to two distinct sequences (one from French, one from English); however, because they are lexically identical, it is not necessary to present them both to the user. Thus, in accordance with the preferred embodiment, the most probable estimate for a given lexical sequence is retained and any lexical duplicates are discarded.

In order to rank sequences in a given subset of a language by the likelihood that the user intended/intends to enter that sequence, the conditional probability of expression (1), $P(s \in S|e, M)$, needs to be calculated. To determine this probability, the expression is rearranged using Bayes' rule to yield:

$$\frac{P(e|s, M)P(s|M)}{P(e|M)} \quad (2)$$

and marginalised over target sequences in the denominator to yield:

$$\frac{P(e|s, M)P(s|M)}{\sum_{j=1}^{|S|} P(e|s_j, M)P(s_j|M)} \quad (3)$$

In order to compute $P(e|s, M)$, in a preferred embodiment, it is assumed that the evidence can be separated into non-overlapping sets, $[e_1 \ldots e_N]$, that are independently generated from some distribution under an associated model $[M_1 \ldots M_N]$, given the target sequence. This independence assumption can be written as:

$$P(e|s,M) = \Pi_{i=1}^{N}[P(e_i|s,M_i \in M)] \quad (4)$$

and stated as:

Assumption 1:

Evidence can be separated into distinct sets, such that the evidence in each set is conditionally independent of all others, given the target sequence;

where each $e_i$ has a model $M_i$ associated with it. This will allow a framework to be constructed in which it is possible to combine arbitrarily many sources of evidence in a computationally efficient manner. In a preferred embodiment, a model $R \in M$ is associated with a target sequence prior. Given this assumption we can restate (3) as follows:

$$\frac{P(s|R)\Pi_{i=1}^{N}P(e_i|s, M_i)}{\sum_{j=1}^{|S|} P(s_j|R)\Pi_{i=1}^{N}P(e_j|s_j, M_i)} \quad (5)$$

Thus, in an embodiment, the conditional probability of expression (1) can be computed by computing the target sequence prior, $P(s|R)$, and each of the evidence likelihoods, $P(e_i|s,M_i)$.

The denominator in expression (5) is constant with respect to s and therefore does not affect the ranking, rather it is a normalisation factor on computed probability values. In a preferred embodiment this value is estimated as the sum of a subset of the most probable sequences and a constant, to overcome the problem of having to compute the conditional probability over all sequences in S (see expressions 13-15 below). This approach is reasonable due to the Zipfian nature of many natural language phenomena, where a minority of likely events carry the majority of the probability mass. The Zipfian distribution is an instance of a power law distribution, in which the frequency of a given event is approximately inversely proportional to its rank.

Expression (5) provides a principled approach to combining different sources of evidence about text entry intentions, and in the preferred system of the present invention is implemented by a set of trained models $R, M_1, M_2, \ldots$ generating a set of sequences $S_R, S_1, S_2, \ldots$ and an associated set of conditional likelihood values $P_R, P_1, P_2, \ldots$ given a source of evidence $e_1, e_2, \ldots$. The model R is used to compute the prior target sequence probability $P(s|R)$, while each model $M_1, M_2, \ldots$ computes the respective evidence likelihood $P(e_i|s, M_i)$. Each model outputs a set of sequences $S_i$ and a set of associated conditional probabilities $P_i$. Each model $M_1, M_2, \ldots$ may comprise one or more sub-models. The probability generator PG takes the sequences and associated conditional probabilities as input and outputs a final set of sequences $S_F$ associated with probability values $P_F$. The probability generator PG can combine the predictions as described in the preferred process above, i.e. the predictions are ranked in order of probability and any duplicate predictions are simply removed. The set of sequences $S_F$ associated with the final probability values $P_F$ can be presented, for example in a list format, on a user interface of the system, for user review and selection. The user interacts with the system by making prediction selections or manipulating the device on which the system resides in other ways, thus updating the evidence. Each model $R, M_1 \ldots M_N$ may be updated as text is input into the system.

Embodiments provide at least two methods for computing evidence likelihoods within a probabilistic framework by marginalising over candidate interpretations of the evidence, represented in a graph framework, although other methods may be utilised. These at least two methods will now be discussed.

Regarding the first candidate model, when forming an estimate of the likelihood of the evidence from a single evidence source, $P(e_i|s,M_i)$, it is often helpful to express the model in terms of 'candidates', which are intermediate stages between the 'user-intended' sequence, and the observed evidence. If expressed in terms of candidates, the likelihood $P(e_i|s,M_i)$ can be re-written as:

$$P(e|s,M) = \Sigma_{j=1}^{K} P(e|c_j,s,M_{candidate})P(c_j|s,M_{sequence}) \quad (6)$$

where $c_j$ is a single candidate, and there are now two sub-models of M for a given evidence source: the candidate model $M_{candidate}$ and the sequence model $M_{sequence}$. The key assumption here is as follows:

Assumption 2:

The likelihood, under the model in question, can be expressed as a marginalization over candidates, where the evidence is conditionally independent of the target sequence given the candidate.

Applying this assumption, the dependence on s can be dropped from the evidence term:

$$P(e|s,M) = \Sigma_{j=1}^{K} P(e|c_j,s,M_{candidate})P(c_j|s,M_{sequence}) \quad (7)$$

Figure 11A:
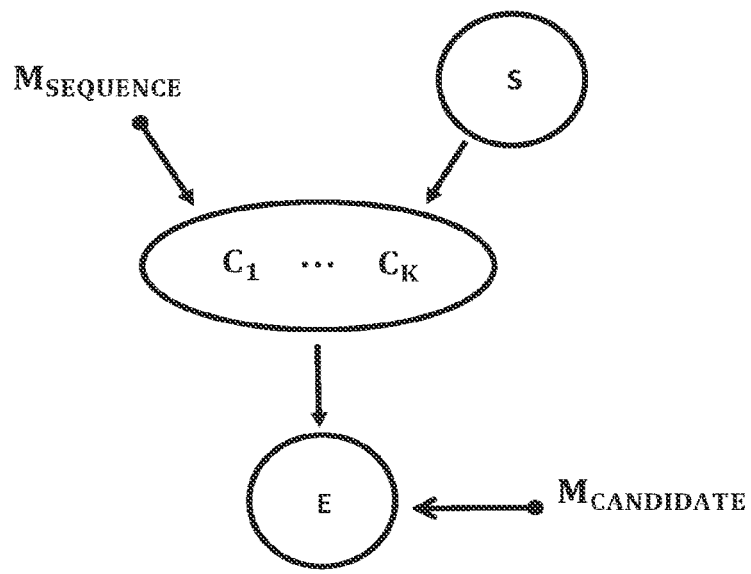
FIGS. 11A and 11B illustrate examples of the properties of a candidate model encoded in the form of graphical models describing the relationship between the variables and models.

The properties of the candidate model can also be encoded in the form of graphical models describing the relationship between the variables and models, for example as shown in FIG. 11A.

Another variant of the candidate model first transforms the evidence likelihood using Bayes' rule:

$$P(e|s, M) = \frac{P(e|s, M)P(e|M)}{P(s|M)} \quad (8)$$

In an embodiment, the evidence conditional sequence probability can be re-written as:

$$P(s|e,M) = \Sigma_{j=1}^{K} P(s|c_j, e, M_{candidate}) P(c_j|e, M_{sequence}) \quad (9)$$

where $c_j$ is a single candidate, and as before, there are two submodels of M for a given evidence source: the candidate model $M_{candidate}$ and the sequence model $M_{sequence}$. In this case, the key assumption is:

Assumption 3:

The likelihood, under the model in question, can be expressed as a marginalization over candidates, where the target sequence is conditionally independent of the evidence, given the candidate.

Applying this assumption, the dependence on s can be dropped from the evidence term:

$$P(s|e,M) = \Sigma_{j=1}^{K} P(s|c_j, M_{sequence}) P(c_j|e, M_{candidate}) \quad (10)$$

Figure 11B:
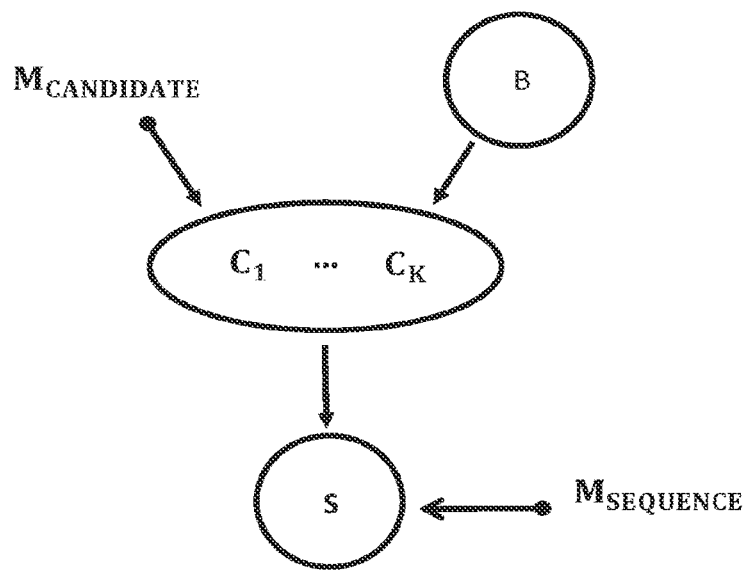

The graphical model for this version of the candidate model is illustrated in FIG. 11B, and the full evidence likelihood is:

$$P(e|s, M) = \frac{\Sigma_{j=1}^{K} P(s|c_j, M_{sequence}) P(c_j|e, M_{candidate}) P(e|M)}{P(s|M)} \quad (11)$$

Figure 12:
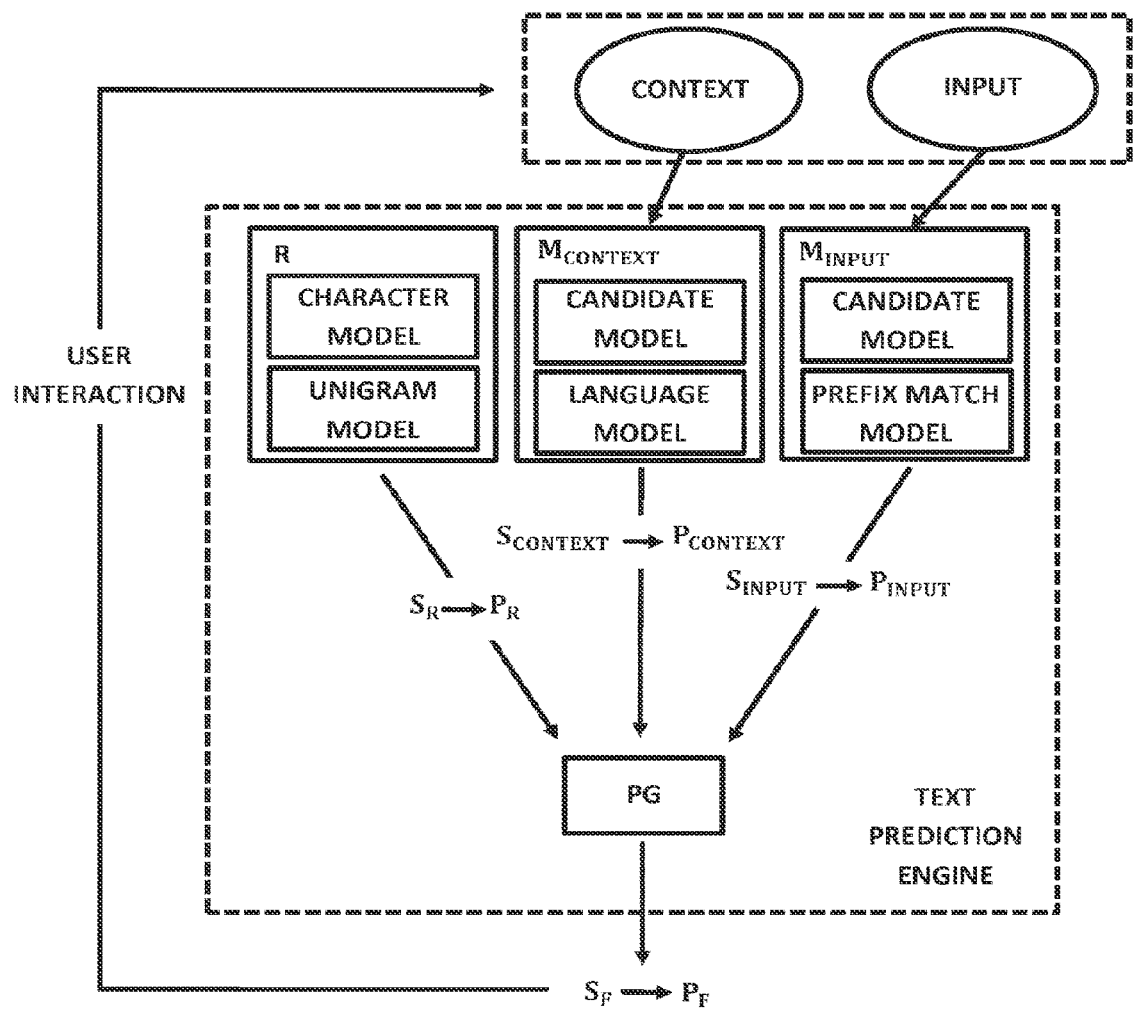
FIG. 12 illustrates an embodiment of an instantiation of the system from FIG. 10, in which the prediction engine takes evidence from a context source and an input source.

Using the general and candidate models, we now present a specific example of the system with reference to FIG. 12, which illustrates an embodiment of an instantiation of the system in which the prediction engine takes evidence from two distinct sources: context and input. However, as stated above, the system is not limited to taking the context and input sources as evidence. If other, or additional, evidence sources are used the system will be correspondingly configured to generate predictions on the basis of such evidence sources.

Informally, the context represents the observed evidence about what the user has already entered, while the input represents the observed evidence about what the user is currently entering. For instance, in English, if the user has entered the sequence "My name is B", we might consider the context evidence to be the sequence "My name is", and the input evidence to be the sequence "B". This is however, only by way of example, and it should be noted that in the most general form, the model says nothing concrete about the specific form of the observed evidence. For instance, the input evidence might actually be a series of touch coordinates from a virtual 'keyboard'.

As shown in FIG. 12, the evidence (input and context) is used as input to the prediction engine, within which there are preferably three models R, $M_{context}$, $M_{input}$, each of which is preferably comprised of at least two sub-models (character model, unigram model; candidate model, language model; candidate model, prefix match model). As can be seen in FIG. 12, the prediction engine preferably comprises a target sequence prior model R. Although preferred, the system is not limited to embodiments which include a target sequence prior model R.

The target sequence prior model R consists of:

Character Model—implements a distribution over sequences in a language without the concept of a fixed vocabulary. Usually implemented as a Markov model over character sequences.

A character model is a sequence model built from characters instead of words. For instance, if the training set is "explaining", a unigram character model might look like this:
P(e)=0.1
P(x)=0.1
P(p)=0.1
P(l)=0.1
P(a)=0.1
P(i)=0.2
P(n)=0.2
P(g)=0.1

A trigram character model might be as follows:
P(e)=0.1
P(x|e)=1.0
P(P|ex)=1.0
P(l|xp)=1.0
P(a|pl)=1.0
P(i|la)=1.0
P(n|ai)=1.0
P(i|in)=1.0
P(n|ni)=1.0
P(g|in)=1.0

Unigram Model—implements a distribution over sequences in a language without taking context into account, internally treating each sequence as an atomic entity.

For example, if the training set is "the dog chased the cat", the corresponding unigram language model might be:
P(the)→0.4
P(dog)→0.2
P(chased)→0.2
P(cat)→0.2

The context evidence model $M_{context}$ is comprised of a candidate model and a sequence model. The candidate model implements a conditional distribution over context observations given a particular candidate interpretation. The sequence model implements a conditional distribution over sequences in a language, or set of languages, given a particular context. In FIG. 12, the sequence model is illustrated as a language model which, in a preferred embodiment, comprises a set of language models corresponding to different languages, e.g. $LM_{French}$, $LM_{German}$, $LM_{English}$, etc.

The input evidence model $M_{input}$ is comprised of a candidate model and a sequence model. The candidate model implements a conditional distribution over input observations given a particular candidate interpretation. The sequence model implements a conditional distribution over candidates given an intended target sequence. This model is illustrated in FIG. 12 as a "prefix match model".

Each model, including the target sequence prior model R, may be updated with user entered text, depending on the scenario. By using dynamic language models, the system is able to more accurately predict a given user's intended text sequence.

Each model outputs a set of sequences $S_R$, $S_{context}$, $S_{input}$ and associated probability estimates $P_R$, $P_{context}$, $P_{input}$ which are used as input for the probability generator PG. The probability generator PG combines the probability estimates $P_R$, $P_{context}$, $P_{input}$ output from the models to generate a set of probability values $P_F$ for the final sequence predications $S_F$.

The final predictions $S_F$ can be displayed to the user via a user interface for user review and selection, or used by the system to automatically correct erroneously entered text.

Once a prediction has been selected, either automatically or by the user, this input is preferably added to the context evidence which is used to generate further predictions. If instead the user adds further input about the current word, by entering further characters, this is preferably added to the input evidence to alter the current probabilities assigned to the predictions.

The particulars of how the specific system of this embodiment may be generated from the mathematical basis will now be explained.

Instantiating expression (5) with the two evidence sources yields:

$$\frac{P(s \mid R)P(\text{context} \mid s, M_{context})P(\text{input} \mid s, M_{input})}{Z} \quad (12)$$

where Z=the normalisation constant, approximate to:

$$\Sigma_{j=1}^{|S|} P(s_j \mid R) P(\text{context} \mid s_j, M_{context}) P(\text{input} \mid s_j, M_{input}) \quad (13)$$

This approximation is implemented in the system as follows. Let us consider a function z over a set of sequences T, such that:

$$z(T) = \Sigma_{j=1}^{|T|} P(s_j \mid R) P(\text{context} \mid s_j, M_{context}) P(\text{input} \mid s_j, M_{input}) \quad (14)$$

Z is computed as:

$$Z = z(T) + z(\{u\}) * k \quad (15)$$

where u represents an "unknown" sequence, and k is an estimate of $|S|-|T|$, where $|S|$ is the number of sequences in the set of all possible target sequences, and $|T|$ is the number of sequences for which at least one of the underlying evidence models has a "known" estimate. Each individual evidence conditional model M will return an estimate of P(e|u,M), i.e. a distribution over evidence observations given the "unknown" sequence. In essence, this means that each evidence conditional model is responsible for its own distributional smoothing, but this must be related to k which is proportional to the overall estimated number of "unknown" sequences. In practice, each model will "know" about a set of sequences S' where $S' \subset S$, and estimates of P(e|s, M) will be constant and equivalent to P(e|u, M) for all $s \notin S'$. Smoothing of this nature is the means by which the system takes into account the varying levels of confidence in the models associated with each evidence source.

According to expressions (12) and (14), in order to determine the conditional probability $P(s \in S | e, M)$ for the example instantiation of the specific system, the following estimates are computed: a target sequence prior P(s|R); a context likelihood P(context|s, $M_{context}$); and an input likelihood P(input|s, $M_{input}$), Each of these estimates and how it may be computed is discussed below.

The target sequence prior is preferably computed as follows:

$$P(s \mid R) = \begin{cases} P(s \mid R_{unigram}) & \text{if } (s \in V) \\ P(s \mid R_{character}) & \text{otherwise} \end{cases}$$

where V is the set of sequences contained in $R_{unigram}$ and the implementation of the models is according to known techniques for constructing smoothed frequency-based unigram language models and smoothed Markov chain character models. A number of applicable techniques for implementing these models are listed below. However, other suitable techniques not listed also apply, including smoothed n-gram term or character models, adaptive multi language models, PPM (prediction by partial matching) language models, and morphological analysis engines configured to generate sequences probabilistically from constituent lexical components, among others.

By including a target sequence prior model R, the system provides an improved accuracy of intended sequence prediction. Furthermore, the target sequence prior model R enables character-based inference of unseen target sequences, i.e. the system is better able to infer unknown target sequences to approximate across all possible target sequences.

The context likelihood, P(context|s, $M_{context}$), is preferably estimated by means of the second candidate model to provide expression (16) below. Although this is the preferred means to estimate the likelihood, the invention is not limited to the likelihood being estimated in this way.

$$P(\text{context} \mid s, M_{context}) = \frac{\sum_{j=1}^{K} P(s \mid c_j, M_{context-sequence}) P(c_j \mid \text{context}, M_{context-candidate}) P(\text{context} \mid M_{context})}{P(s \mid M_{context})} \quad (16)$$

Thus, to determine the context likelihood, each of the following are computed: a context sequence estimate P(s|$c_j$, $M_{context-sequence}$); a context candidate estimate P($c_j$|context, $M_{context-candidate}$); a context prior estimate P(context|$M_{context}$); and a target sequence prior estimate P(s|$M_{context}$). Each of these estimates and how it may be computed is discussed below.

The context sequence estimate P(s|$c_j$, $M_{context-sequence}$) is the probability of the target sequence s given a particular candidate sequence $c_j$, under the context sequence model. Formally the context sequence model is a function that returns the probability of a target sequence given a context sequence, i.e. $f_S(t_{target}|t_{context}) = P(t_{target}|t_{context}, \theta_S)$ where $\theta_S$ are the parameters of the model. Thus, the context sequence probability is computed as: P(s|$c_i$,S)=$f_s$(s,$c_i$). A wide range of different techniques can be used to compute this estimate, for example, smoothed frequency analysis on the context training data, in a similar way to equation (21), and as described in relation to the target sequence prior estimate. Alternatively, any of the following can be used, individually or in combination: an n-gram language model, an adaptive multi language model, a PPM (prediction by partial matching) language model, a generative HMM (Hidden Markov Model) probabilistic part-of-speech tagger, a natural language parser configured to return probabilities for partial sentences, such as RASP; a neural network configured to accept as input features representing the contextual and target sequence, and output probabilities. The system is not limited to the above techniques; any other technique which can be used to compute the context sequence probability is applicable.

As stated previously, $M_{context-sequence}$ may comprise a plurality of language models corresponding to a plurality of different languages. To determine the conditional probability of equation (16), the conditional probability is determined using the language model associated with the term. As an explanation, the previous example of the prediction term "pain" being drawn from an English language model ($LM_{English}$) and a French language model ($LM_{French}$) is referred to. In this situation, equation (16) is determined as P(context|pain, $LM_{English}$) and P(context|pain, $LM_{French}$), where "Pain" drawn from $LM_{French}$ is different from that drawn from $LM_{English}$, even though the predictions are lexically identical. By associating the term with the model from which it is drawn, the system simplifies the way in which lexically identical terms are dealt with, since only the most probable term is retained from two or more lexically identical terms. Furthermore, the system provides a simplification of the calculation of the conditional probabilities of equation (16). This is possible because, although lexically identical, the terms may have a different meaning in different languages and can therefore be treated as distinct.

Thus, turning to FIG. 12, the set of terms $S_{context}$ generated by the model $M_{context}$ may comprise terms from any one of the language models (or candidate models) contained within $M_{context}$.

The context candidate estimate $P$ ($c_j$|context, $M_{context-candidate}$) is a function of the form: $f_{context-candidate}$(t)=P(t|$\theta_{context-candidate}$) where t is an arbitrary sequence and $\theta_{context-candidate}$ are the parameters of the model. Thus, the context candidate conditional estimate is computed as: $P(c_j|context, M_{context-candidate})=f_{context-candidate}(c_j)$.

In a preferred system, a context candidate is a sequence, and the set of context candidates is represented as a directed acyclic graph (DAG), where each node contains a subsequence consisting of one or more characters. Each of the edges is assigned a probability and, in a preferred embodiment, the DAG preferably also has the special property that each path is constrained to be the same length. This type of variant DAG is termed in this document as a probabilistic, constrained sequence graph (PCSG). Each individual candidate sequence is then represented by a unique path through the PCSG and the context candidate model function return value for a given candidate is computed as the probability of its representative path.

Formally, a PCSG consists of a 4-tuple containing a set of nodes N, a root node r, a set of directed edges E, and a set of parameters (probabilities) θ:

$$G=(N,r,E,\theta) \qquad (17)$$

An edge between two nodes n and n' is denoted by (n→n'), and the probability of moving from n to n' along the edge is denoted by P(n'|n). A path through G begins at node r and follows exactly one outgoing edge from each visited node until reaching a node that contains no outgoing edges. The following properties hold of G:

G is a directed, acyclic graph (DAG)

$\forall n \in N. \exists m.(m \to n) \in E \Rightarrow n=r$ i.e. all nodes except for the root must have at least one incoming edge.

$\exists m, k \in N. \forall n \in N.(m \to n) \in E \Rightarrow (n \to k) \in E$ i.e. all paths branching from a given node rejoin immediately at a subsequent common node. This property severely constrains the structure of the graph and implies that all paths have the same length, mitigating normalisation requirements on path probability computations.

The context candidate model function computes the probability of a given path as follows (equated with the context candidate estimate):

$$P(c_j|context, M_{context-candidate})=f_{context-candidate}(c_j)=P(p_j|G) \qquad (18)$$

where P($p_j$|G) is the path likelihood, computed as the product of each of the edges in the path:

$$P(p_j|G)=P(n_1|r)\Pi_{k=2}^{K}P(n_k|n_{k-1}) \qquad (19)$$

where K is the number of edges in the path. It can be noted that this preferred formulation amounts to an implicit independence assumption between nodes. This is so because in this case the sequential probability of the candidate sequence is not modelled, rather the probability of variations within the candidates is modelled. Hence, the following property holds over the probabilities on edges:

$$\forall n \in N. \Sigma_{(n \to m) \in E} P(m|n)=1 \qquad (20)$$

In other words, the probabilities on all outgoing edges from a given node n must sum to one. This also implies that the following holds: $\Sigma_i P(p_i|G)=1$ i.e. the sum over the probability of all paths in the PCSG equals one.

An example will help to clarify these concepts. Consider the following twelve context candidate sequences:

| | | |
|---|---|---|
| "Sunday at 3pm" | "sunday at 3pm" | "Sun at 3pm" |
| "Sunday at 3 pm" | "sunday at 3 pm" | "Sun at 3 pm" |
| "Sunday at 3p.m." | "sunday at 3p.m." | "Sun at 3p.m." |
| "Sunday at 3 p.m." | "sunday at 3 p.m." | "Sun at 3 p.m." |

Figure 13A:
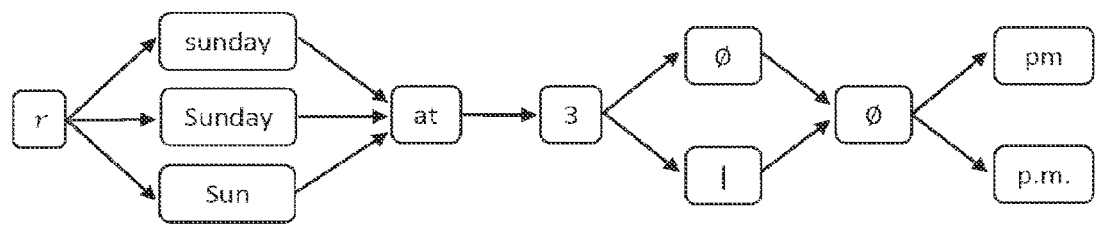
FIGS. 13-15 illustrate various steps involved in the construction of a probabilistic, constrained sequence graph.

These would be represented by the following PCSG (explicit word boundary denoted by '|' and the empty sequence by 'Ø', illustrated in FIG. 13A.

Figure 13B:
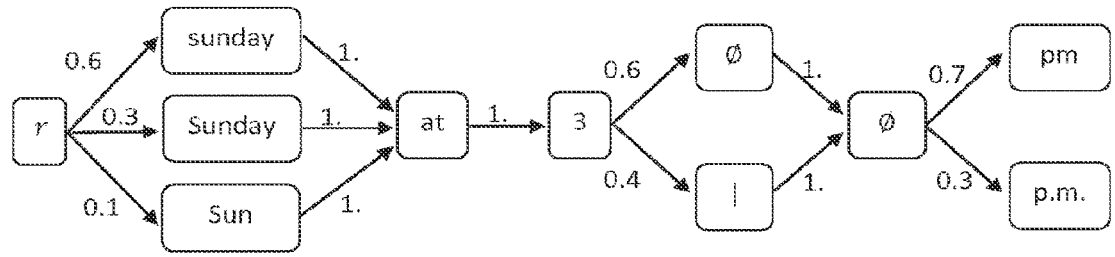

Probabilities are assigned to the edges according to the context candidate model, following (19), for instance as illustrated in FIG. 13B.

Candidate probabilities for the twelve sequences above are then generated from the PCSG as follows (showing just three examples for brevity):

P("sunday at 3 pm"|"sunday at 3 pm", C)=0.6*1.0*1.0*0.6*1.0*0.7=0.252

P("Sunday at 3 pm"|"sunday at 3 pm", C)=0.3*1.0*1.0*0.4*1.0*0.7=0.084

P("Sun at 3 p.m."|"sunday at 3 pm", C)=0.1*1.0*1.0*0.4*1.0*0.3=0.012

The specifics of the model used to construct the DAG and assign probabilities to nodes will vary depending on the particular instance of the system. The above schema encodes instances of three general variations: (1) branch (potentially unambiguously) at word boundaries; (2) branch at case variation; and (3) branch at lexical variation.

It will be understood that any type of variation can be encoded in this framework. Another example would be to branch on previous suggestions, e.g. if the system had predicted both "on" and "in" and the user had selected "in", this can be encoded as a branch with the weight of probability assigned to "in" but with a small probability assigned to "on" to represent the possibility that the user accidentally accepted the wrong suggestion. In the above case, the following principles are encoded: (1) 'sunday' with a lower case initial 's' is less probable than the abbreviated form 'Sun', which is itself less probable than the full variant 'Sunday'; (2) the tokenisation case where "pm" is separated from the number "3" is slightly less probable than the case where it's not; and (3) the period variant "p.m." is somewhat less probable than the non-period form "pm".

A particular instance of the context candidate PCSG is preferably constructed algorithmically from an initial sequence s in the following manner: (1) Turn s into a PCSG by encapsulating it within a single node $n^s$, connected to the root; (2) Iteratively deconstruct $n^s$ by introducing branching nodes at variation points.

Figure 13C:
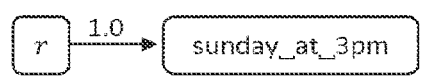

For example, the PCSG construction algorithm operating on an original sequence "sunday at 3 pm" is considered. Firstly step 1, illustrated in FIG. 13C.

Figure 13D:
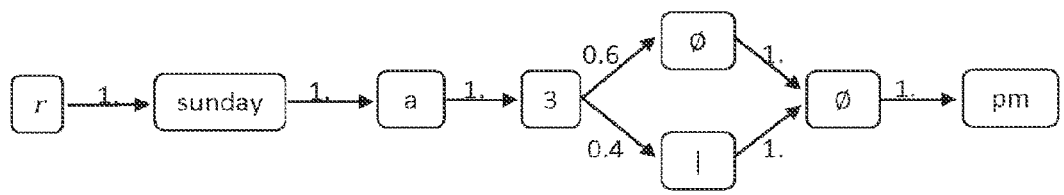

The system deploys a probabilistic tokenizer, the result in illustrated in FIG. 13D.

Figure 13E:
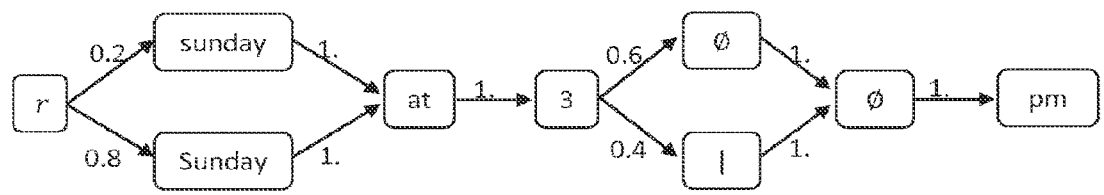
Figure 13F:
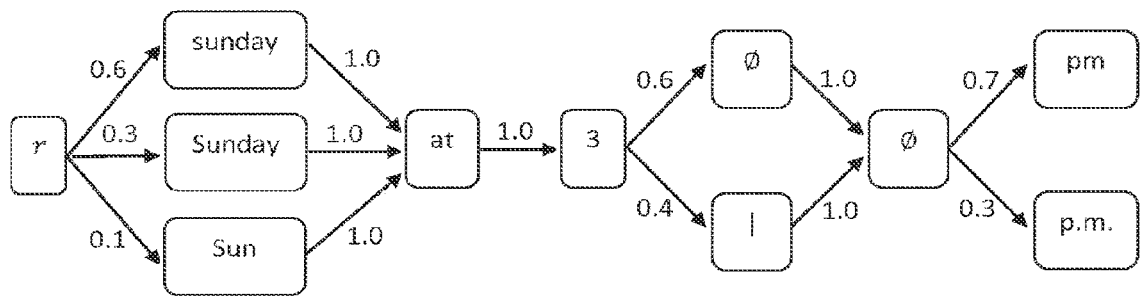

Note that a modification will always take the form of a branch-and-rejoin structural insertion, due to PCSG property 3 above, with the special case being a branch of one node, which is a convenience for subsequent processing as it does not affect overall path probabilities. Edge probabilities are added according to the model, which is explained in further detail below. Continuing the algorithm, a case variant analyser is deployed, as illustrated in FIG. 13E. And finally a lexical variant analyser is deployed, as illustrated in FIG. 13F.

Note that due to PCSG property 3, branches must converge before re-branching. This means that in some cases an empty node must be inserted, if two branch points occur contiguously.

Edge probabilities are preferably assigned to the PCSGs. The assignment of edge probabilities is preferably carried out with respect to the parameters of the context candidate model. The intuitive interpretation of these probabilities is twofold. First, they represent an estimate of the likelihood that the user intended the sequence assigned to a particular branch. For example, if a user has entered "Dear ben", we might want to allow, with some probability, that they actually intended to enter "Dear Ben". Second, they represent a "backoff" likelihood that a particular branch is a valid orthographic variant of the observed sequence. For example, if the user has entered "See you on Thur", an alternative orthographic form of "Thur" would be "Thurs".

The probability assigned to a particular edge can also be influenced by the estimated likelihood of that orthographic variant given some background model information. For instance, the context sequence model S can actually be reused to obtain an estimate of the likelihood of different orthographic variants, which can be used in combination with other probabilistic measures to yield branch probabilities. Utilising the context sequence model in this manner means that the context candidate model C actually contains an instance of the context sequence model S, which results in an obvious violation of the independence assumption between the candidate and sequence models (property 7 above); however, this assumption is never actually called upon in the context case so it is relatively safe.

Figure 14A:
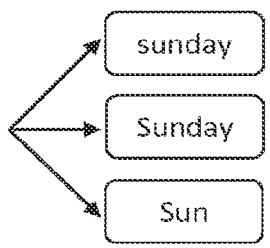

An example will help to clarify. In a preferred embodiment, it is assumed that the context candidate model assigns probabilities using the following algorithm: (1) Observed sequence receives 0.8 probability, others receive the balance uniformly; (2) Values are scaled by the context sequence model estimates; (3) Values are normalised to comply with PCSG property (19) above. From the above PCSG example, the branch illustrated in FIG. 14A can be considered.

As "sunday" is the original observation, it will initially be assigned a probability of 0.8 by stage one of the above algorithm, and the other edges will each be assigned 0.1. For the example where the estimates returned by the context sequence model are as follow:

P("sunday"|$C^s$)=0.01

P("Sunday"|$C^s$)=0.04

Figure 14B:
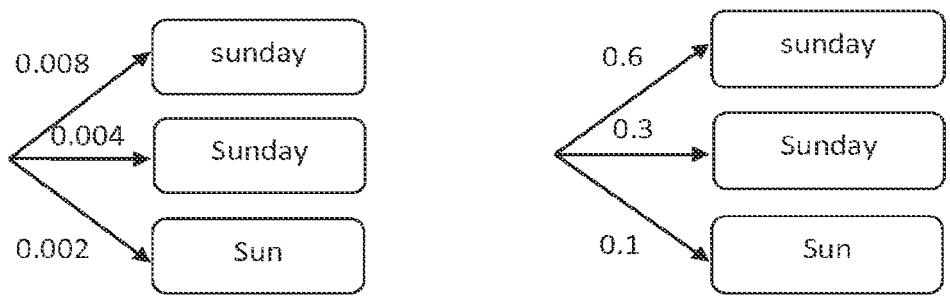

P("Sun"|$C^s$)=0.02 where $C^s$ denotes that the context candidate model is utilising the context sequence model in this case. Thus, in this example the unnormalised and normalised (rounded) probabilities assigned to each edge are as illustrated in FIG. 14B, with the unnormalised probabilities on the left side of the figure and the normalised probabilities on the right side of the figure.

The context prior, P(context|$M_{context}$) can be approximated by normalising the frequency of the original sequence t associated with context $$P(\text{context}| M_{context}) \cong \frac{freq(t)}{\Sigma_{t'} freq(t')} \qquad (21)$$

where freq(t) is the frequency of sequence t in the training data and the denominator is the sum of the frequencies of all sequences in the training data. The sequence "t" in expression (21) is the current context, as input into the system. The context prior weights the probability values of predictions according to the probability that the corresponding model from which the prediction was drawn, comprises a given context sequence. To do this, the context prior weights the predictions values according to the estimate of expression (21).

In practice, this estimate would be smoothed, for example by positing an occurrence assumption on unseen sequences, or by backing off to restricted (lower order) estimates in instances where the full sequence is unseen. For example, if the context is a trigram, the prediction engine may be configured to back off to constituent bigram or unigram estimates.

The context prior provides a dual function: It helps to normalise the probability estimate; and provides simple 'model detection' when the context model is unable to provide useful information. If the context sequence estimate is uninformative (such as when the last term is unknown to an N-gram model), the context prior estimate will weigh more heavily the model with the most likely context, promoting the predictions of this model above those from other models. The "most likely context" is the maximum of estimate (21) over the set of models, for example over the set of language models $LM_{English}$, $LM_{French}$, $LM_{German}$ etc. For example, if the context is "The dog chased", it would be expected that this is significantly more likely to appear in English than in French. Thus, the conditional probability of equation (21) will be greatest for $LM_{English}$, and the probability generator will therefore weight the probability values of predictions drawn from $LM_{English}$ more heavily than those drawn from $LM_{French}$; thus $LM_{English}$ is 'favoured' by the context prior estimate.

Thus, the context prior estimate weights more heavily the most appropriate language model from a plurality of language models relating to a plurality of languages, given the context. In this sense, the context prior estimate is able to detect the language in which someone is inputting text.

The target sequence prior, P(s|$M_{context}$) can be estimated using smoothed frequency analysis on the training data, in a similar way to the context prior estimate, equation (21), e.g. the target sequence prior can be approximated by normalising the frequency of the target sequence over all sequences in the context training data $$P(s | M_{context}) \cong \frac{freq(s)}{\sum_{s'} freq(s')}$$

where freq(s) is the frequency of the target sequence in the training data and the denominator is the sum of all the frequencies of all target sequences in the training data. The denominator can equivalently be approximately determined as the total number of terms in the training data (counting duplicates).

The input likelihood, $P(\text{input}|s, M_{input})$, is estimated by means of the first candidate model:

$$P(\text{input}|s, M_{input}) = \sum_{j=1}^{K} P(\text{input}|c_j, M_{input\text{-}candidate}) P(c_j|s, M_{input\text{-}sequence}) \quad (22)$$

Thus, to determine the input likelihood, the following estimates need to be computed: an input candidate estimate, $P(\text{input}|c_j, M_{input\text{-}candidate})$; and an input sequence estimate, $P(c_j|s, M_{input\text{-}sequence})$. Each estimate is described below.

The input candidate estimate, $P(\text{input}|c_j, M_{input\text{-}candidate})$ is defined as a function on observed input events and sequences: $f_{input\text{-}candidate}(i,t) = (i|t, \theta_{input\text{-}candidate})$ where $\theta_{input\text{-}candidate}$ are the parameters of the model. An arbitrary input observation i is encoded in an input sequence intention structure (ISIS), which is an ordered list of sets of sequences mapped to probabilities:

$\{(t_{11} \rightarrow P(i_1|t_{11}), (t_{12} \rightarrow P(i_1|t_{12}), \ldots\}, \{(t_{21} \rightarrow P(i_2|t_{21}), (t_{22} \rightarrow P(i_2|t_{22}), \ldots\}, \ldots$.

Note that each individual estimate has the form $P(i_j|t_{jk})$, i.e. if the user had intended to enter the sequence $t_{jk}$, what's the probability that we would have observed input event $i_j$. Consider the following ISIS example:

$$\begin{bmatrix} \{(H \rightarrow 0.5), (h \rightarrow 0.3), (g \rightarrow 0.1), (j \rightarrow 0.1)\} \\ \{(e \rightarrow 0.8), (w \rightarrow 0.1), (r \rightarrow 0.1)\} \end{bmatrix}$$

This encodes the scenario in which the system estimates that had the user intended to enter, e.g., the character 'H' followed by the character 'e', so the observed input events would be expected to have the respective probabilities of 0.5 and 0.8.

The method by which these probability distributions are generated is not the subject of this disclosure. Rather it is highlighted that a range of techniques are applicable. For instance, distributions can be generated on the basis of the characters that surround a given target key on a particular keyboard layout, e.g. for a QWERTY keyboard, if the user tapped the area corresponding to the "H" key, the characters "G" and "J" might be included in the ISIS, with some probability. As yet another example, distributions can be generated on the basis of the distances (or some function of the distances, such as the square etc.) between the touch coordinate (on a touch-screen virtual keyboard) and the coordinates of designated keys.

In the preferred system, an input candidate is a sequence, and the set of input candidates is represented as an extended PCSG (EPCSG). An EPCSG is a PCSG but with one additional structure that violates standard PCSG properties (defined below). As in the context case, each individual candidate sequence is represented by a unique path through the EPCSG and the input candidate model function return value for a given candidate is computed as the normalised probability of its representative path.

The input candidate EPCSG generation process starts with an ordered list of sets of sequence-probability pairs, generated by the system from user interaction, where each subset represents a probability distribution over user input sequence intentions.

Figure 15A:
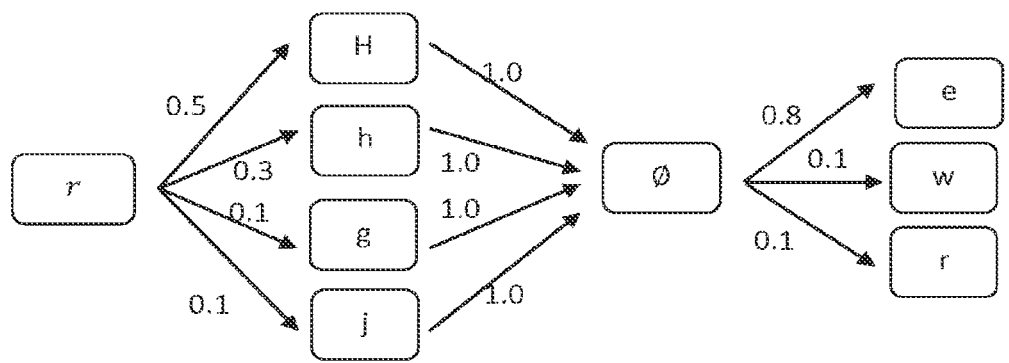
Figure 15B:
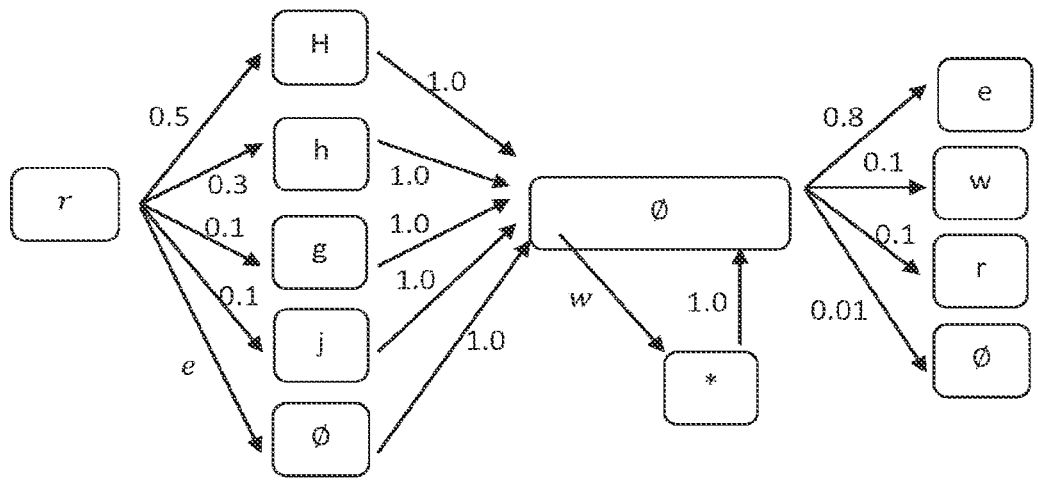

The algorithm to generate an input candidate EPCSG from an input ISIS has two stages: (1) Convert the ISIS into a PCSG; (2) Insert additional generalising structures, resulting in an EPCSG. Stage one is straightforward. Beginning with the root node of a new PCSG, the algorithm constructs branches for each distribution in the ISIS. The result of stage one for the above ISIS is illustrated in FIG. 15A. Stage two embellishes the existing PCSG with two additional structures. The first is an empty node sub-path (which falls within the PCSG framework), and the second is a 'wildcard' structure (which converts the PCSG into an EPCSG). An example application of stage two is illustrated in FIG. 15B.

The wildcard symbol (denoted by '*') is actually shorthand for a branch that includes/generates every symbol in the character set. The wildcard structure is a constrained cycle and therefore violates the acyclic property of the standard PCSG. The EPCSG extension licenses the use of a wildcard cycle at convergence points only. The values e and w are pre-specified probability constants. Note that in this case each branch point has the empty node addition (two in this case), and each convergence point has the wildcard addition (one in this case). These generalisations allow for instances where the user omitted one or more characters from the target sequence (with the wildcard probability w) or inserted one or more erroneous characters (with the empty node probability e). It will be understood that the specifics of how these extra structures are added to the PCSG will vary with different instantiations of the system, depending on computational resources, sequence model strength, etc.

The empty node sub-path enables the system to disregard a character which has been erroneously entered by the user, and which would otherwise lead to an incorrect chain through the PCGS.

With the addition of the generalisation structures (especially the wildcard branch), the number of paths through the PCSG grows rapidly. For instance, given a character set size of 50 there are 1020 unique paths through the simple PCSG above. For a real-world ISIS, there can be tens or even hundreds of thousands of unique paths. The preferred system preferably utilises the following techniques, alone or in any combination, to handle this combinatorial explosion: a trie; probabilistic thresholding to prune paths that are relatively improbable; and the input sequence model T used for probabilistic thresholding.

A trie (as known in the art) is used to ignore paths that are not prefixes of sequences within the prediction vocabulary. Probabilistic thresholding is used to prune paths that are relatively improbable. A threshold is set on the ratio between the current most probable sequence and the differential for less probable sequences. Given threshold t, and a currently investigated path length L, a path $n_1 \ldots n_L$ is pruned if the following holds:

$$\frac{P(n_1|r)\prod_{j=2}^{L} P(n_j|n_{j-1})}{argmax_m[P(m_1|r)\prod_{j=2}^{L} P(m_j|m_{j-1})]} < t \quad (23)$$

The input sequence model T is also used for probabilistic thresholding. Given a distinct or tied threshold t, and a set of sequences formed by all paths of length L: $\{c_1, \ldots, c_K\}$ a given path p representing a particular sequence $c_p$ is pruned if the following holds:

$$\frac{P(c_p|T)}{argmax_j[P(c_j|T)]} < t \quad (24)$$

Other techniques which are suitable for handling the combinatorial explosion can also be employed by themselves, or in combination with one or all of the above techniques.

The input sequence estimate, $P(c_j|s, M_{input\text{-}sequence})$ is a distribution over candidate sequences given a target sequence, and can be estimated as a normalised indicator function:

$$P(c_j | s, M_{input\text{-}sequence}) = \frac{\delta(s, c_j)}{Z} \quad (25)$$

where $\delta(t, t')=1$ if $t'$ is a prefix of $t$ and $0$ otherwise, and $Z=\Sigma_k \delta(s, c_k)$, i.e. the sum over all candidates.

Note that if uniqueness of candidates is assumed, and the set of candidates is allowed to include all possible sequences, the normalisation factor can be re-cast: $Z=\text{length}(s)$. For example, given the target sequence "the", there will always be precisely three matching candidates: "t", "th" and "the".

Thus, embodiments provide a general text prediction engine and system, and a specific example of that text prediction engine or system, which is configured to generate a set of sequence predictions $S_F$, each with an associated probability value $P_F$.

Embodiments also provide a corresponding method for processing user text input. Turning to FIG. 10 and the above described system, the method comprises receiving text input into a user interface, e.g. of an electronic device; generating, using a text prediction engine, sequence predictions $S_F$ and associated probability values $P_F$; and providing the sequence predictions to the user interface.

As discussed in relation to the system, the general method comprises generating sequence predictions and associated probability values by a text prediction engine which comprises one or more models. In a preferred embodiment, the method comprises generating sequence predictions from a target prior model R and from at least one model $M_1$, $M_2$, etc. which uses at least one evidence source $e_1$, $e_2$, etc. to generate predictions. As discussed above, in relation to the system and, in particular, expressions (12) to (15), the method comprises generating normalised probability values by estimating a normalisation factor for the probability values by summing the probability values for the n most probable sequence predictions and a constant representative of the remaining possible sequence predictions.

With reference to FIG. 12, in the preferred embodiment, the final set of predictions $S_F$ and associated probability values $P_F$ are generated by a probability generator PG, from sets of predictions $S_R$, $S_{context}$, $S_{input}$ which have been drawn from a target prior model R, a context model $M_{context}$, and an input model $M_{input}$, respectively. In this embodiment, the context of a user entered sequence is used as evidence to draw predictions from the context model $M_{context}$, and a user entered sequence relating to the current word the user is attempting to enter is used as evidence to draw predictions from the input model $M_{input}$.

Other aspects of the method are analogous to the system described above, e.g. in one embodiment of the method, the sequence predictions are only provided to the user interface if their corresponding probability values are each greater than or equal a first threshold value.

As discussed above in relation to a system implementing generalisation structures (and especially a wildcard branch) in a PCSG to determine a context candidate estimate, in a preferred embodiment of the method, at least one of the set of sequence predictions corresponds to an adjusted or corrected version of text input by a user into the user interface.

An alternative embodiment is directed to an interface for a small screen device, such as a watch, that enables a user to enter text on the small screen device by touching in the vicinity of characters, rather than aiming for a particular button or the exact location of a character. Embodiments further enable the design of interfaces without the use of buttons for controlling the entry of text on the small screen device.

Figure 16A:
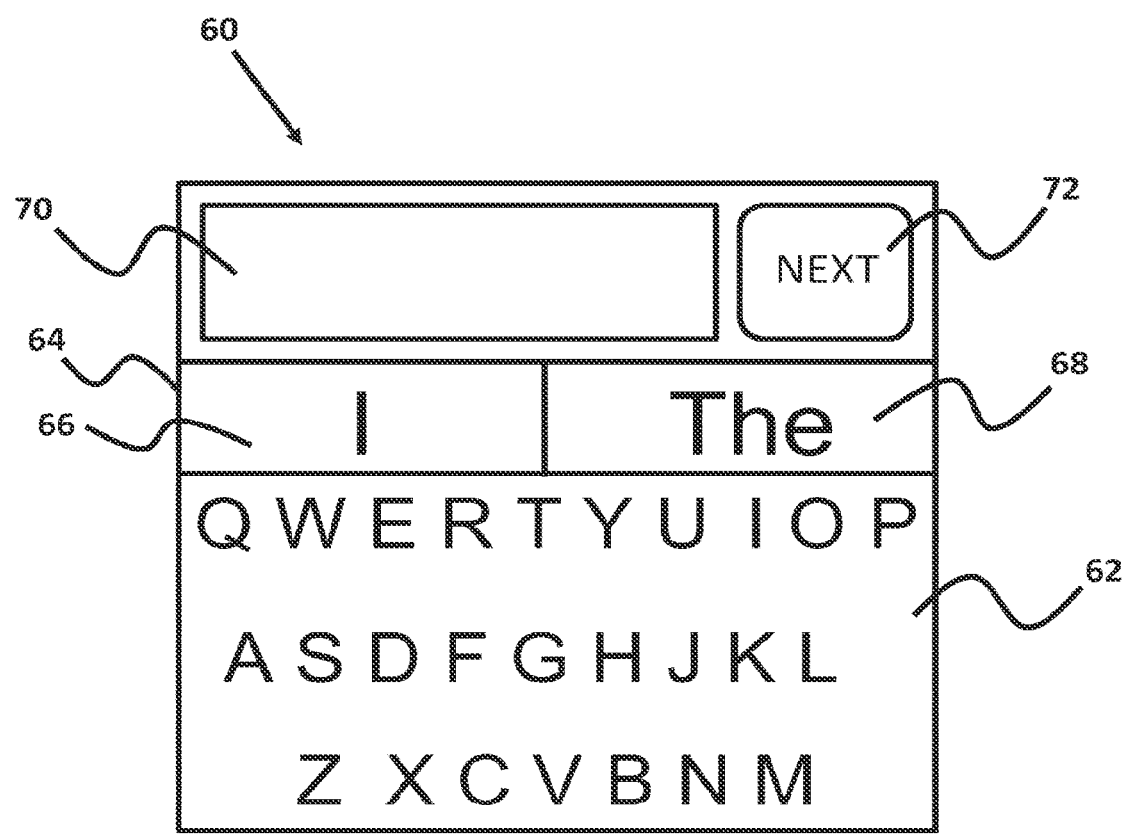
FIGS. 16A-16C illustrate an alternative embodiment of an interface without buttons for a small screen device.

FIG. 16A illustrates an embodiment of an interface 60 for entering text on a small screen device. The interface 60 is a touch-screen interface without buttons that can be used to enter text on a plurality of applications. The interface 60 includes a character pane 62, which allows character entry and is analogous to the soft keyboard (on-screen keyboard) in existing touchscreen or virtual text entry systems. The character pane 62 covers about half of the interface 60 and displays a QWERTY-style character layout.

Embodiments of the present interface differ from existing text entry interfaces in (1) using a QWERTY-style character layout on a small screen, (2) removing the concept of "buttons" representing keys on the keyboard and allowing a user to enter text by touching in the vicinity of a character rather than aiming for a particular key, and (3) replacing the use of buttons to provide functionality, such as deleting characters or presenting additional word suggestions, with on-screen gestures. Additionally, the combination of the disclosed interface with a probabilistic text prediction engine allows the user to enter text by selecting word candidates as they are presented before the characters corresponding to the word have been completely entered, allowing minimal interaction with the character pane and faster entry of text.

As used herein, a "QWERTY-style" arrangement refers generally to the arrangement of letters, as shown in FIG. 16A, where the letters QWERTYUIOP form a first row, the letters ASDFGHJKL form a second row positioned below the first row, and the letters ZXCVBNM form a third row positioned below the second row. In an embodiment, the QWERTY-style arrangement only includes letters and no punctuation or special characters. In an alternative embodiment, punctuation symbols, special characters, numbers, etc., such as shown in FIG. 16C, are accessible by changing the screen through various gesture movements. Finally, while embodiments are described in terms of a QWERTY-style character layout, alternative embodiments can include any layout that corresponds to full keyboards used for different languages, or any full keyboard where it would not be possible for a user to select a single key, without ambiguity, among a plurality of keys.

Embodiments of the interface 60 do not require the use of buttons. Buttons can be eliminated from the interface 60 by combining a text prediction engine with a target modeling module. The target modeling module estimates, based on the area/region of the screen touched by the user, the most likely targets selected by the user. The text prediction engine can be any engine or language model for predicting words or phrases, or it can be a text prediction engine as described above in reference to FIGS. 1-15.

Figure 9:
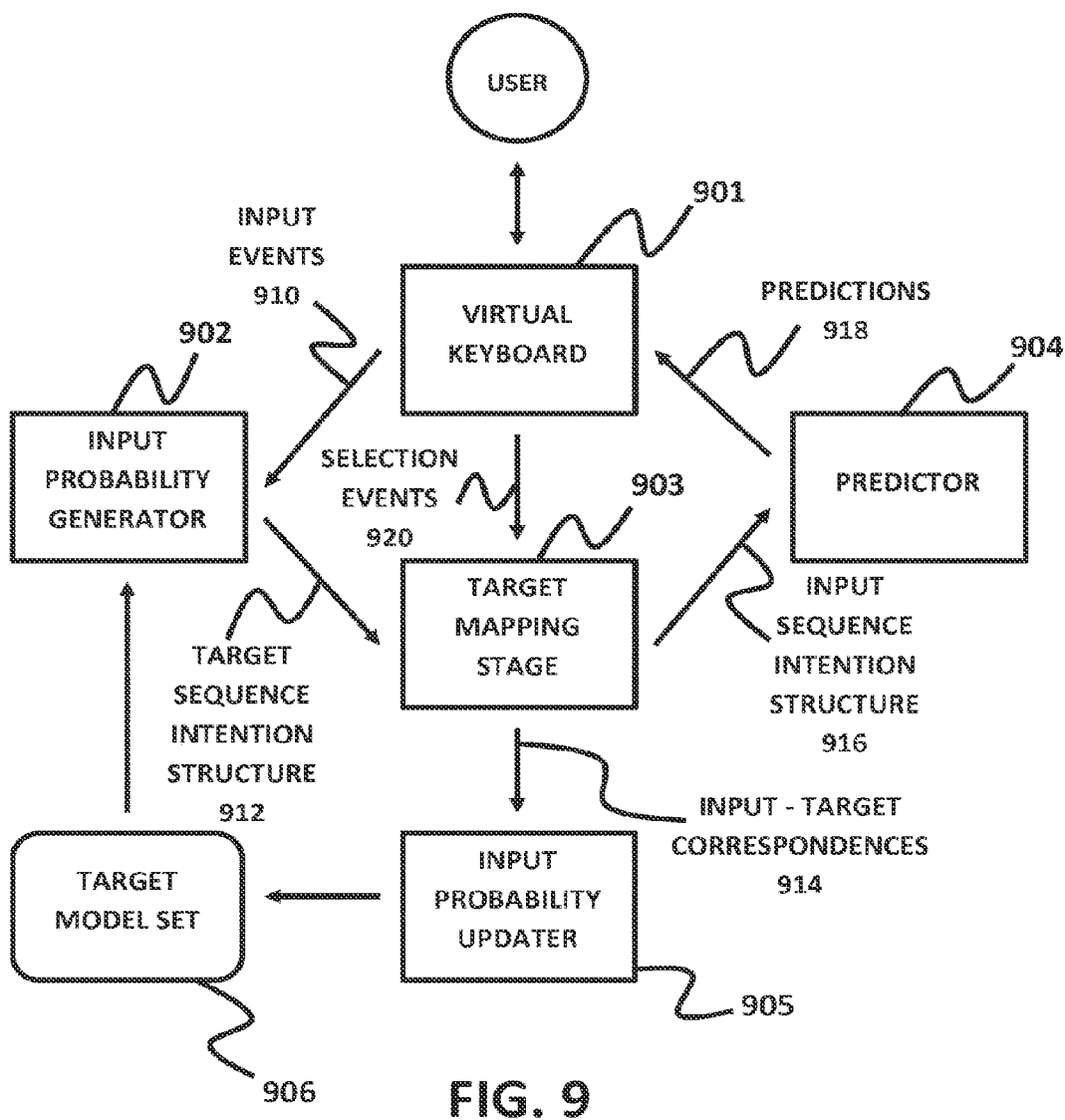
FIG. 9 is a schematic of a system architecture of a system that adapts to learn a user and learns the style in which a user inputs text by modeling the user's historical interaction with the system.

The target modeling module is preferably comprised of the target model set 906 as described in reference to FIG. 9. The target model set 906 can be queried by the input probability generator 902 to return (1) one or more likely targets and (2) the probability for each target that the user had intended to select that target through an input event. The target model set 906 can be trained in order to update the models of the target model set 906 in response to selection events. The incremental learning and retraining of the target model set 906 allows the target model set 906 to adapt to the user's writing style.

As noted above, whenever a user makes a selection event (by selecting a word/phrase prediction displayed on the prediction pane 64), the one or more likely targets are matched to the corresponding input events. For example, assume that a user makes touch-1 near the letter "T", followed by touch-2 near the letter "h", and lastly makes a selection event by selecting the word "The" from the prediction pane 64. The selection event would result in (1) the matching of touch-1 with the letter "T" and (2) the matching of touch-2 with the letter "h". The matched data can then be used as additional training points for the incremental learning of the target model set 906. It is to be understood that each of touch-1 and touch-2 would have resulted in a plurality of likely targets due to the size of the small screen interface. For instance, touch-1 may have resulted in likely target "T" with a probability of 0.5, likely target "R" with a probability of 0.25, and likely target "F" with a probability of 0.25. Similarly, touch-2 would have resulted in one or more likely targets and their associated probabilities. Thus, selection events create concrete associations between the locations of touches on the screen of interface 60 with likely targets.

The combination of the target modeling module with the text prediction engine makes it possible to have a QWERTY-style arrangement on interface 60, even though it might not be possible for the user to exactly touch the portion of the screen corresponding to a specific letter. For instance, if the user has already entered the characters "t" and "h", and the user presses the screen in the vicinity of the letter "e" (but not the exact portion of the screen corresponding to the letter "e"), then the letter "e" will be selected based on a prediction that the letter "e" would follow the prior entries of "t" and "h" and the fact that the user then touched the screen in the vicinity of the letter "e", thereby indicating that the user intended to enter the word "the".

The use of a QWERTY-style character layout on a small screen device is nonobvious as it is common practice to use a multi-tap or disambiguative keyboard to enter text in small screen devices. In multi-tap keyboards, such as keyboards based on the number buttons for a telephone, each key provides access to a list of letters. A key is pressed multiple times to access the list of letters on that key. For example, a first key may provide access to letters "ABC". In order to type the letter "B", the first key would have to be pressed twice, and to type the letter "C" would require the first key to be pressed three times. In disambiguative keyboards, multiple characters are associated with a single key and likely intended words are chosen from an underlying dictionary. This is commonly known in the art as "predictive text".

Embodiments of the present interface 60, illustrated in FIG. 16A, differ at least in its use of a QWERTY-style character layout given the size of the screen space and by not using buttons. In a small screen device, the use of many buttons in close proximity to one another, as would be required by a QWERTY character layout, would make it difficult for text entry without the use of a fine tip or a stylus with a fine tip. While a finger can be used to select the first one or two letters of a word with a QWERTY character layout on a small screen device, the selection of multiple letters using only a finger would likely lead to a user pressing at least two buttons or the wrong button, and lead to frustration. Thus, embodiments described herein use a text prediction engine to predict words or phrases being entered by the user, and use the proximity of a user's touch to a character to predict the next character likely intended to be selected by the user from the character pane.

Figure 16B:
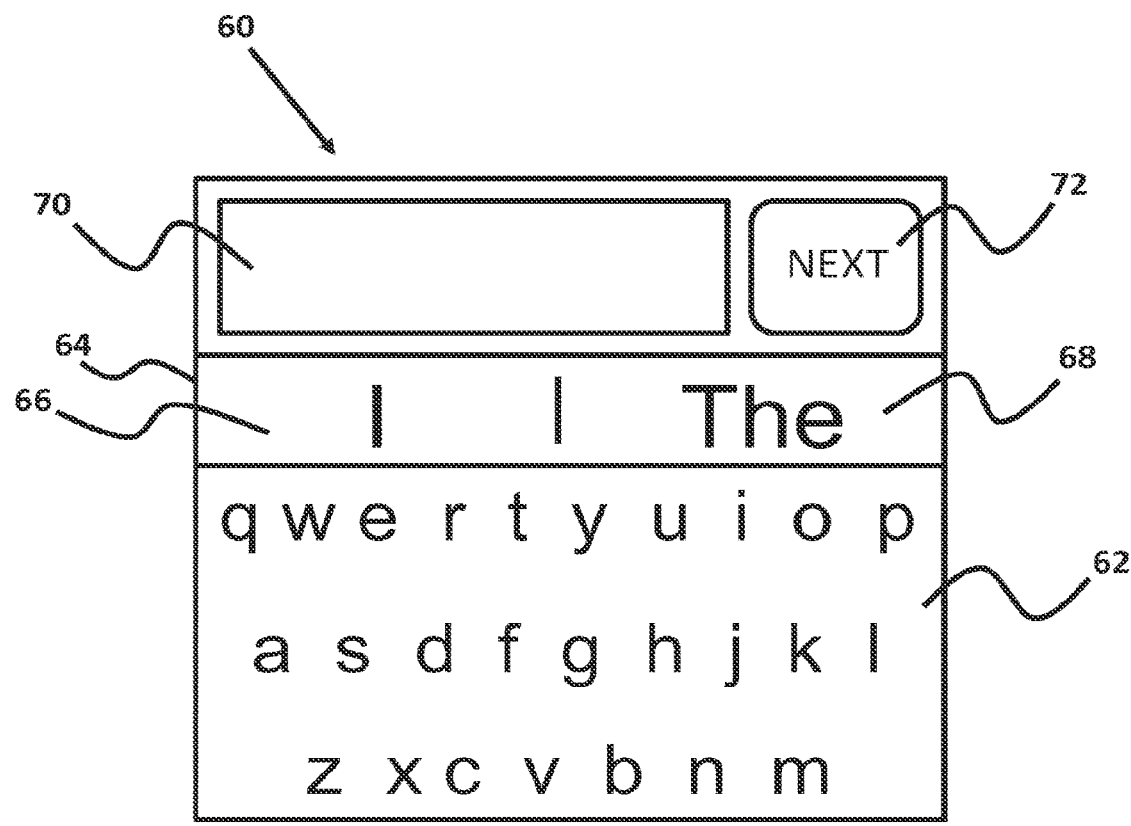
Figure 16C:
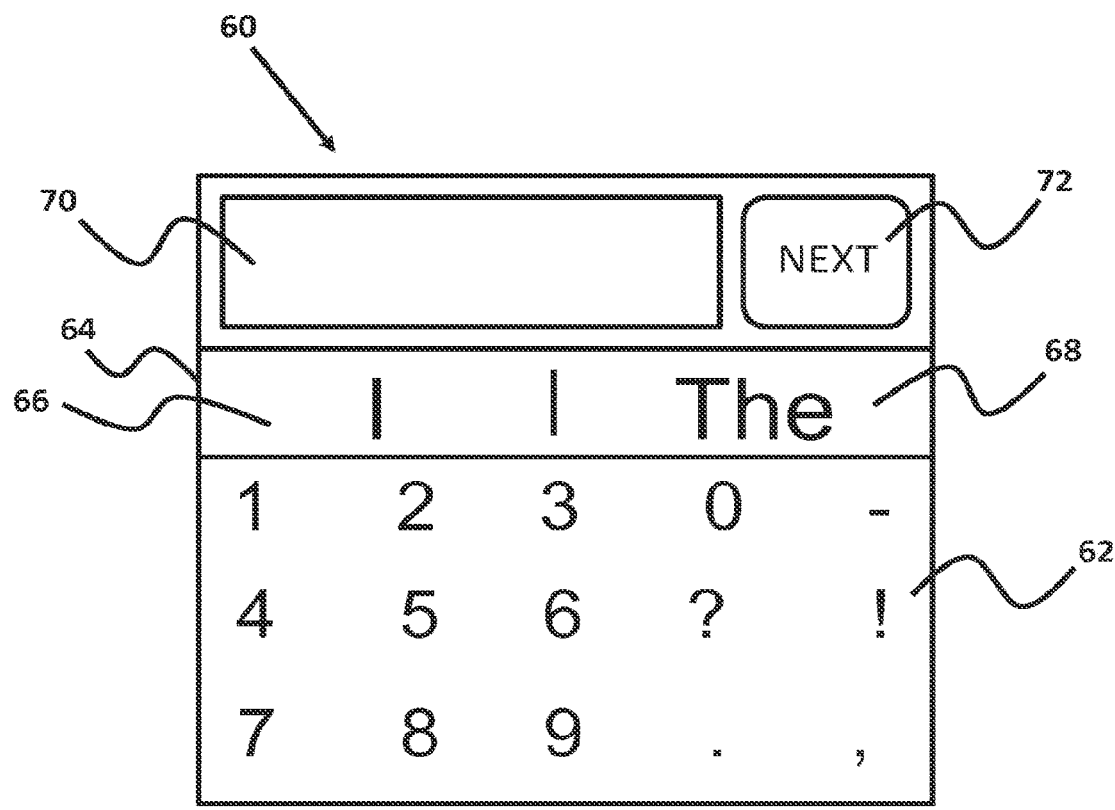

In further reference to FIGS. 16A-16C, a prediction pane 64 is displayed on top of the character pane 62. The prediction pane 64 includes a first predicted word pane 66 and a second predicted word pane 68. In FIG. 16A the first predicted pane 66 displays the text "I" and the second predicted pane 68 displays the text "The". The prediction pane 64 need not display exactly two words, but it can also display only a single word or more than two words. Given that interface 60 is illustrated as an interface for a small screen device, having two predicted word panes is ideal as it makes the most efficient use of the space available, while having three or more predicted word panes would crowd the interface. In an alternative embodiment, the number of words displayed in the prediction pane 64 can be based on the length of the words predicted. For instance, if two words are displayed in the prediction pane 64 leaving sufficient space for a third word, then three words can be dynamically displayed instead. If the words do not fit entirely within the prediction pane 64, then the first portion of each word can be displayed, with the rest of the word cut off by using a color gradient or by using an ellipsis. The size of the font used for the words displayed within the prediction pane 64 can also be dynamically modified to fit the space available within the predicted word panes 66 and 68. For instance, longer words can be displayed in a smaller font than shorter words so that both a long word and a short word can be fully displayed within the same space.

The words displayed on the prediction pane 64 are generated by embodiments of a text prediction engine. Even when the user has not entered any text, the text prediction engine can generate preliminary predictions and communicate those to the interface 60 to be displayed on the prediction pane 64. For example, the text prediction engine can predict definite or indefinite articles when no text has been entered by the user. Alternatively, the text prediction engine can keep track of the words most commonly used by the user to start text entries and recommend these words when no text has been entered. Embodiments of the text prediction engine can consist of the text prediction engine as described in reference to FIGS. 1-8, the text prediction engine as described in reference to FIG. 9, or the text prediction engine as described in reference to FIGS. 10-15. This approach allows the user to enter text by selecting word candidates as they are presented before the characters corresponding to the word have been completely entered, allowing minimal interaction with the character pane 62 and faster entry of text.

The interface 60 also includes a typing pane 70, which displays the text that has been typed by the user, and a next pane 72, used to finalize the text entry. The next pane 72 is optional, as swipe gestures can also be used to finalize text entry. In particular, embodiments of the interface 60 replace button functionality with swipe gestures in order to maximize the amount of content that can be displayed on small screens. For example, swiping the screen of the small screen device from left to right can query the text prediction system and cause it to display alternative word predictions on the prediction pane 64. Swiping the screen of the device from right to left can be used to delete single characters, delete an entire word, or perform an undo operation. Swiping from up to down can change the character pane 62 layout to numbers and punctuation. Swiping from down to up can change the case of the character pane 62, such as from all caps to lowercase and vice versa. Naturally, any of a number of different swiping or gesture movements could be used in place of those noted.

As illustrated in FIG. 16B, the interface 60 is shown after the user has swiped up to change the case of the character pane 62 from all capitals letters to lowercase letters. FIG. 16C illustrates the interface 60 after swiping down to change the character pane 62 from the QWERTY-style layout to numbers and punctuation. As noted, embodiments are not limited to the gestures described herein, as different gestures can be used to change the case of the character pane, to change the character layout, and to perform additional functions.

Figure 17:
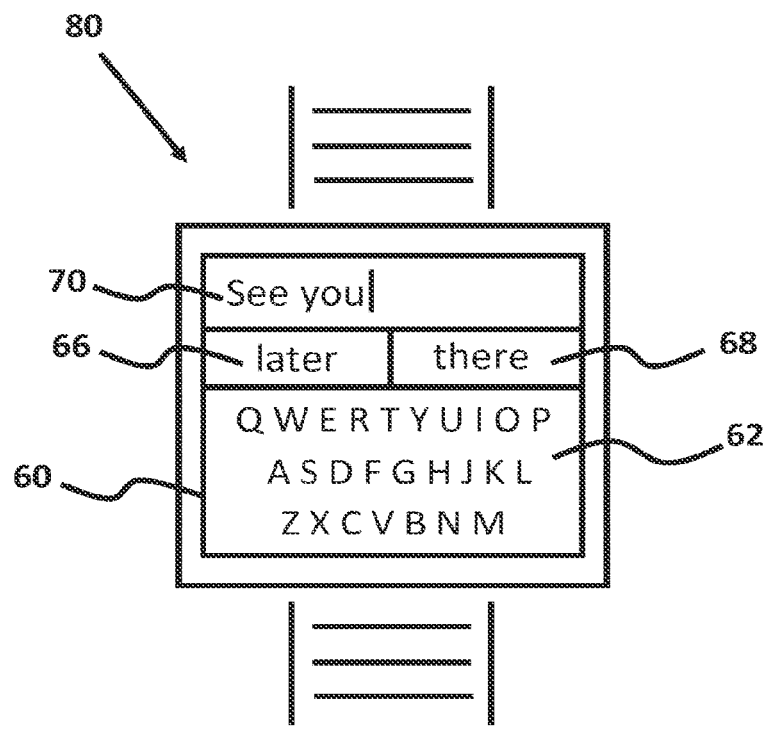
FIG. 17 illustrates the interface from FIG. 16 used on a personal watch with a small screen.

FIG. 17 illustrates the interface 60 as displayed on a personal watch 80, resulting in interface 60 with dimensions of approximately 1 inch by 1 inch. As can be appreciated from FIG. 17, it would be impossible to use buttons for each of the characters on such a small screen, as the size of a user's finger would result in the user selecting multiple buttons or the wrong buttons.

Embodiments described herein can use additional gestures to provide additional functionality. Swiping diagonally from the top left corner of the screen to the bottom right corner of the screen can change the font. Swiping diagonally from the top right corner of the screen to the bottom left corner of the screen can change the layout of the screen to display special characters, such as letters with tildes, dieresis, breves, accent marks, etc.

Additional features provided by swipe gestures can include a swipe gesture which toggles the screen between predictions, numbers and punctuation. For example, a swipe gesture may switch the QWERTY character layout screen for a screen that only lists word predictions, while another swipe gesture may switch the screen to only list numbers. Other gestures can include a gesture for starting a new line of text, a gesture for entering a space, a delete gesture to delete individual characters, a delete gesture to delete entire words, a capitalization gesture which toggles between Abc (where only the first letter is capitalized), ABC (all letters capital) and abc (all letters lower case); and a send gesture to send the inputted text as a text message, an email (this is specific to an email focused application), as a status update to a social networking site, a message to a third party website, etc.

Swiping gestures need not be linear. For instance, gestures can be done in the form of curves or particular shapes, with the various shapes representing different commands. The swipe gestures can also be predefined, or they can be custom created by a user, and each swipe gesture can be associated with a particular command. Thus, a user can draw a wavy gesture and associate that gesture with the command for saving a message as a draft. Gestures associated with particular commands can also be changed at any time by the user. For instance, the gesture for generating additional word predictions can be changed from a left swipe to a down swipe. In embodiments, it is also possible to associate the relative length and velocity of a swiping motion with different commands. For instance, a short and quick swiping motion can be associated with a first command, while a long and slow swiping motion can be associated with a second command.

Figure 18:
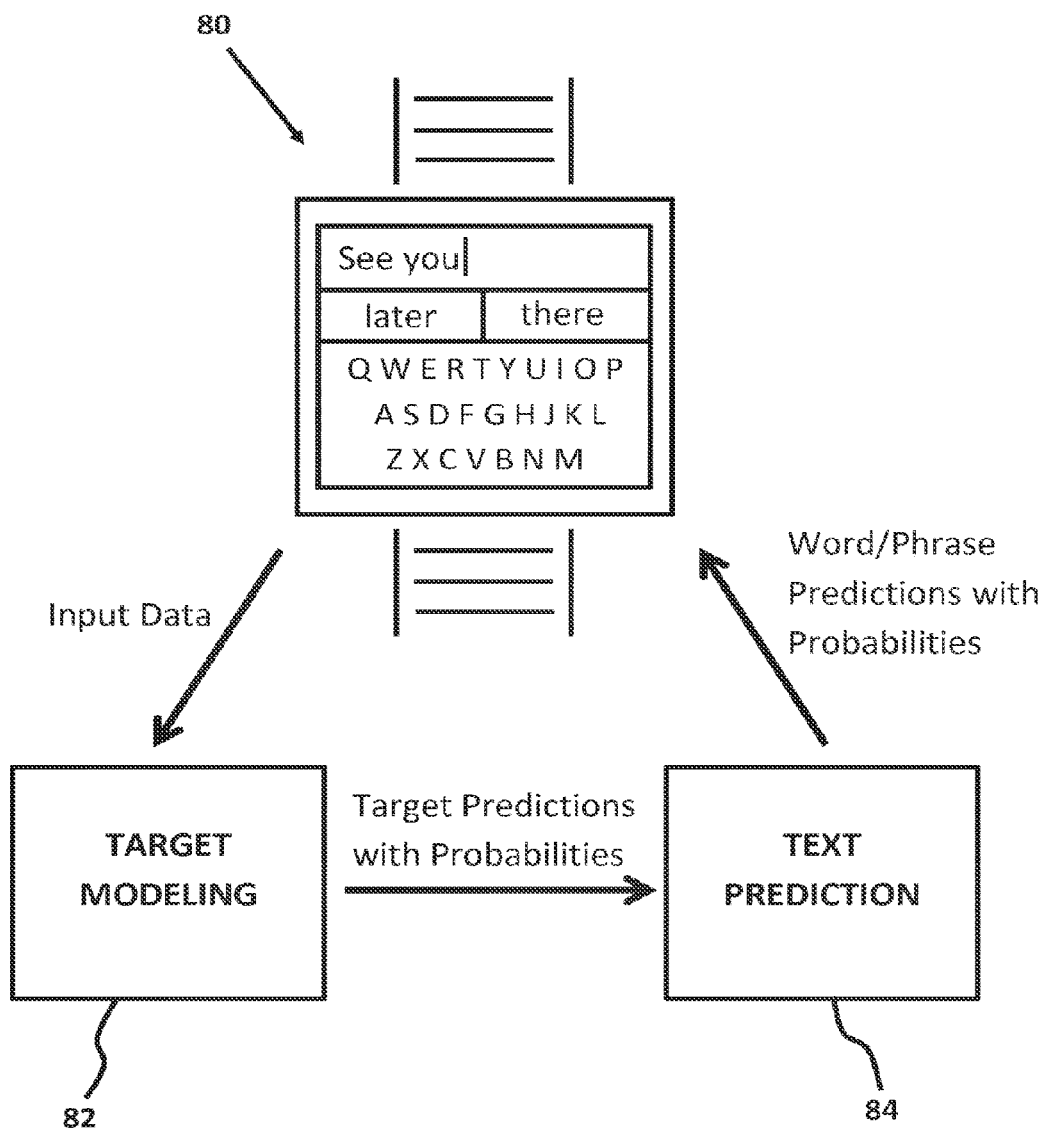
FIG. 18 illustrates a high level architecture of a text entry system, the system comprising of a small screen device with a text entry interface communicating with a target modeling module and a text prediction engine.

FIG. 18 illustrates a high level architecture of the present embodiment, with the device 80 having a small screen with a text entry interface. The interface communicates with a target modeling module 82 and a text prediction engine 84. The absolute or relative location of the user's input event can be communicated from the interface of device 80 to the target modeling module 82. The input data communicated to the target modeling module 82 can consist of the absolute Cartesian coordinates of the user's touch, relative location information, relative area/region information, character layout information, and contextual information. Specifically, relative location information may depend on the layout of the character pane 62, such as the user's input being on the top left quadrant of the pane, or the touch being to the left of the letter "J", etc.

The target modeling module 82 generates one or more likely targets from the input event, with each likely target having a probability associated with it and indicating the likelihood that the user intended to select that particular target. For instance, if the input data indicated that the user touched in the vicinity of the letter "U", then the likely targets with the highest probabilities may be those letters in the vicinity of the letter "U". The likely targets and their probabilities are communicated from the target modeling module 82 to the text prediction engine 84. The text prediction engine 84 uses the likely targets and their probabilities to generate word/phrase predictions, with the generated word/phrase predictions also having probabilities associated with them. For instance, if the user input had previously consisted of the letters "T" and "h", then the word prediction "The" may have a higher probability than the word prediction "There".

In one embodiment, as described above in reference to at least FIGS. 9, 10 and 12, the text prediction engine comprises at least one model configured to generate from an evidence source a first set of sequences with associated probability estimates. The text prediction engine also includes a probability generator configured to receive the first set of sequences to generate a set of sequence predictions with associated probability values. The evidence sources can include the user inputted text, including the phrase already entered by the user and the current word being typed by the user. There are arbitrarily many potential sources of evidence, including: stored, historical sequences entered by the user; the user's native language; the specific style of language being entered; the application in which the current sequence is being entered; in a messaging environment, the intended message recipient; the time/date; and the location of the device hosting the system.

In one embodiment, the choice of predictions displayed on the prediction pane 64 of interface 60 can be based on the probability values associated with the predictions generated by the text prediction engine. For example, only the predictions with probability values greater than a threshold may be displayed on the prediction pane 64 of interface 60. The set of predictions can be browsed by the user by using swipe gestures. The set of predictions can also be ordered based on their probability values, with the predictions with the highest probability values displayed first on the interface 60. The set of predictions can also be further narrowed down by using filters, such as topic filters. The use of filters is described in detail above.

In further reference to the target modeling module 82, when a user touches the screen of the small screen device, an input event is generated. As described in reference to FIG. 9, the input event is sent to the input probability generator 902. The input probability generator 902 queries the target model set 906 to determine the one or more likely targets. That is, the input probability generator 902 generates a probability that the user intended to select that target, through the input event, by querying the model for that target. The one or more likely targets can also be filtered by discarding the one or more likely targets that are below a probability threshold.

The target model set comprises a plurality of trained models representing the plurality of targets (which may be characters) of the system. A target is modeled as a distribution which models the user's actual input if he was "targeting" that target. The distribution that is modeled is $p(x|c)$, where x is an input event position vector or an input event relative position data, and c is a label identifying a single target (a target identifies a set of possible intended characters). This distribution can be modeled as a multivariate Gaussian, a Laplace distribution, or a Gamma distribution. It is also possible to model the probability distribution using a true Bayesian estimator such as Variational Bayes and Gibbs sampling. While the target modeling set and its prediction is described in terms of regression, alternative embodiments can use classification, consisting of a machine learner, to predict the targets selected by the user.

The probability distributions can also be generated on the basis of the distances between the touch coordinate and the coordinates of designated keys, or on the basis of the characters that surround a given target key on a particular character layout. For instance, if the user tapped the area in the vicinity of the "H" key, then the characters "G" and "J" may be included in the one or more likely targets communicated to the text prediction engine, with some probability associated with each of the target predictions. For example, if a user intended to enter the character "H", then the target modeling module may generate the following: $\{(H\rightarrow0.5), (h\rightarrow0.3), (g\rightarrow0.1), (j\rightarrow0.1)\}$, where the character "H" was predicted as a likely target with a probability of 0.5, the character "h" was predicted as a likely target with a probability of 0.3, the character "g" was predicted as a likely target with a probability of 0.1, and the character "j" was predicted as a likely target with a probability of 0.1. If the user then intended to type the letter "e", then the following may be generated: $\{(e\rightarrow0.8), (w\rightarrow0.1), (r\rightarrow0.1)\}$. These predictions are communicated to the text prediction engine 84 for generating word/phrase predictions that are displayed to the user on interface 60.

The target model set of the target modeling module 82 consists of at least one target model. The target model set can thus have a model for each character in the character pane. Alternatively, each screen mode of the interface 60 (such as all capital letters, lowercase letters, numbers and punctuation, etc.) can have a single model for the corresponding screen mode. In yet another embodiment, a plurality of target models can be maintained for different applications, allowing for a first target model to be trained for a first application, a second target model to be trained for a second application, etc. The target model can be selected automatically based on the application being used, the screen size, the character layout, context information, etc. The target model can also be selected manually by using swipe gestures. For example, if a target model is not predicting accurately the desired targets, the user may switch to a different target model that can better predict the likely targets.

It is to be understood that embodiments of the interface 60 for small screen devices are not limited to the particular layouts illustrated in FIGS. 16 and 17. For example, the character pane 62 can be displayed on the top of the interface 60, with the typing pane 70 at the bottom of the interface 60. Alternatively, the typing pane 70 can be displayed in the middle of the interface 60, with the prediction pane 64 on the top of typing pane 70, and the character pane 62 on the bottom of the typing pane 70. The interface 60 could also be arranged with the prediction pane 64 on one side and the typing pane 70 on the other, or both on one side, in the case of languages that write words going up or down.

While the present disclosure illustrates and describes a preferred embodiment and several alternatives, it is to be understood that the techniques described herein can have a multitude of additional uses and applications. Accordingly, the invention should not be limited to just the particular description and various drawing figures contained in this specification that merely illustrate various embodiments and application of the principles of such embodiments.

What is claimed is:

1. A non-transitory computer readable medium embodying a program of instructions executable by a device to perform program steps for operating a touch-screen interface on the device, the program steps comprising:
    displaying a character pane on the touch-screen interface, the character pane defining a plurality of targets corresponding to a plurality of characters, numerals, punctuation marks, or combinations thereof;
    accepting a current touch-input event, the current touch-input event corresponding to a coordinate location on the touch-screen interface and associated with at least two targets from the character pane, the at least two targets corresponding to at least two of the plurality of characters, numerals, or punctuation marks;
    selecting a most likely character, numeral, or punctuation mark among the at least two characters, numerals, or punctuation marks using one or more target models, the one or more target models modeling distributions of coordinate touch-locations on the touch-screen interface of one or more historic input events corresponding to at least one of the at least two targets among the plurality of targets;
    displaying the most likely character on the touch-screen interface; and
    using a set of swipe gestures to perform one or more functions on the touch-screen interface.

2. The non-transitory computer readable medium as recited in claim 1, further comprising the step of changing the character pane in response to a first set of swipe gestures.

3. The non-transitory computer readable medium as recited in claim 2, wherein a swipe gesture among the first set of swipe gestures changes the character pane from all capitals to all lowercase.

4. The non-transitory computer readable medium as recited in claim 2, wherein a swipe gesture among the first set of swipe gestures changes the character pane from letters to numbers and symbols.

5. The non-transitory computer readable medium as recited in claim 2, wherein a swipe gesture among the first set of gestures changes a font of the character pane.

6. The non-transitory computer readable medium as recited in claim 2, wherein a swipe gesture among the first set of swipe gestures changes the character pane to special characters.

7. The non-transitory computer readable medium as recited in claim 1, wherein each model among the one or more target models comprises a probability distribution, the probability distribution including a 2D Gaussian distribution, a Laplace distribution, and a Gamma distribution.

8. The non-transitory computer readable medium as recited in claim 1, wherein each model among the one or more target models is associated with an individual target from the character pane.

9. The non-transitory computer readable medium as recited in claim 1, wherein the one or more target models are selected from a plurality of target models based on one or more conditions.

10. The non-transitory computer readable medium as recited in claim 9, wherein the one or more conditions include an application type associated with the interface, a screen size, and a layout of the character pane.

11. The non-transitory computer readable medium as recited in claim 1, further comprising the step of using a swipe gesture to change the one or more target models to one or more alternative target models.

12. The non-transitory computer readable medium as recited in claim 1, wherein the step of selecting the most likely character includes the steps of:
    generating a set of likely targets based on the current touch-input event by using the one or more target models, the set of likely targets including a set of probability values indicating a probability that a likely target among the set of likely targets was intended to be selected based on the current touch-input event; and selecting a target with a highest probability value among the set of likely targets as the most likely character.

13. The non-transitory computer readable medium as recited in claim 1, further comprising the steps of:
generating one or more text predictions with a text prediction engine; and
displaying on the touch-screen interface the one or more text predictions generated with the text prediction engine.

14. The non-transitory computer readable medium as recited in claim 13, further comprising the steps of:
changing the one or more text predictions displayed on the touch-screen interface to alternative text predictions in response to a second set of swipe gestures; and
browsing the alternative text predictions using a third set of swipe gestures.

15. The non-transitory computer readable medium as recited in claim 1, wherein a swipe gesture among the set of swipe gestures performs an undo operation.

16. The non-transitory computer readable medium as recited in claim 1, wherein a swipe gesture among the set of swipe gestures terminates text entry.

17. The non-transitory computer readable medium as recited in claim 1, wherein a swipe gesture among the set of swipe gestures is a linear gesture.

18. The non-transitory computer readable medium as recited in claim 1, wherein a swipe gesture among the set of swipe gestures is a non-linear gesture.

19. A non-transitory computer readable medium embodying a program of instructions executable by a small screen device to perform program steps for operating a touch-screen interface on the small screen device, the program steps comprising:
displaying a typing pane to display inputted text on the touch-screen interface;
displaying a QWERTY-style character pane on the touch-screen interface defining a plurality of targets corresponding to a plurality of characters of the character pane;
accepting a current touch-input event, the current touch-input event corresponding to a coordinate location on the touch-screen interface and associated with at least two targets from the character pane;
communicating the current touch-input event to a set of target models, each target model of the set of target models modeling distributions of coordinate touch-locations on the touch-screen interface of historic input events corresponding to at least one of the at least two targets among the plurality of targets;
using the set of target models to generate a set of likely targets and a set of likely probabilities associated with the set of likely targets, a probability among the set of likely probabilities indicating a likelihood that a likely target among the set of likely targets was intended to be selected based on the current touch-input event;
generating a set of word predictions based on the set of likely targets using a text prediction engine;
displaying the set of word predictions on a prediction pane displayed on the touch-screen interface; and
using a set of swipe gestures to perform one or more functions on the touch-screen interface.

20. The non-transitory computer readable medium as recited in claim 19, wherein the typing pane is positioned on a top portion of the interface, wherein the prediction pane is positioned below the typing pane, and wherein the QWERTY-style character pane is positioned below the prediction pane.

21. The non-transitory computer readable medium as recited in claim 19, wherein each model among the one or more target models comprises a probability distribution the probability distribution including a 2D Gaussian distribution, a Laplace distribution, and a Gamma distribution.

22. The non-transitory computer readable medium as recited in claim 19, further comprising the step of accepting a selection of a predicted word among the set of word predictions displayed on the prediction pane.

23. The non-transitory computer readable medium as recited in claim 22, further comprising the steps of:
creating a set of touch-input events associated with the predicted word; and
pairing a particular touch-input event among the set of touch-input events with a particular target among the character pane, wherein the predicted word provides a mapping between the particular touch-input event and the particular target;
adding the pairing between the particular touch-input event and the particular target to a training set; and
retraining a target model among the set of target models with the training set.

24. The non-transitory computer readable medium as recited in claim 19, wherein the set of word predictions include a set of probabilities associated with each word prediction among the set of word predictions, the set of probabilities indicating a likelihood that the user intended to type each word prediction.

25. The non-transitory computer readable medium as recited in claim 24, further comprising the step of removing one or more word predictions from the set of word predictions with a probability value less than a threshold.

26. The non-transitory computer readable medium as recited in claim 19, further comprising the steps of:
using a swipe gesture to query the text prediction engine to generate additional text predictions; and
displaying the additional text predictions on the prediction pane.

27. A method for enabling input of text into a small screen device, comprising the steps of:
displaying an interface without buttons on a touch-screen of the small screen device, the interface including a word prediction pane, a typing pane, and a QWERTY-style character pan, the QWERTY-style character pane defining a plurality of characters;
generating an initial word prediction without a current word input with a text prediction engine, the text prediction engine comprising a plurality of language models and configured to generate text predictions using the plurality of language models based on at least one of a context input or the current word input;
accepting a touch event associated with touch coordinates on the interface, the touch coordinates being associated with at least two characters from the plurality of characters;
predicting one or more candidate words, wherein the prediction is based on the touch coordinates, one or more previous text predictions and one or more target models, the one or more target models modelling distributions of touch coordinates on the interface of one or more historic input events corresponding to at least one of the two or more characters of the plurality of characters;
displaying the one or more candidate words on the prediction pane; and
enabling the user to control the interface using one or more swipe gestures.

28. The method as recited in claim 27, further comprising the step of enabling association of a first gesture with a first function of the interface.

29. The method as recited in claim 27, further comprising the step of enabling performance of a swipe gesture among the one or more swipe gestures to change the character pane from all capitals to all lowercase.

30. The method as recited in claim 27, further comprising the step of enabling performance of a swipe gesture among the one or more swipe gestures to change the character pane from letters to numbers and symbols.

31. The method as recited in claim 27, further comprising the step of enabling performance of a swipe gesture among the one or more swipe gestures to change a font of the character pane.

32. The method as recited in claim 27, further comprising the step of enabling performance of a swipe gesture among the one or more swipe gestures to change the character pane to special characters.

33. The method as recited in claim 27, further comprising the step of enabling performance of a swipe gesture among the one or more swipe gestures to undo one or more previous operations.

34. The method as recited in claim 27, further comprising the step of enabling performance of a swipe gesture among the one or more swipe gestures to terminate text entry.

* * * * *